(12) United States Patent
Shuman et al.

(10) Patent No.: US 12,289,657 B2
(45) Date of Patent: Apr. 29, 2025

(54) THERMAL MITIGATION ENHANCEMENT

(71) Applicant: QUALCOMM Incorporated, San Diego, CA (US)

(72) Inventors: Mohammed Ataur Rahman Shuman, San Diego, CA (US); Soumya Das, San Diego, CA (US); Sivaramakrishna Veerepalli, San Diego, CA (US); Sean Vincent Maschue, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 698 days.

(21) Appl. No.: 17/404,722

(22) Filed: Aug. 17, 2021

(65) Prior Publication Data

US 2022/0060957 A1 Feb. 24, 2022

Related U.S. Application Data

(60) Provisional application No. 63/084,495, filed on Sep. 28, 2020, provisional application No. 63/067,793, filed on Aug. 19, 2020.

(51) Int. Cl.
| | |
|---|---|
| *H04W 4/40* | (2018.01) |
| *G06F 1/20* | (2006.01) |
| *G06F 1/3206* | (2019.01) |
| *G06F 1/3234* | (2019.01) |
| *G06F 1/3287* | (2019.01) |

(Continued)

(52) U.S. Cl.
CPC ............. *H04W 4/40* (2018.02); *G06F 1/206* (2013.01); *G06F 1/3206* (2013.01); *G06F 1/3278* (2013.01); *G06F 1/3287* (2013.01); *G06F 9/4856* (2013.01); *H04L 67/12* (2013.01); *H04W 4/38* (2018.02); *H04W 4/44* (2018.02); *H04W 24/04* (2013.01); *H04W 24/08* (2013.01);

(Continued)

(58) Field of Classification Search
None
See application file for complete search history.

(56) References Cited

U.S. PATENT DOCUMENTS

| | | | |
|---|---|---|---|
| 2007/0074071 A1 | 3/2007 | Rothman et al. | |
| 2013/0332720 A1* | 12/2013 | Gupta | G06F 9/4893 713/100 |

(Continued)

FOREIGN PATENT DOCUMENTS

| | | | | |
|---|---|---|---|---|
| WO | WO-2015057527 A1 * | 4/2015 | ............. | G06F 9/5044 |
| WO | WO-2018028977 A1 * | 2/2018 | ............. | H04B 1/38 |

OTHER PUBLICATIONS

International Search Report and Written Opinion—PCT/US2021/046457—ISA/EPO—Dec. 6, 2021.

*Primary Examiner* — Jay L Vogel
(74) *Attorney, Agent, or Firm* — Polsinelli

(57) ABSTRACT

Disclosed are techniques for performing thermal mitigation for one or more devices. For instance, a temperature, humidity, amount of light, and/or other characteristic or factor associated with a vehicle can be obtained. Whether to transition one or more communication functions from the vehicle to a user device can be determined based on the temperature, humidity, etc. In response to a determination to transition the one or more communication functions, the one or more communication functions can be transitioned from a communication unit of the vehicle to a communication unit of the user device.

30 Claims, 16 Drawing Sheets

(51) Int. Cl.
*G06F 9/48* (2006.01)
*H04L 67/12* (2022.01)
*H04W 4/38* (2018.01)
*H04W 4/44* (2018.01)
*H04W 24/04* (2009.01)
*H04W 24/08* (2009.01)
*H04W 48/02* (2009.01)
*H04W 88/06* (2009.01)
*H04W 4/48* (2018.01)

(52) U.S. Cl.
CPC ........... *H04W 48/02* (2013.01); *H04W 88/06* (2013.01); *H04W 4/48* (2018.02); *Y02D 10/00* (2018.01)

(56) References Cited

U.S. PATENT DOCUMENTS

| | | |
|---|---|---|
| 2014/0274011 A1 | 9/2014 | Jain et al. |
| 2016/0212253 A1* | 7/2016 | Akama .............. G01C 21/3664 |
| 2018/0011672 A1* | 1/2018 | Ito .......................... G06F 3/1423 |
| 2018/0039519 A1* | 2/2018 | Kumar .................. G06F 9/4812 |
| 2018/0216949 A1* | 8/2018 | Kluge ................. G01C 21/3461 |
| 2019/0243685 A1 | 8/2019 | Guim |
| 2020/0275336 A1* | 8/2020 | Rocci .................... H04W 72/53 |
| 2021/0314417 A1* | 10/2021 | Chen ....................... H04L 67/59 |

* cited by examiner

THERMAL MITIGATION ENHANCEMENT

CROSS-REFERENCE TO RELATED APPLICATIONS

The present application claims the benefit of U.S. Provisional Application No. 63/067,793, filed Aug. 19, 2020, entitled "THERMAL MITIGATION ENHANCEMENT", and U.S. Provisional Application No. 63/084,495, filed Sep. 28, 2020, entitled "THERMAL AWARE LOAD BALANCING", which are hereby incorporated by reference in their entirety and for all purposes.

FIELD OF THE DISCLOSURE

Aspects of the disclosure relate generally to wireless positioning and the like. In some implementations, examples are described for providing thermal mitigation enhancement for devices.

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Vehicles are an example of systems that can include wireless communications capabilities. For example, vehicles (e.g., automotive vehicles, aircraft, maritime vessels, among others) can communicate with other vehicles and/or with other devices that have wireless communications capabilities.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Some aspects of the present disclosure include systems, methods, apparatuses, and computer-readable media for performing thermal mitigation enhancement. According to at least one example, a method is provided for thermal mitigation. The method can include: obtaining a temperature associated with a vehicle; determining whether to transition one or more communication functions from the vehicle to a user device based on the temperature; and in response to a determination to transition the one or more communication functions, transitioning the one or more communication functions from a communication unit of the vehicle to a communication unit of the user device.

In another example, an apparatus for thermal mitigation is provided that includes a memory and at least one processor (e.g., configured in circuitry) communicatively coupled to the processor. The at least one processor is configured to: obtain a temperature associated with a vehicle; determine whether to transition one or more communication functions from the vehicle to a user device based on the temperature; and in response to a determination to transition the one or more communication functions, transition the one or more communication functions from a communication unit of the vehicle to a communication unit of the user device.

In another example, a non-transitory computer-readable medium is provided that includes stored thereon at least one instruction that, when executed by one or more processors, cause the one or more processors to: obtain a temperature associated with a vehicle; determine whether to transition one or more communication functions from the vehicle to a user device based on the temperature; and in response to a determination to transition the one or more communication functions, transition the one or more communication functions from a communication unit of the vehicle to a communication unit of the user device.

In another example, an apparatus for thermal mitigation is provided. The apparatus includes: means for obtaining a temperature associated with a vehicle; means for determining whether to transition one or more communication functions from the vehicle to a user device based on the temperature; and in response to a determination to transition the one or more communication functions, means for transitioning the one or more communication functions from a communication unit of the vehicle to a communication unit of the user device.

Some additional or alternative aspects of the present disclosure include systems, methods, apparatuses, and computer-readable media that provide thermal aware load balancers inside or communicatively coupled to device processing systems. A thermal aware load balancer enables a processing system to perform thermal based load balancing to control a processing load. For example, the thermal aware load balancer can control the number of received messages to be processed based on thermal conditions of associated hardware components and based on an instantaneous processing load of the processing system.

According to at least one example, a method is provided for thermal based load balancing. The method can include: receiving a plurality of messages from one or more devices;

determining a thermal level; determining a processing load based on at least a number of the plurality of messages; based on the thermal level and the processing load, determining a filtering scheme to be applied for filtering the plurality of messages in order to maintain the processing load at or below a processing capacity; and applying the filtering scheme using one or more components associated with the apparatus to filter the plurality of messages.

In another example, an apparatus for thermal based load balancing is provided that includes at least one transceiver, at least one memory, and at least one processor communicatively coupled to the at least one memory and the at least one transceiver. The at least one processor is configured to receive, via the at least one transceiver, a plurality of messages from one or more devices; determine a thermal level; determine a processing load based on at least a number of the plurality of messages; based on the thermal level and the processing load, determine a filtering scheme to be applied for filtering the plurality of messages in order to maintain the processing load at or below a processing capacity; and apply the filtering scheme using one or more components associated with the apparatus to filter the plurality of messages.

In another example, a non-transitory computer-readable medium is provided that includes stored thereon at least one instruction that, when executed by one or more processors, cause the one or more processors to: receive a plurality of messages from one or more devices; determine a thermal level; determine a processing load based on at least a number of the plurality of messages; based on the thermal level and the processing load, determine a filtering scheme to be applied for filtering the plurality of messages in order to maintain the processing load at or below a processing capacity; and apply the filtering scheme using one or more components associated with the apparatus to filter the plurality of messages.

In another example, an apparatus for thermal based load balancing is provided. The apparatus includes: means for receiving a plurality of messages from one or more devices; means for determining a thermal level; means for determining a processing load based on at least a number of the plurality of messages; based on the thermal level and the processing load, means for determining a filtering scheme to be applied for filtering the plurality of messages in order to maintain the processing load at or below a processing capacity; and means for applying the filtering scheme using one or more components associated with the apparatus to filter the plurality of messages.

In some aspects, the apparatus is or is part of a vehicle, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
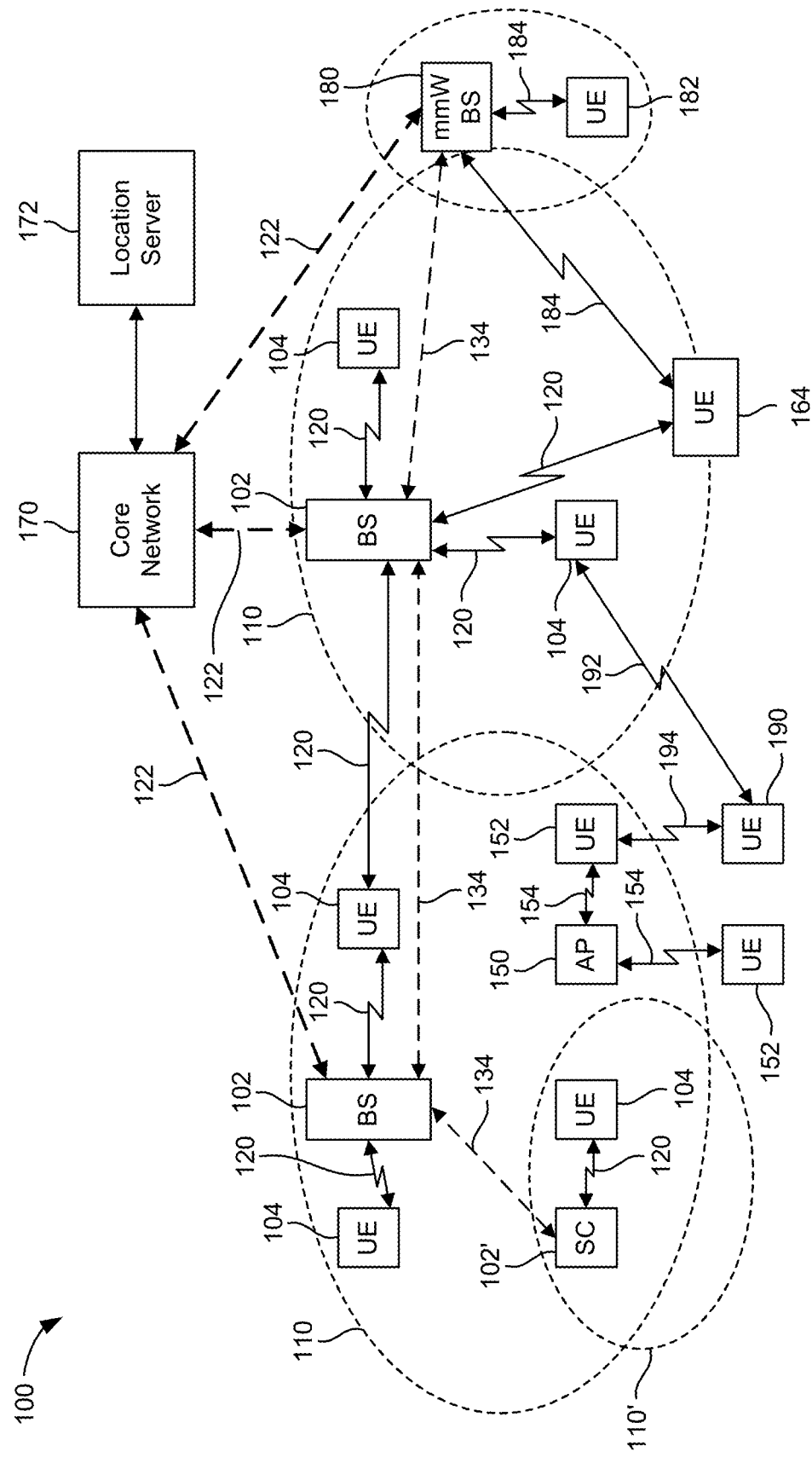
FIG. 1 illustrates an exemplary wireless communications system, according to aspects of the disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

In general, wireless communications systems support communication with multiple devices by sharing the available system resources (e.g., time, frequency, and power). As noted above, examples of cellular systems that provide such multiple-access support include code division multiple access (CDMA) systems, time division multiple access (TDMA) systems, frequency division multiple access (FDMA) systems, and orthogonal frequency-division multiple access (OFDMA) systems. A wireless multiple-access communications system may include a number of base stations, each simultaneously supporting communication for multiple communication devices, which may be otherwise known as user equipment (UE).

In some aspects, systems, apparatuses, processes (also referred to as methods), and computer-readable media (collectively referred to herein as systems and techniques) are described herein for performing thermal mitigation enhancement for one or more devices (e.g., one or more UEs). As described in more detail below, the systems and techniques can utilize one or more temperature thresholds (also referred to as thermal levels) in order to perform various operations, such as reducing certain functionalities, gracefully transitioning one or more functionalities from one or more communication units of a first UE (e.g., a vehicle) to one or more communication units of a second UE (e.g., a user device), among others.

In one illustrative example, the first UE is a vehicle and the second UE is a user device (e.g., a mobile device, tablet device, laptop computer, or other user device). The functionalities that are reduced and/or transferred from the vehicle to the user device can include one or more wireless network access functions, one or more vehicle-to-everything (V2X) functions, and/or one or more emergency functions (e.g., emergency-call services). In some examples, different temperature thresholds can be associated with each of the different functionalities. For instance, a first temperature threshold (e.g., 95° C. or other temperature threshold) can be associated with reducing and/or transferring wireless network access functions from a first communication unit of the vehicle to a second communication unit of the user device, a second temperature threshold (e.g., 105° C. or other temperature threshold) can be associated with reducing and/or transferring one or more V2X functions from the first communication unit to the second communication unit of the user device, and a third temperature threshold (e.g., 115° C. or other temperature threshold) can be associated with transferring one or more emergency functions from the first communication unit to the second communication unit. Any other number of thresholds can be used to transfer fewer or more functionalities from the first communication unit of the vehicle to the second communication unit of the user device, or from the second communication unit to the first communication unit.

In some aspects, additionally or alternatively to the thermal mitigation systems and techniques described above, systems and techniques are described herein for performing load balancing using one or more load balancers. In some implementations, the one or more load balancers are thermal aware load balancers (also referred to as thermal load balancers) that can perform thermal aware load balancing (also referred to as or thermal based load balancing or thermal load balancing). In some cases, the one or more thermal load balancers are inside or are communicatively coupled to a processing system (e.g., an application processor or other processing system) of a device (e.g., a UE). For instance, a thermal load balancer can enable a processing system of a device to perform thermal based load balancing and control the number of received messages (flow of incoming messages) to be processed based on thermal conditions of associated hardware components and based on instantaneous processing load of the processing system.

As described in more detail below, the thermal balancing systems and techniques described herein can utilize one or more temperature thresholds (also referred to as thermal levels) in combination with one or more processing loads and corresponding thresholds in order to select a filtering mechanism. The processing system and/or one or more external components (e.g., a modem and/or other components) that are communicatively coupled to the processing system can use the filtering mechanism to filter (e.g., drop) the incoming messages. This filtering allows the processing system to maintain the load of incoming messages to be processed by the processing system at or below a threshold that is indicative of a processing capacity of the processing system. The term filtering, as used throughout the present disclosure with respect to messages, can include dropping or discarding one or more messages, queuing one or more messages for later transmission and/or processing (e.g., when the processing load of the processing system improves to be less than the threshold), and/or other operations related to managing the processing of messages by a processing system.

In one illustrative example, a first UE can communicate with a number of nearby devices (e.g., one device, tens of devices, hundreds of devices, thousands of devices, etc.) and can receive a number of messages (e.g., tens, hundreds, or other number of messages per second) from each nearby device. In some examples, a nearby device can be any device that is within communication range of the first UE (e.g., a device that can transmit and/or receive messages to and/or from the first UE). The messages can provide information including, but not limited to, respective device identification information, location information, speed, direction of movement (or heading), etc. The first UE can be a vehicle, such as a bicycle, a motorcycle, an unmanned vehicle, an aerial vehicle, a maritime vessel, and/or other type of vehicle. The nearby devices can include, but are not limited to, a vehicle (e.g., a bicycle, a motorcycle, an unmanned vehicle, an aerial vehicle, a maritime vessel), a mobile device, a roadside unit (RSU), a traffic management device such as a traffic light system, a smart traffic management device, and/or other device.

The received messages can be processed by the first UE for safety applications (e.g., alerting a driver of the first UE of an impending/possible accident ahead, a red light ahead, a pedestrian crossing the road, etc.) and/or for other operations including, but not limited to, lane change negotiations, left or right turns at stop signs, traffic suggestions, destination suggestions, etc. It can be important to process such messages as quickly as possible without a large amount of delay. Additionally, processing of these messages can be computationally intensive. For example, each message can be signed by a respective transmitting device and, as part of the processing by the first UE, each message is verified. As temperatures of a processing system of the first UE and its associated components increase, the respective processing and verification capacities diminish due to, for example, a reduction of respective clock frequencies of the components of the processing system.

Given the large number of incoming messages from nearby devices every second, it can be the case that not all of the received messages are critical to the effective operation of the first UE. For instance, using a vehicle as an example of the first UE, a message received from a nearby vehicle that is five hundred feet away indicating that the nearby vehicle is traveling at a speed of ten miles per hour would not have immediate safety implications to the safe operation of the vehicle. However, a subset of these received messages may be important to the effective operation of the vehicle. In one illustrative example, a message received from a nearby vehicle that is less than one hundred feet away and that is approaching the vehicle at thirty miles per hour has immediate safety implications to the safe operation of the vehicle and should be processed in order to control the vehicle (e.g., movement of the vehicle, breaking of the vehicle, heading control of the vehicle, etc.) and/or to provide appropriate notifications to the operation of the vehicle.

It can thus be important to ensure that a processing system of a device and associated processing components of the processing system have sufficient capacity to receive, verify, and process important information (e.g., messages) regardless of fluctuations in processing capacity of the processing system and its components due to changing conditions (e.g., thermal conditions, humidity, level of light, and/or other conditions). The filtering mechanism selected based on such conditions and processing load conditions of a processing system, at any given point in time, enables the processing system to filter (e.g., drop) less important messages and thus maintain sufficient capacity to process more important messages.

Additional aspects of the present disclosure are described in more detail below.

As used herein, the term "communication unit" is a system, device, or component of a UE (e.g., a vehicle, a user device, etc.) and/or other device (e.g., a road side unit (RSU) or other device) that can include a telematics control unit (TCU), a network access device (NAD), a modem, a subscriber identity module (SIM), a transceiver (or individual receiver and/or transmitter), any combination thereof, and/or other system, device, or component configured to perform wireless communication operations.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof. Generally, UEs can communicate with a core network via a RAN, and through the core network the UEs can be connected with external networks such as the Internet and with other UEs. UEs can also communicate with other UEs and/or other devices as described herein. In some cases, other mechanisms of connecting to the core network, the Internet, and other UEs are also possible for the UEs, such as over wired access networks, wireless local area network (WLAN) networks (e.g., based on IEEE 802.11, based on ultra-wideband (UWB), etc.), and so on.

A base station may operate according to one of several RATs in communication with UEs, RSUs, and/or other devices, depending on the network in which it is deployed. In some cases, a base station may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A road side unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

According to various aspects, FIG. 1 illustrates an example of a wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link)

transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, UWB, and so on.

Figure 2A:
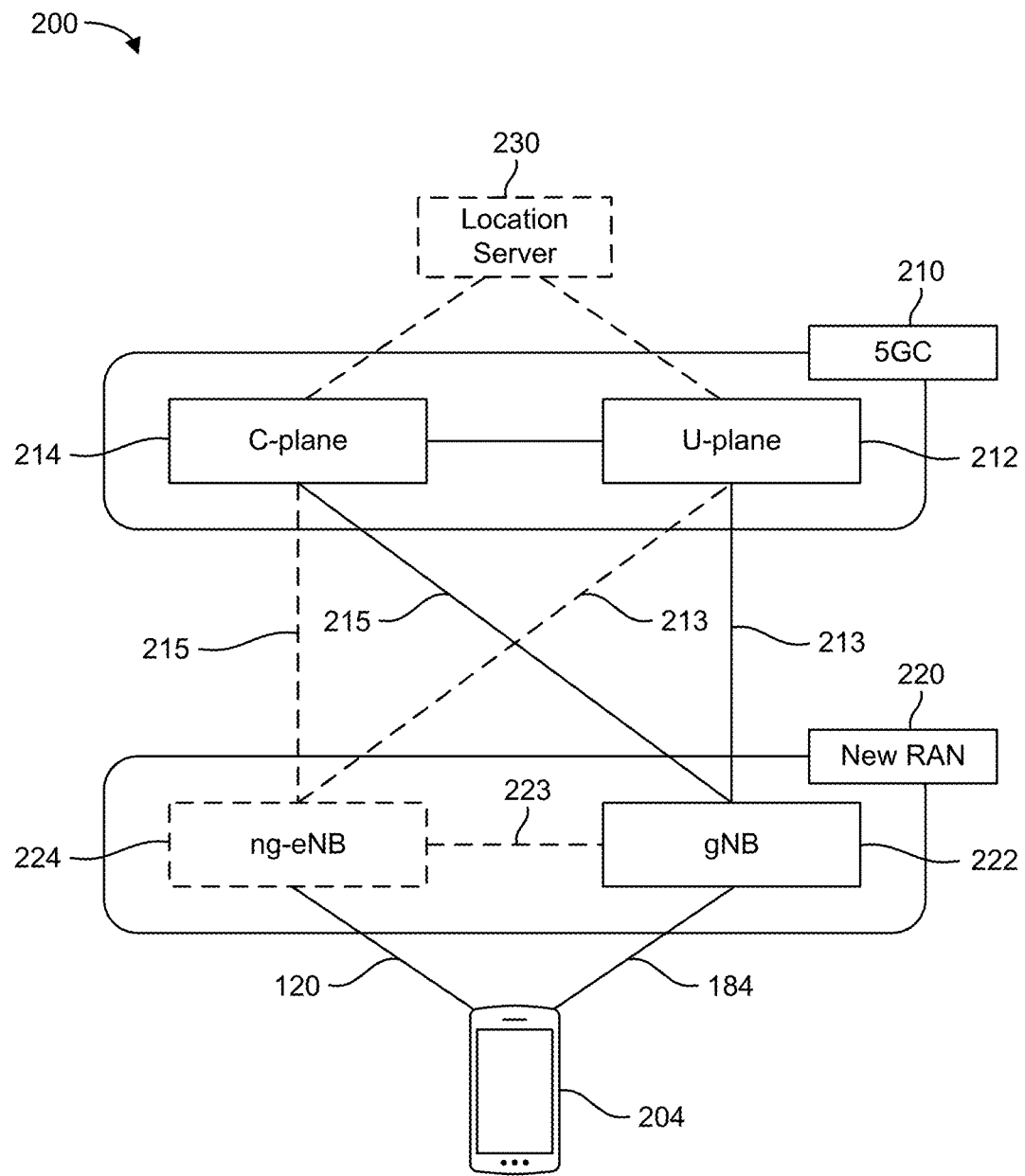
FIG. 2A and FIG. 2B illustrate examples of wireless network structures, according to aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
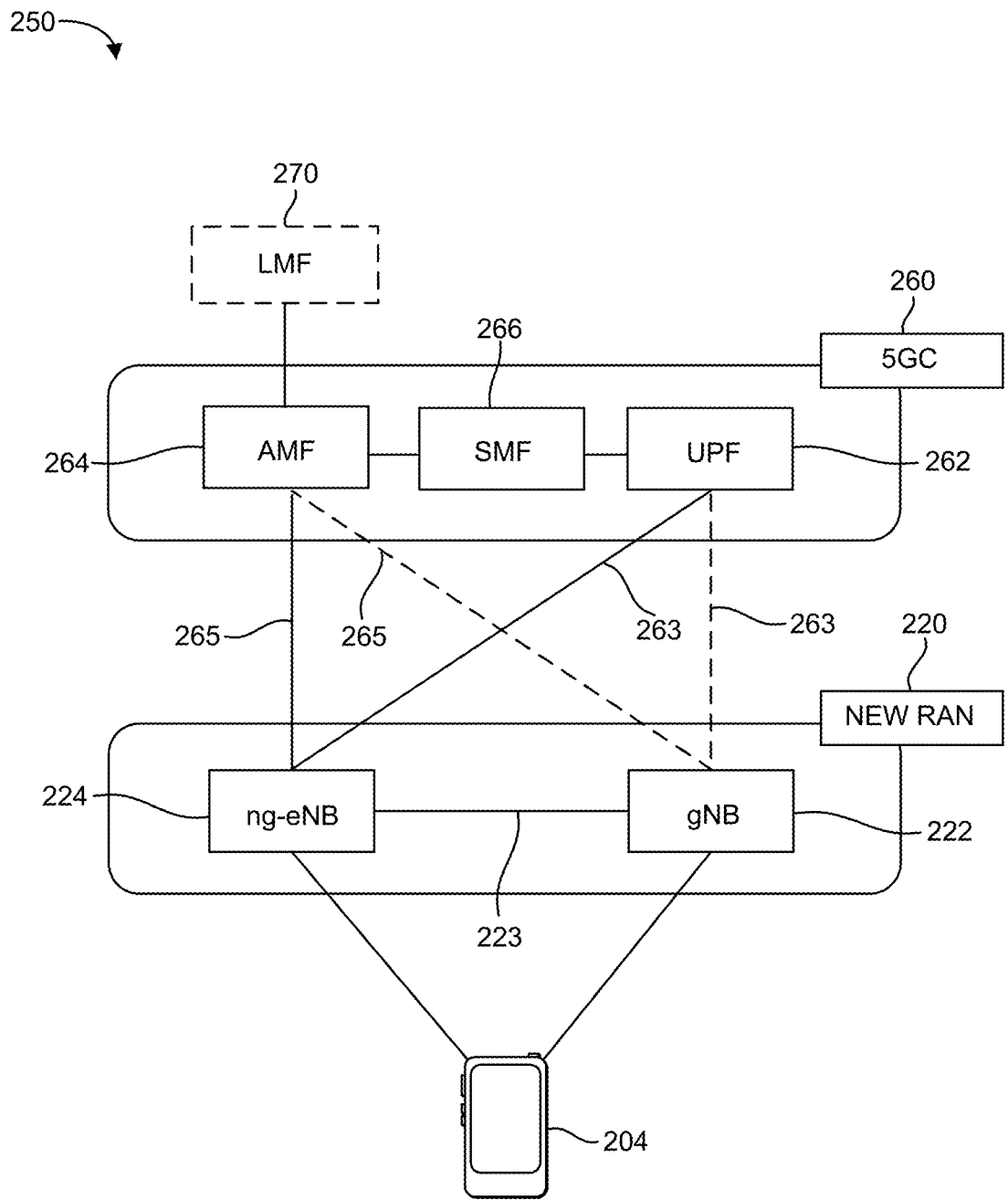

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260.

The functions of the AMF 264 may include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 may also interact with an authentication server function (AUSF) (not shown) and the UE 204.

In some examples, the AMF 264 can authenticate information of a subscriber identity module (SIM) of a UE. For instance, in the case of authentication based on a UMTS (universal mobile telecommunications system) SIM (USIM), the AMF 264 retrieves the security material from the AUSF. As described in more detail below, one or more functionalities can be transitioned from one UE (e.g., a vehicle) to another UE (e.g., a user device, such as a mobile device) or to another device (e.g., a roadside unit (RSU)) based on one or more characteristics or factors (e.g., temperature of a communication unit of the vehicle, humidity of the communication unit, an amount of light exposed to the communication unit, an amount of ventilation for the communication unit, and/or other characteristics or factors). In one example, network access functionality can be transitioned from a vehicle to a user device. In such an example, the AMF 264 may be used to authenticate SIM information (e.g., an encryption-decryption key of the subscriber or user) of the user device SIM in order to allow the user device to access the network provided by the 5GC 260. In some cases, the AMF 264 can authenticate the SIM information using the AUSF.

The functions of the AMF 264 may also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

The functions of the SMF 266 may include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

As described above, wireless communications systems support communication among multiple UEs. In various examples, wireless communications systems can be configured to support device-to-device (D2D) communication (as noted above) and/or vehicle-to-everything (V2X) communication. V2X can also be referred to as Cellular V2X (C-V2X). V2X communications can be performed using any radio access technology, such as LTE, 5G, WLAN (e.g., 802.11 WiFi), or other communication protocol. In some examples, UEs can transmit and receive V2X messages to and from other UEs, road side units (RSUs), and/or other devices over a direct communications link or interface (e.g., a PC5 or sidelink interface, an 802.11p DSRC interface, and/or other communications interface) and/or via the network (e.g., an eNB, a WiFi AP, and/or other network entity). The communications can be performed using resources assigned by the network (e.g., an eNB or other network device), resources pre-configured for V2X use, and/or using resources determined by the UEs (e.g., using clear channel assessment (CCA) with respect to resources of an 802.11 network).

V2X communications can include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network severs (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, can use a short-range direct-communication mode that provides 360° non line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles can also understand alerts or notifications from other V2X-enabled vehicles (based on V2V communications), from infrastructure systems (based on V2I communications), and from user devices (based on V2P communications). Infrastructure systems can include roads, stop lights, road signs, bridges, toll booths, and/or other infrastructure systems that can communicate with vehicles using V2I messaging.

In some cases, V2X communication may utilize multiple operational modes. LTE sidelink (e.g., for D2D communications) introduced by 3GPP in Release 12 includes two modes of operation, referred to as mode 1 and mode 2. Both mode 1 and mode 2 were designed with an objective of prolonging the battery lifetime of mobile devices at the cost of increasing latency. Depending on the desired implementation, sidelink communications can be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol. In some examples, sidelink communication can be performed using one or more Unlicensed National Information Infrastructure (U-NII) bands. For instance, sidelink communications can be performed in bands corresponding to the U-NII-4 band (5.850-5.925 GHz), the U-NII-5 band (5.925-6.425 GHz), the U-NII-6 band (6.425-6.525 GHz), the U-NII-7 band (6.525-6.875 GHz), the U-NII-8 band (6.875-7.125 GHz), or any other frequency band that may be suitable for performing sidelink communications. However, in some aspects, connect vehicles may benefit from highly reliable and low-latency V2X communications, and thus modes 1 and 2 may not be suitable for such applications.

Connected vehicles benefit from highly reliable and low-latency V2X communications. In some cases, modes 1 and 2 may not be suitable for such applications. Two additional communication modes (modes 3 and 4) were designed for V2V communications and introduced by 3GPP in Release 14. In mode 3, the cellular network (e.g., an eNB, gNB, or other network entity) selects and manages the radio resources used by vehicles for performing direct V2X communications. In mode 4, vehicles autonomously select the radio resources for direct V2X communications. Mode 4 can operate without cellular coverage, and in some cases can be considered a baseline V2X mode based on the inability of safety applications to depend on the availability of cellular coverage. Mode 4 can include a distributed scheduling scheme for vehicles to select radio resources and can include support for distributed congestion control.

Figure 3:
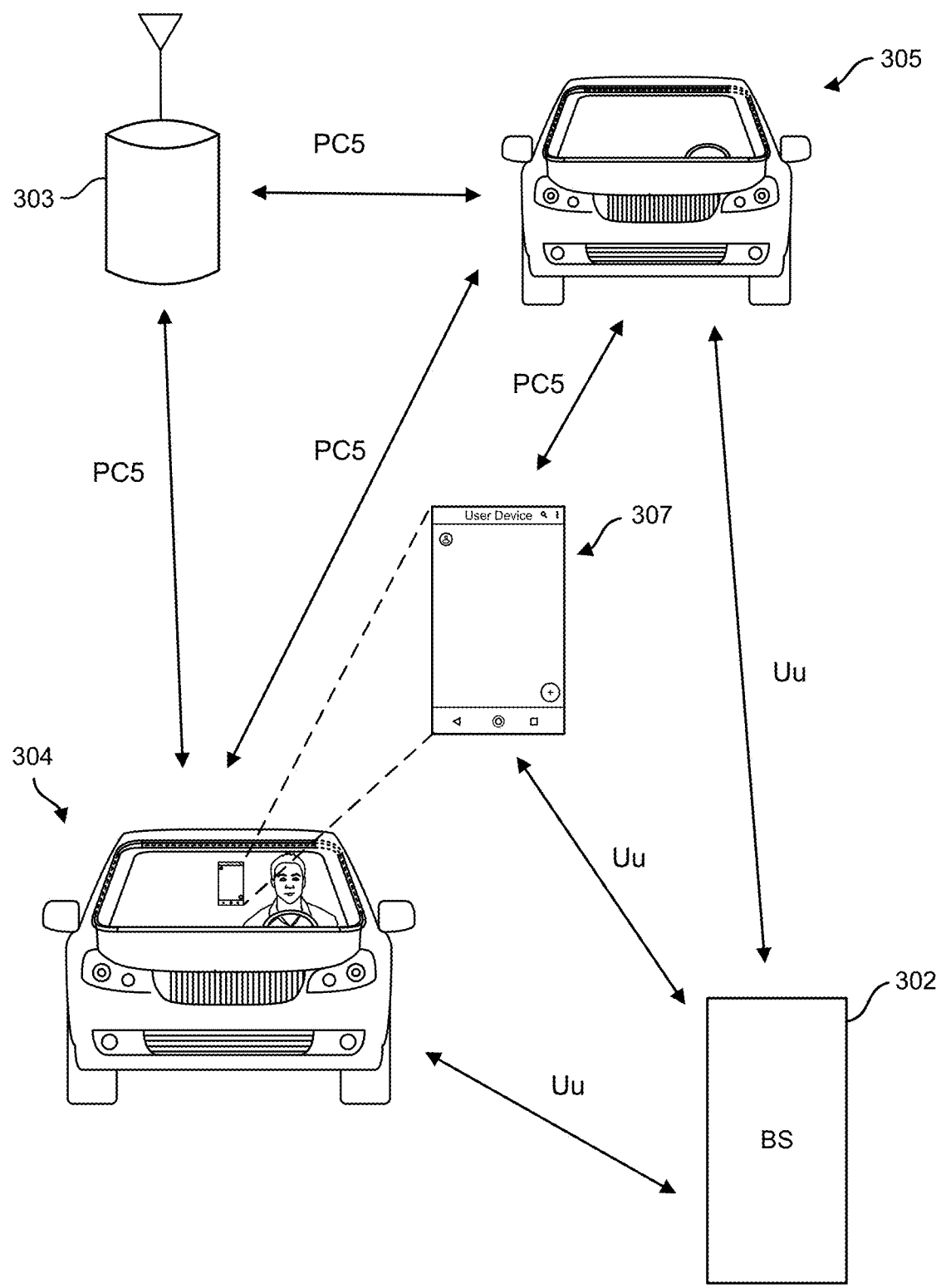
FIG. 3 is a diagram illustrating an example of various user equipment (UEs) communicating over direct communication interfaces (e.g., a cellular based PC5 sidelink interface, 802.11p defined Dedicated Short Range Communication (DSRC) interface, or other direct interface) and wide area network (Uu) interfaces, according to aspects of the disclosure.

FIG. 3 illustrates examples of different communication mechanisms used by various UEs. In one example of sidelink communications, FIG. 3 illustrates a vehicle 304, a vehicle 305, and a roadside unit (RSU) 303 communicating with each other using PC5, DSRC, or other device to device direct signaling interfaces. In addition, the vehicle 304 and the vehicle 305 may communicate with a base station 302 (shown as BS 302) using a network (Uu) interface. The base station 302 can include a gNB in some examples. FIG. 3 also illustrates a user device 307 communicating with the base station 302 using a network (Uu) interface. As described below, functionalities can be transferred from a vehicle (e.g., vehicle 304) to a user device (e.g., user device 307) based on one or more characteristics or factors (e.g., temperature, humidity, etc.). In one illustrative example, V2X functionality can be transitioned from the vehicle 304 to the user device 307, after which the user device 307 can communicate with other vehicles (e.g., vehicle 305) over a PC5 interface (or other device to device direct interface, such as a DSRC interface), as shown in FIG. 3.

While FIG. 3 illustrates a particular number of vehicles (e.g., two vehicles 304 and 305) communicating with each other and/or with RSU 303, BS 302, and/or user device 307, the present disclosure is not limited thereto. For instance (e.g., for purposes of describing example embodiments with reference to FIG. 10A-FIG. 13), tens or hundreds of such vehicles may be communicating with one another and/or with RSU 303, BS 302, and/or user device 307. At any given point in time, each such vehicle, RSU 303, BS 302, and/or user device 307 may transmit various types of information as messages to other nearby vehicles resulting in each vehicle (e.g., vehicles 304 and/or 305), RSU 303, BS 302, and/or user device 307 receiving hundreds or thousands of messages from other nearby vehicles, RSUs, base stations, and/or other UEs per second.

While PC5 interfaces are shown in FIG. 3, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 4:
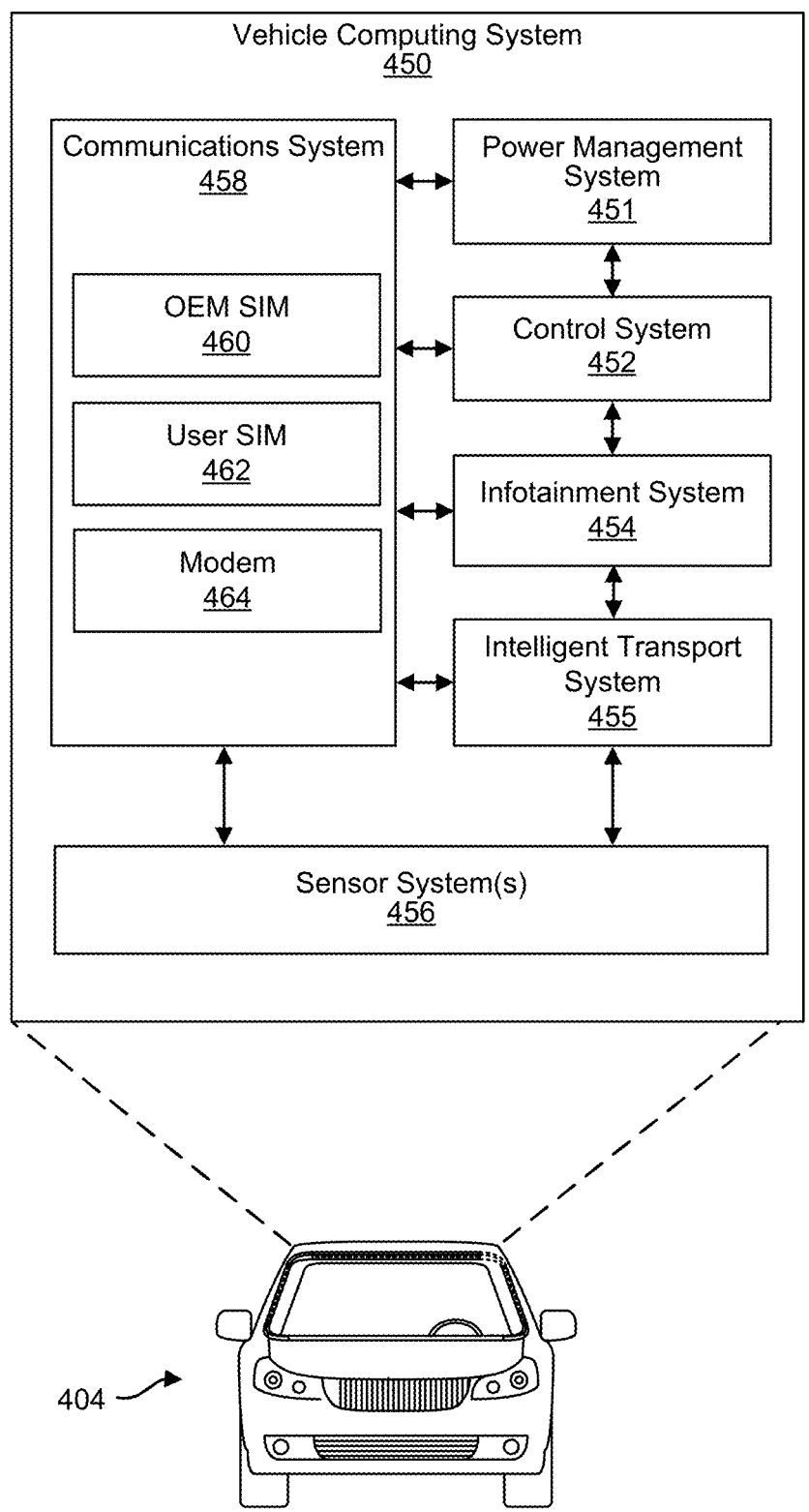
FIG. 4 is a block diagram illustrating an example of a computing system of a vehicle, according to aspects of the disclosure.

FIG. 4 is a block diagram illustrating an example a vehicle computing system 450 of a vehicle 404. The vehicle 404 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 450 can include at least a power management system 451, a control system 452, an infotainment system 454, an intelligent transport system (ITS) 455, one or more sensor systems 456, and a communications system 458. In some cases, the vehicle computing system 450 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 can be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 can include one or more electronic control units (ECUs). An ECU can control one or more of the electrical systems or subsystems in a vehicle. Examples of specific ECUs that can be included as part of the control system 452 include an engine control module (ECM), a powertrain control module (PCM), a transmission control module (TCM), a brake control module (BCM), a central control module (CCM), a central timing module (CTM), among others. In some cases, the control system 452 can receive sensor signals from the one or more sensor systems 456 and can communicate with other systems of the vehicle computing system 450 to operate the vehicle 404.

The vehicle computing system 450 also includes a power management system 451. In some implementations, the power management system 451 can include a power management integrated circuit (PMIC), a standby battery, and/or other components. In some cases, other systems of the vehicle computing system 450 can include one or more PMICs, batteries, and/or other components. The power management system 451 can perform power management functions for the vehicle 404, such as managing a power supply for the computing system 450 and/or other parts of the vehicle. For example, the power management system 451 can provide a stable power supply in view of power fluctuations, such as based on starting an engine of the vehicle. In another example, the power management system 451 can perform thermal monitoring operations, such as by checking ambient and/or transistor junction temperatures. In another example, the power management system 451 can perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 460 can be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 462 can be used by the communications system 458 for performing wireless network access functions in order to support a user data connection (e.g., for conducting phone calls, messaging, Infotainment related services, among others). In some cases, a user device of a user can connect with the vehicle computing system 450 over an interface (e.g., over PC5, Bluetooth™, WiFi™ (e.g., DSRC), a universal serial bus (USB) port, and/or other wireless or wired interface). Once connected, the user device can transfer wireless network access functionality from the user device to communications system 458 the vehicle, in which case the user device can cease performance of the wireless network access functionality (e.g., during the period in which the communications system 458 is performing the wireless access functionality). The communications system 458 can begin interacting with a base station to perform one or more wireless communication operations, such as facilitating a phone call, transmitting and/or receiving data (e.g., messaging, video, audio, etc.), among other operations. In such cases, other components of the vehicle computing system 450 can be used to output data received by the communications system 458. For example, the infotainment system 454 (described below) can display video received by the communications system 458 on one or more displays and/or can output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) can be used for communication of data for the OEM SIM 460 and/or the user SIM 462. In some examples, the modem 464 can include a 4G (or LTE) modem and another modem (not shown) of the communications system 458 can include a 5G (or NR) modem. In some examples, the communications system 458 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) can be used for performing V2X communications (e.g., with other vehicles for V2V communications, with other devices for D2D communications, with infrastructure systems for V2I communications, with pedestrian UEs for V2P communications, etc.). In some examples, the communications system 458 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 458 can be or can include a telematics control unit (TCU). In some implementations, the TCU can include a network access device (NAD) (also referred to in some cases as a network control unit or NCU). The NAD can include the modem 464, any other modem not shown in FIG. 4, the OEM SIM 460, the user SIM 462, and/or other components used for wireless communications. In some examples, the communications system 458 can include a Global Navigation Satellite System (GNSS). In some cases, the GNSS can be part of the one or more sensor systems 456, as described below. The GNSS can provide the ability for the vehicle computing system 450 to perform one or more location services, navigation services, and/or other services that can utilize GNSS functionality.

In some cases, the communications system 458 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 404 to communicate with a network and/or other UEs.

The vehicle computing system 450 can also include an infotainment system 454 that can control content and one or more output devices of the vehicle 404 that can be used to output the content. The infotainment system 454 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 can include the intelligent transport system (ITS) 455. In some examples, the ITS 455 can be used for implementing V2X communications. For example, an ITS stack of the ITS 455 can generate V2X messages based on information from an application layer of the ITS. In some cases, the application layer can determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 can obtain car access network (CAN) information (e.g., from other components of the vehicle via a CAN bus). In some examples, the communications system 458 (e.g., a TCU NAD) can obtain the CAN information via the CAN bus and can send the CAN information to a PHY/MAC layer of the ITS 455. The ITS 455 can provide the CAN information to the ITS stack of the ITS 455. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 455.

The conditions used to determine whether to generate messages can be determined using the CAN information based on safety-related applications and/or other applications, including applications related to road safety, traffic efficiency, infotainment, business, and/or other applications. In one illustrative example, the ITS 455 can perform lane change assistance or negotiation. For instance, using the CAN information, the ITS 455 can determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 can determine a lane-change condition has been met that is associated with a message to be sent to other vehicles that are nearby the vehicle in the adjacent lane. The ITS 455 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 can use any suitable protocol to generate messages (e.g., V2X messages). Examples of protocols that can be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 455 can be signed by the security layer of the ITS 455. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message can be received by the communications system 458 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 452, which can cause the control system 452 to automatically break the vehicle 404 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 455 can receive a large number of messages from the other UEs (e.g., vehicles, RSUs, etc.), in which case the ITS 455 will authenticate (e.g., decode and decrypt) each of the messages and/or determine which operations to perform. Such a large number of messages can lead to a large computational load for the vehicle computing system 450. In some cases, the large computational load can cause a temperature of the computing system 450 to increase. Rising temperatures of the components of the computing system 450 can adversely affect the ability of the computing system 450 to process the large number of incoming messages. As described in more detail below, one or more functionalities can be transitioned from the vehicle 404 to another device (e.g., a user device, a RSU, etc.) based on a temperature of the vehicle computing system 450 (or component thereof) exceeding or approaching one or more thermal levels. Transitioning the one or more functionalities can reduce the computational load on the vehicle 404, helping to reduce the temperature of the components. As further described in more detail below, a thermal load balancer can be provided that enable the vehicle computing system 450 to perform thermal based load balancing to control a processing load depending on the temperature of the computing system 450 and processing capacity of the vehicle computing system 450.

The computing system 450 further includes one or more sensor systems 456 (e.g., a first sensor system through an Nth sensor system, where N is a value equal to or greater than 0). When including multiple sensor systems, the sensor system(s) 456 can include different types of sensor systems that can be arranged on or in different parts the vehicle 404. The sensor system(s) 456 can include one or more camera sensor systems, Light Detection and Ranging (LIDAR) sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 450 of the vehicle 404.

While the vehicle computing system 450 is shown to include certain components and/or systems, one of ordinary skill will appreciate that the vehicle computing system 450 can include more or fewer components than those shown in FIG. 4. For example, the vehicle computing system 450 can also include one or more input devices and one or more output devices (not shown). In some implementations, the vehicle computing system 450 can also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 5:
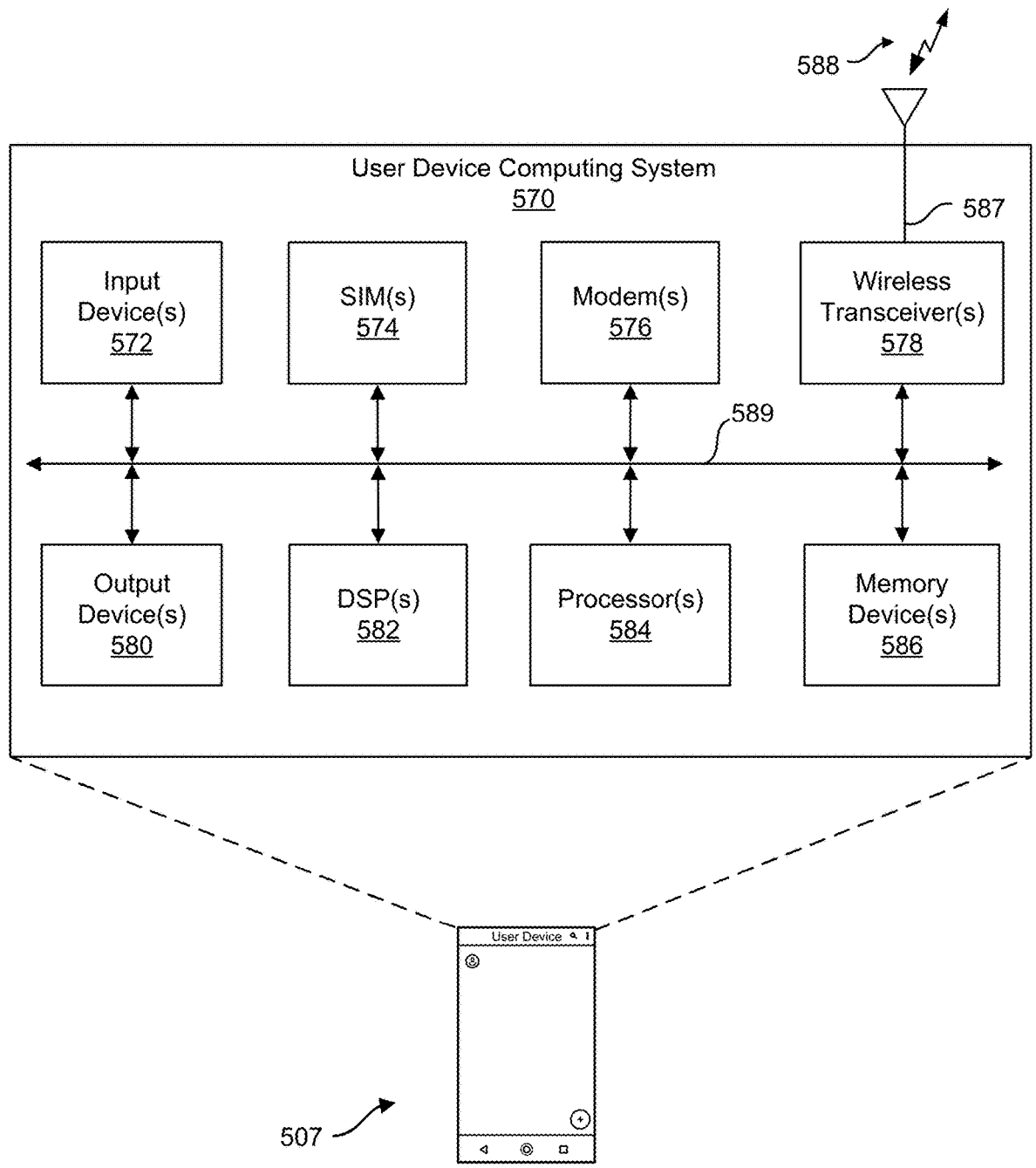
FIG. 5 is a block diagram illustrating an example of a computing system of a user device, according to aspects of the disclosure.

FIG. 5 illustrates an example of a computing system 570 of a user device 507. The user device 507 is an example of a UE that can be used by an end-user. For example, the user device 507 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 570 includes software and hardware components that can be electrically or communicatively coupled via a bus 589 (or may otherwise be in communication, as appropriate). For example, the computing system 570 includes one or more processors 584. The one or more processors 584 can include one or more CPUs, ASICs, FPGAs, APs, GPUs, VPUs, NSPs, microcontrollers, dedicated hardware, any combination thereof, and/or other processing device or system. The bus 589 can be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

The one or more wireless transceivers 578 can receive wireless signals (e.g., signal 588) via antenna 587 from one or more other devices, such as other user devices, vehicles (e.g., vehicle 404 of FIG. 4 described above), network devices (e.g., base stations such as eNBs and/or gNBs, WiFI routers, etc.), cloud networks, and/or the like. In some examples, the computing system 570 can include multiple antennae. The wireless signal 588 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 588 into a baseband or intermediate frequency and can convert the RF signals to the digital domain.

In some cases, the computing system 570 can include a coding-decoding device (or CODEC) configured to encode and/or decode data transmitted and/or received using the one or more wireless transceivers 578. In some cases, the computing system 570 can include an encryption-decryption device or component configured to encrypt and/or decrypt data (e.g., according to the AES and/or DES standard) transmitted and/or received by the one or more wireless transceivers 578.

The one or more SIMs 574 can each securely store an IMSI number and related key assigned to the user of the user device 507. As noted above, the IMSI and key can be used to identify and authenticate the subscriber when accessing a network provided by a network service provider or operator associated with the one or more SIMs 574. The one or more modems 576 can modulate one or more signals to encode information for transmission using the one or more wireless transceivers 578. The one or more modems 576 can also demodulate signals received by the one or more wireless transceivers 578 in order to decode the transmitted information. In some examples, the one or more modems 576 can include a 4G (or LTE) modem, a 5G (or NR) modem, a modem configured for V2X communications, and/or other types of modems. The one or more modems 576 and the one or more wireless transceivers 578 can be used for communicating data for the one or more SIMs 574.

The computing system 570 can also include (and/or be in communication with) one or more non-transitory machine-readable storage media or storage devices (e.g., one or more memory devices 586), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 586 and executed by the one or more processor(s) 584 and/or the one or more DSPs 582. The computing system 570 can also include software elements (e.g., located within the one or more memory devices 586), including, for example, an operating system, device drivers, executable libraries, and/or other code, such as one or more application programs, which may comprise computer programs implementing the functions provided by various embodiments, and/or may be designed to implement methods and/or configure systems, as described herein.

In some implementations, a UE can be configured for Dual SIM Dual Active (DSDA) functionality. For instance, the vehicle 404, the user device 507, and/or other UEs can be equipped with DSDA functionality. A UE with DSDA functionality can be equipped with at least two SIMs. In one illustrative example, a vehicle and user device (e.g., mobile device) with DSDA functionality can enable the vehicle and a user (e.g., driver, passenger, etc.) of the vehicle and the user device to choose independent network operator (or provider) subscriptions, with each operator subscription being associated with a particular SIM. For instance, the vehicle can use a first operator (e.g., Verizon™) for wireless communication access and the user device can use a second operator (e.g., ATT™) for wireless communication access.

In some cases, DSDA functionality can support at least two active SIMs for a vehicle, including an OEM SIM and a user SIM, such as those described above with respect to the vehicle computing system 450 of FIG. 4. As noted above, the OEM SIM and/or the user SIM can be used along with one or more modems (e.g., the modem 464 and/or other modem of the communications system 458 shown in FIG. 4). In some implementations, the OEM SIM, the user SIM, and the modem(s) of the vehicle can be part of a TCU of the vehicle or can be part of a NAD of the TCU (e.g., as part of the communications system 458 of FIG. 4). As described above, the OEM SIM can store information that provides access for performing wireless communications for vehicle-based operations (e.g., for eCall functions, for communicating with the vehicle manufacturer such as for software updates etc., among other operations). The OEM SIM supports various critical services for the vehicle, including eCall for making emergency calls. The user SIM is used for performing wireless network access for a UE of a user in order to support a user data connection, such as for facilitating phone calls, messaging, infotainment related services, among others.

DSDA can allow the user SIM and a modem of the vehicle to be used for wireless network access (e.g., for a cellular connection) in place of a SIM and/or modem of a UE. For example, upon being brought into a communication range of the vehicle, a user device (e.g., a mobile device) can connect with the vehicle over an interface (e.g., over Bluetooth™, WiFI™, USB port, lightning port, and/or other wireless or wired interface). Once connected, a communication unit of the user device can transfer the wireless network access functionality from the user device to a communication unit of the vehicle. The communication unit of the vehicle can then begin interacting with a base station to perform one or more wireless communication operations, such as facilitating a phone call, transmitting and/or receiving data (e.g., messaging, video, audio, etc.), among other operations. As noted above, a "communication unit" of a device (e.g., a vehicle, user device, other UE, RSU, etc.) can be a TCU, a NAD, a modem, a SIM, a transceiver (or individual receiver and/or transmitter), any combination thereof, and/or other system, device, or component configured to perform wireless communication operations. In one illustrative example, a user SIM (e.g., information stored on the SIM and/or the actual SIM card) of a user device (e.g., a mobile device) can be transferred to a TCU NAD of a vehicle, after which a modem of the vehicle can use the user SIM information to communicate with a wireless network operator for the user. In some examples, the user device can cease communication with the wireless network of the network operator while the TCU NAD of the vehicle communicates with the wireless network of the network operator.

DSDA provides various benefits for a user of a vehicle and user device. For example, the vehicle may include a higher quality antenna (e.g., providing better signal and coverage) as compared to one or more antennae of the user device (e.g., mobile device) used by the user. In such an example, DSDA allows the user to utilize the higher quality antenna installed on the vehicle to obtain data, voice, and/or other communications. In another example, the car infotainment system (e.g., the infotainment system 454, including displays, speakers, and other devices) can be used to output information obtained by the user device and/or the vehicle. Further, power from the vehicle can be used to power the user device (e.g., to charge a battery of the device) and/or to reduce the power usage of the user device.

In some cases, automotive standards and/or automotive OEMs may require that automotive-grade electronics are able to withstand high temperatures (e.g., up to 120° Celsius (C.) or higher in some cases), including ambient temperature and circuit component temperatures (e.g., transistor junction temperatures, also referred to as junction temperatures). However, at extreme temperatures, vehicle communication units (e.g., wireless modems, TCUs, NADs, etc.) may have limited functionalities. For instance, in the event an automotive wireless modem reaches an extreme ambient and/or junction temperature (e.g., reaches 95° C., 100° C., 105° C., 110° C., 115° C., 120° C., or other high temperature), the modem may need to prioritize certain functions (e.g., emergency services, such as eCall) so that the modem can continue performing those functions without interruption. Continuing to perform functions that are less of a priority (e.g., V2X functions and/or user SIM related services, such as wireless access functions) can impact the performance of the higher priority functions by a vehicle communication unit. For example, by continuing to perform the functions that are less of a priority, a vehicle communication unit may not be able to perform the higher priority functions due to extreme temperatures preventing performance all of the functions. In such cases, the modem can deprioritize certain lower-priority functions, such as wireless access functions for the user device (e.g., using the user SIM and modem), V2X functions, among others. In one example, a vehicle communication unit can stop performing wireless network access functions and/or V2X functions (e.g., performed using the user SIM), and can continue performing emergency services such as eCall.

Problems can arise when a vehicle communication unit stops performing certain functions based on reaching a particular temperature. For instance, as noted above, a vehicle can deprioritize services or functions related to the user SIM (e.g., wireless network access functions) and can shut down the deprioritized services or functions in favor of other services (e.g., V2X functions, emergency services, etc.). In some cases, a vehicle may shut down these services without outputting any notification to the user and/or without transferring the services from a communication unit of the vehicle to a communication unit of the user device. Such a scenario can result in an abrupt termination of the services associated with the user SIM and can provide a loss of context (e.g., V2X context and/or eCall context), which can be needed to continue performing the services or functions.

As noted above, systems and techniques are described herein for performing thermal mitigation enhancement for one or more devices (e.g., one or more UEs). In some cases, the systems and techniques can be implemented by a UE, such as the vehicle 404 shown in FIG. 4. The systems and techniques can reference one or more temperature thresholds (or thermal levels) and/or temperature changes in order to determine whether to transition different functionalities from one or more communication units of a vehicle to one or more communication units of a user device. Examples provided herein describe transitioning services between a communication unit of a vehicle and a communication unit of user device for illustrative purposes. One of ordinary skill will understand that the systems and techniques described herein can be used to transition various functionalities between other types of devices (e.g., UEs, road side units (RSUs), etc.) based on temperature thresholds. For instance, in some implementations, a vehicle can transition functionalities to an RSU, to another vehicle, and/or to other devices. It will also be understood that temperatures of multiple communication units of the vehicle (or other UE) can be monitored, and that functionalities of the various communication units can be reduced and/or transferred to and/or from one or more communication units of the user device (or other UE). In some cases, one or more other characteristics or factors can be monitored in addition to or as an alternative to temperature, including humidity of a communication unit, an amount of light exposed to a communication unit, an amount of ventilation for a communication unit, and/or other characteristics or factors.

A vehicle may experience high temperatures in various scenarios, such as when processing a large number of messages (e.g., V2X messages), when being operated for long periods of time (e.g., hours, days, etc.), when driving on a hot and/or sunny day, in the event of an accident (e.g., a car crash), and/or in other scenarios. For instance, an automotive NAD (e.g., included as part of the communications system 458) can experience high temperatures when a vehicle is processing a large number of messages, is in a hot environment, and/or is operating for a long period of time. While the vehicle may be experiencing high temperatures, the user device may be in a less harsh environment (e.g., inside of the vehicle) as compared to that of the vehicle, and thus can continue to perform certain operations or functions that the vehicle may deprioritize when experiencing high temperatures.

The vehicle can include a thermal mitigation system that can monitor (e.g., periodically or continuously) one or more temperatures of a communication unit of the vehicle and/or a load of the communication unit of the vehicle. The communication unit of the vehicle can include the communications system 458 (which can include a TCU or TCU NAD as noted above), the user SIM 462, the OEM SIM 460, the modem 464, any other modem and/or SIM of the communications system 458 shown in, and/or other components. The thermal mitigation system can be part of or can be in communication with the power management system 451, the communications system 458, the control system 452, the infotainment system 454, and/or other system of the vehicle computing system 450.

The one or more temperatures can include an ambient temperature of the communication unit, circuit component temperatures (e.g., junction temperatures) of components of the communication unit, and/or other temperatures. For example, the thermal mitigation system can monitor (e.g., by periodically and/or continuously checking) the ambient temperature of the communication unit and the junction temperature of components (e.g., transistors and/or other circuits) of the communication unit. In some cases, one or more temperature sensors (e.g., thermistors) can be provided at various locations on the vehicle. For instance, referring to FIG. 4, a temperature sensor can be included as part of or can be communicatively coupled to the vehicle computing system 450, a temperature sensor can be included as part of or can be communicatively coupled to the communications system 458, and/or included as part of or communicatively coupled to other components of the vehicle 404. In some examples, multiple temperature sensors can be used to measure the temperature (e.g., ambient and/or junction temperatures) of the vehicle 404.

The load monitored by the thermal mitigation system can include an amount of cellular data being transmitted and/or received by a modem of the vehicle (e.g., the modem 464 and/or other modem of the communications system 458 of FIG. 4), an amount of V2X sidelink communications being transmitted and/or received by the communications system 458 (e.g., transmitting and/or receiving five messages per second versus 2500 messages per second), an amount of compute resources being used by the communication unit of the vehicle, and/or based on other factors. As described below, the load can be used for flow control (e.g., to determine whether to reduce or stop certain operations that are performed by the communication unit of the vehicle).

The thermal mitigation system can detect whether the communication unit of the vehicle has reached one or more temperature thresholds, whether a particular change in temperature over a period of time has occurred (e.g., an increase of ten degrees Celsius has occurred within a time period of an hour), and/or other whether other temperature based conditions have occurred. In response to detecting that the communication unit of the vehicle has reached a given temperature threshold and/or a particular temperature change has occurred, the vehicle can reduce one or more functionalities and/or can transition the one or more functionalities from the communication unit of the vehicle to a communication unit of the user device. As noted above, the communication unit of the vehicle can include the communications system 458 (e.g., a TCU or TCU NAD), the OEM SIM 460, the user SIM 462, the modem 464, any other modem of the communications system 458 of FIG. 4, and/or other component or device. The communication unit of the user device can include the SIM 574, the modem 576, the wireless transceiver 578, and/or other component or device.

In some examples, prior to or when transitioning the one or more functionalities from the communication unit of the vehicle to the communication unit of the user device, the vehicle (e.g., the communications system 458, the infotainment system 454, and/or other component of the vehicle computing system 450) can output a notification indicating to the user that the communication unit is experiencing a high temperature (e.g., 95° C., 100° C., 105° C., 115° C., etc.) and that one or more communication functions or services may need to be transitioned from the vehicle communication unit to the user device communication unit. In one example, the communications system 458 can cause the infotainment system 454 to display the notification as a visual message and/or to output the notification as an audio message. In addition or as an alternative to displaying and/or outputting an audio message, haptic feedback can be output to the user (e.g., by vibrating one or more seats in the vehicle, a steering wheel of the vehicle, other part of the vehicle). In another example, a message can be sent by the communication system (e.g., communications system 458) of the vehicle to the user device, and the message with the notification can be displayed, output as an audio message, and/or output as haptic feedback (e.g., as a vibration) by the user device. In some examples, a displayed message or a displayed graphical element (e.g., a virtual button or icon) associated with a message can be selectable by the user to indicate whether the user agrees to transition a particular functionality (e.g., wireless network access functionality, V2X functionality, emergency services functionality such as eCall, etc.) from the vehicle to the user device. The option can be selected by the user based on touch input provided using a touch sensitive screen, voice input provided using a microphone, input based on gesture recognition, based on a physical or mechanical control mechanism of the vehicle (e.g., as part of the infotainment system 454), and/or using another type of input. The user can provide input (e.g., by selecting a displayed option) indicating the user accepts transfer of the one or more functionalities. Upon receiving the input, the vehicle computing system (e.g., the vehicle computing system 450) can cause the one or more functionalities to be transitioned from the communication unit of the vehicle to the communication unit of the user device.

As indicated above, the functionalities that can be reduced and/or transferred from the vehicle to the user device can include one or more wireless network access functions (e.g., connecting to a wireless network, such as a 4G network, 5G network, etc.), one or more V2X functions, one or more emergency functions (e.g., eCall services), any combination thereof, and/or other functions. For instance, in response to detecting that the vehicle (e.g., a communication unit of the vehicle) has reached a given temperature threshold or a temperature change has occurred within a time period, the vehicle can transition network access functionality from the communication unit of the vehicle (e.g., the communications system 458, the user SIM 462, the OEM SIM 460, and/or the modem 464) to a communication unit of the user device (e.g., the SIM 574, the modem 576, and/or the wireless transceiver 578). In one illustrative example, the network access functionality can be transitioned from the user SIM 462 of the vehicle to the SIM 574 of the user device. In some cases, the communication unit of the vehicle can transmit or send an instruction to the communication unit of the user device to begin performing wireless network access functionality. In response to receiving the instruction, the communication unit of the user device can begin performing the wireless access functionality. In some cases, an infotainment system of the vehicle (e.g., infotainment system 454) can continue to output content after the network access functionality is transitioned from the communication unit of the vehicle to the communication unit of the user device.

In other examples, the V2X functionality of the vehicle can be reduced and/or transitioned to the user device, one or more emergency functions (e.g., eCall services) can be transitioned to the user device, and/or other operations can be performed based on different temperature thresholds and/or temperature changes being reached. An example of a thermal mitigation framework is described below with respect to FIG. 6.

In some cases, a temperature associated with one communication unit of the vehicle can be used as a trigger to determine when to reduce and/or transfer functionality of another communication unit from the vehicle to the user device. For instance, a temperature of a TCU can be used to determine when to transfer the functionality of a modem of the vehicle to a modem of the user device.

Figure 6:
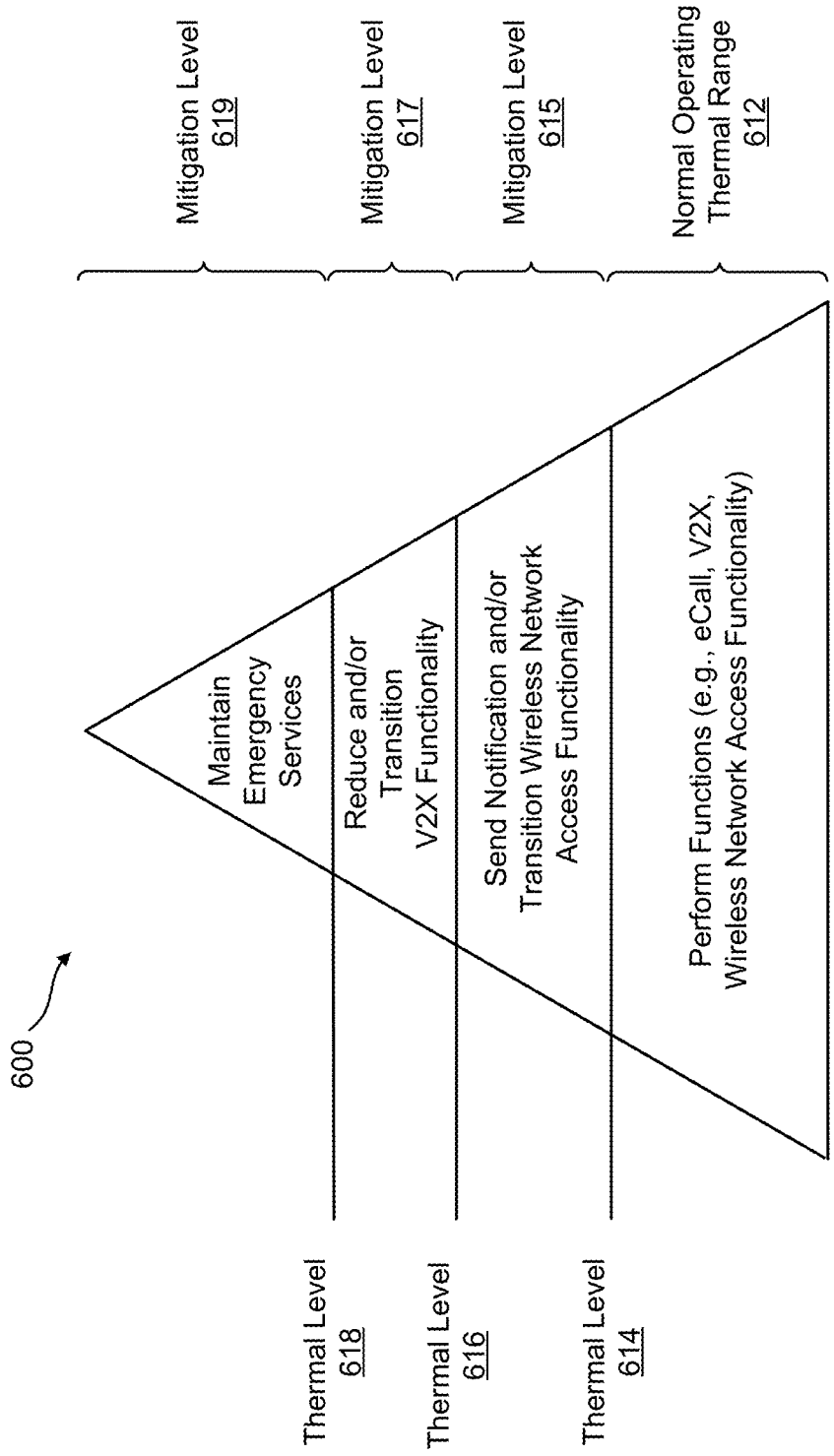
FIG. 6 is a diagram illustrating an example of a thermal mitigation framework, according to aspects of the disclosure.

FIG. 6 is a diagram illustrating an example of a thermal mitigation framework 600 that a computing system of a vehicle (e.g., the vehicle computing system 450 of FIG. 4) can use to determine when to perform certain levels of mitigation. The thermal mitigation framework 600 will be described with respect to a communication unit of the vehicle and a communication unit of a user device (e.g., a mobile device, a tablet device, a wearable device, an XR device, and/or other device). However, in some cases, the temperatures of one or more multiple communication units can be monitored, and functions performed by the one or multiple communication units can be transitioned to one or multiple communication units of the user device. As noted above, a communication unit of a vehicle can include the communications system 458 (e.g., a TCU or TCU NAD) as a whole or can include the modem 464, the user SIM 462, and/or the OEM SIM 460. As also noted above, the communication unit of the user device can include the SIM 574, the modem 576, and/or the wireless transceiver 578.

When the vehicle is powered on and the user device is within communication range of the vehicle, the user device can connect with the vehicle over an interface (e.g., over a WiFi™ DSRC interface, a Bluetooth™ interface, over a 3GPP sidelink PC5 interface, USB port, lightning port, and/or other wireless or wired interface). Once a successful connection is established, the user device can send a request to the vehicle requesting that the vehicle perform a particular function, such as wireless network access functionality for the user device. The vehicle can accept the request, such as based on recognizing and/or authenticating the user device. The communication unit of the user device can transfer the wireless network access functionality from the communication unit of the user device to the communication unit of the vehicle. The communication unit of the vehicle can then begin performing wireless network access functionality to provide wireless network access for the user device, allowing the user to take advantage of the user SIM (e.g., user SIM 462), the modem (e.g., modem 464 and/or other modem of the communications system 458 of FIG. 4), and/or the antenna of the vehicle. The communication unit of the vehicle can perform various operations for the user device, such as facilitating phone calls, transmitting and/or receiving data (e.g., messaging, video, audio, etc.), among other operations.

As shown in FIG. 6, different thermal levels are associated with different mitigation levels. Each mitigation level includes transitioning (to the user device) and/or modifying one or more functionalities of the computing system of the vehicle (e.g., the vehicle computing system 450 of FIG. 4). The thermal mitigation framework 600 shown in FIG. 6 provide illustrative examples of various thermal levels that can be used as temperature thresholds to determine when to perform certain mitigation levels. One of ordinary skill will understand that other mitigation techniques can be performed based on thermal levels other than those shown in FIG. 6.

As shown, when the communication unit of the vehicle is operating within a normal operating thermal range 612, the communication unit can perform various functions without reducing any functions and/or transferring any functions to the user device. In some cases, the vehicle can reduce and/or transition certain functions even when in the normal operating thermal range 612. In one illustrative example, the normal operating thermal range 612 can include a range of temperatures from 0° C. to 95° C. Any other suitable range can be used as the normal operating thermal range 612. The functions performed during the normal operating thermal range 612 can include eCall and/or other emergency services, V2X functions, wireless network access functionality, among others.

A first temperature threshold is shown as thermal level 614, a second temperature threshold is shown as thermal level 616, and a third temperature threshold is shown as thermal level 618. The thermal level 618 is higher than the thermal level 616, and the thermal level 616 is higher than the thermal level 614. In one illustrative example, the thermal level 614 can include a temperature of 95° C., the thermal level 614 can include a temperature of 105° C., and the thermal level 614 can include a temperature of 115° C. Any other values for the thermal levels 614-618 can be used.

The thermal mitigation system can detect whether the communication unit of the vehicle has reached one or more of the temperature thresholds associated with thermal levels 614, 616, and 618. For example, the thermal mitigation system can determine that a temperature (e.g., an ambient temperature and/or a junction temperature) of the communication unit of the vehicle has reached thermal level 614 and thus that the temperature is greater than or equal to the first temperature threshold. In response to the temperature being greater than or equal to the first temperature threshold, the vehicle (e.g., the communication unit or other component of the vehicle computing system) can perform operations according to mitigation level 615.

According to mitigation level 615, the vehicle (e.g., the communication unit or other component of the vehicle computing system) can transition the wireless network access functionality from the communication unit of the vehicle to the communication unit of the user device. For example, the vehicle can transmit or send an instruction to the user device to begin using the communication unit of the user device to perform wireless network access functionality. The communication unit of the user device can begin performing the wireless access functionality in response to receiving the instruction. As noted above, in some examples, the communication unit of the user device can include a wireless modem (e.g., modem 576). In such examples, the modem can begin communicating with a network entity (e.g., an eNB, a gNB, etc.) of a wireless network access service provider associated with the user SIM of the user device (e.g., SIM 574) to obtain wireless network connectivity.

In some examples, the transition of the wireless network access functionality from the communication unit of the vehicle to the communication unit of the user device can be seamless and transparent from the perspective of the user. For instance, when the wireless network access functionality is performed by the communication unit of the vehicle, data obtained by the communication unit of the vehicle from the network can be output by the vehicle (e.g., displayed or otherwise output using the infotainment system of the vehicle). When the wireless network access functionality is successfully transitioned from the communication unit of the vehicle to the communication unit of the user device, the data obtained by the communication unit of the user device from the network can continue to be output by the vehicle without interruption. For example, the data can be provided by the communication unit of the user device to the infotainment system (or other system or component) of the vehicle over a wireless connection (e.g., over Bluetooth™, WiFi™, or other wireless interface) and/or over a wired connection (e.g., using a USB interface, a serial interface, a lightning interface, or other wired connection).

In some examples, in order to provide a seamless transition of the wireless network access functionality from the communication unit of the vehicle to the communication unit of the user device, the communication unit of the vehicle can continue to perform a service (e.g., a phone call, streaming media such as video or audio, etc.) that the communication unit was in the process of performing when the thermal level 614 was reached. The communication unit of the vehicle can initiate a deregistration of the communication unit from the network operator associated with the user SIM 462. The communication unit can also register or send an instruction to the user device to register the communication unit of the user device with the network operator associated with the SIM 574. In one example, the AMF 264 of FIG. 2B may be used to authenticate SIM information (e.g., an encryption-decryption key of the subscriber or user) of the SIM 574 to allow the user device 507 to access the network provided by the 5GC 260. Once the communication unit of the user device is registered with the network operator, the communication unit of the vehicle can stop performing the service. In some implementations, the user device can use a pull mode (e.g., as described in 3GPP Technical Specification (TS) 24.337) to transfer a call from the communication unit of the vehicle (e.g., the communications system 458, which can include a TCU NAD as described above) to the communication unit of the user device.

In some examples, according to mitigation level 615, the vehicle (e.g., the communications system 458, the infotainment system 454, and/or other component of the vehicle computing system 450) can output a notification for the user. The notification can provide a warning to the user that services may need to be transferred from the vehicle to the user device (e.g., a mobile device) of the user. For instance, the vehicle can output a notification indicating to the user that the communication unit is experiencing a high temperature (based on reaching or exceeding the thermal level 614) and that the wireless network access functionality may need to be or is going to be transitioned from the vehicle communication unit to the user device communication unit. The notification can be displayed (e.g., on a display device of the vehicle and/or on a display of the user device), can be output as audio (e.g., using one or more speakers of the vehicle and/or user device), and/or can be output as haptic feedback in the vehicle (e.g., by vibrating one or more seats, the steering wheel, etc.) and/or on the user device (e.g., by vibrating the user device).

In some cases, an option can be output to allow the user to accept or decline the transition of the wireless network access functionality to the user device communication unit. In one example, selectable option can be displayed on a display in the vehicle and/or on a display of the user device. In another example, a message can be output as audio using one or more speakers of the vehicle and/or using one or more speakers of the user device. The user can provide input indicating whether the user accepts or declines transfer of the wireless network access functionality to the communication unit of the user device. The input can include a touch input (e.g., by selecting the message displayed on a touch screen display), voice input, gesture-based input, input based on a physical or mechanical control mechanism of the vehicle (e.g., as part of the infotainment system 454), and/or using another type of input. In the event the user accepts the functionality transfer, the vehicle can transmit the instruction to the user device to use the communication unit of the user device to perform the wireless network access functionality.

In some examples, the vehicle can transition the wireless network access functionality to the user device communication unit without first outputting a notification indicating that the wireless network access functionality is going to be transitioned to the user device communication unit. In such cases, once the thermal level 614 is reached, the vehicle can transition the wireless network access functionality from the communication unit of the vehicle to the communication unit of the user device.

In some examples, the vehicle can perform other operations according to mitigation level 615, such as flow control. The vehicle can perform flow control by reducing or stopping certain operations that are performed by the communication unit of the vehicle. As noted above, the vehicle can use the load determined by the thermal mitigation system to determine any functions that are being performed by the communication unit. For example, the vehicle can use the load to determine whether to reduce and/or stop the communication unit of the vehicle from performing certain operations. In one illustrative example using a modem as an example of a communication unit of the vehicle, the control system 452 and/or the communications system 458 can cause the modem to change a modulation scheme being used to a less complex (and thus less compute-intensive) modulation scheme, such as switching from between 256 Quadrature Amplitude Modulation (256 QAM) modulation scheme to a 64 QAM modulation scheme. In another example, the communications system 458 can switch from using a 5G modem (e.g., modem 464 or other modem of the communications system 458 of FIG. 4) to using a 4G modem (e.g., modem 464 or other modem of the communications system 458 of FIG. 4).

If the temperature of the vehicle communication unit is reduced below the thermal level 614, the vehicle and/or the user device can transition the network access functionality back to the vehicle. For example, the vehicle can send an instruction or notification to the user device indicating that the communication unit of the vehicle can perform the network access functionality. The user device can automatically stop performing the network access functionality and/or can output a selectable option to the user which can allow the user to accept or decline transfer of the network access functionality to the vehicle.

Transitioning the network access functionality from the vehicle to the user device can provide various advantages. For example, transition of the network access functionality from the vehicle to the user device can reduce resource usage by the communications system of the vehicle (e.g., communications system 458), enabling the communications system to continue providing mission critical or high priority services, such as V2x, eCall, and/or other high priority service. The communication system will also be able to remain functional for a longer duration under higher temperatures (e.g., temperatures greater than the thermal level 614). Transitioning the network access functionality from the vehicle to the user device can also provide continuous service for the user, thus avoiding abrupt service interruptions (e.g., avoiding the disruption of a phone call, media being presented by an infotainment system of the vehicle, etc.). As noted above, an infotainment system of the vehicle (e.g., infotainment system 454) can continue to output content when the network access functionality is transitioned from the communication unit of the vehicle to the communication unit of the user device.

The thermal mitigation system can also determine whether a temperature, such as an ambient and/or junction temperature, of the communication unit of the vehicle has reached thermal level 616 and thus that the temperature is greater than or equal to the second temperature threshold. Based on the temperature being greater than or equal to the second temperature threshold, the vehicle (e.g., the communication unit or other component of the vehicle computing system) can perform operations according to mitigation level 617. According to mitigation level 617, the vehicle (e.g., the communication unit or other component of the vehicle computing system) can reduce and/or transition V2X functionality from the communication unit of the vehicle to the communication unit of the user device. For instance, as described below, the duty cycle of V2X messaging (e.g., the transmission and/or reception rate of V2X messages) can be reduced before fully transitioning the V2X functionality to the user device.

Figure 7:
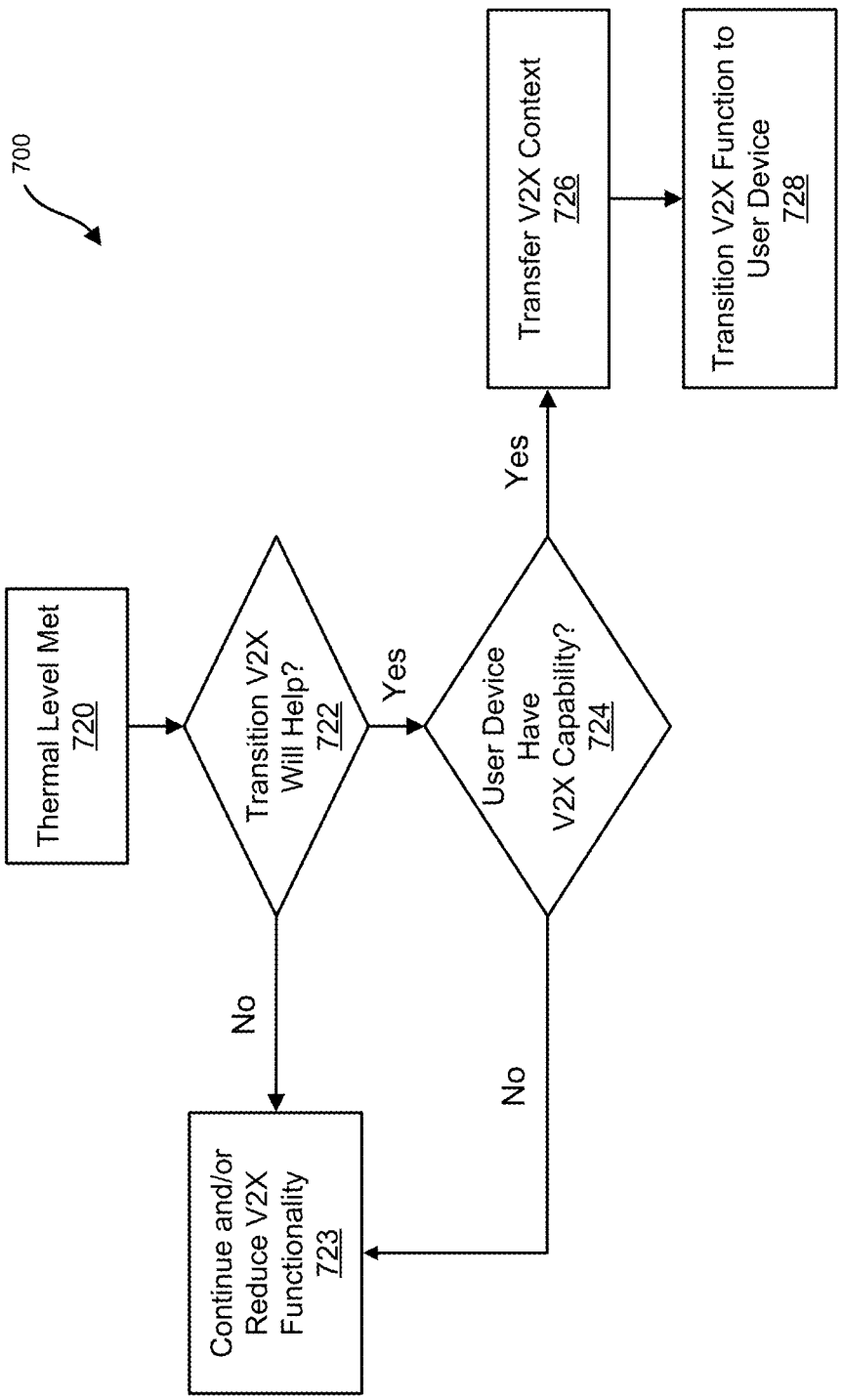
FIG. 7 is a flow diagram illustrating an example of a process for transitioning vehicle-to-everything (V2X) functionality, according to aspects of the disclosure.

FIG. 7 is a flow diagram illustrating an example of a process 700 for transitioning V2X functionality from the communication unit of the vehicle to the communication unit of the user device. At operation 720, the thermal mitigation system can monitor the thermal level (e.g., by continuously or periodically checking the ambient and/or junction temperature) of the communication unit and can determine that the thermal level 616 has been reached or met. In one illustrative example, the thermal mitigation system can determine at operation 720 that the temperature of the communication unit has reached a temperature of 105° C.

At operation 722, the vehicle (e.g., the communications system 458) can determine whether transitioning the V2X service to the user device will help reduce the resource usage of the communication unit. Various factors can be used to determine whether transferring the V2X functionality to the user device will reduce resource usage. In one example, the vehicle can determine a number of V2X messages (e.g., V2V, V2I, and/or V2P messages) that are being received and/or that have been received over a certain period of time (e.g., over the last hour, thirty minutes, fifteen minutes, etc.). In another example, the vehicle can determine a number of other vehicles in the vicinity of the vehicle (e.g., within a one mile radius, a two mile radius, a five mile radius, etc.), which can indicate a likelihood of the number of V2X messages that will be received. In some cases, one or more sensors (e.g., the one or more sensor systems 456) can be used to determine a number of vehicles around the vehicle. For instance, one or more cameras, GPS sensors, IMUs, LIDAR sensors, RADAR sensors, infrared sensors, and/or other sensors can be used to detect the presence of other vehicles around the vehicle. In such examples, if there are a low number of messages that have been received and/or there are a low number of vehicles in the vicinity of the vehicle (indicating that few V2X messages will likely be received), the vehicle can determine at operation 722 that transitioning the V2X functionality will not be helpful in reducing the load of the communication unit. At operation 723, the vehicle communication unit can continue to perform the V2X functions and/or can reduce the V2X functions performed by the vehicle (as described in more detail below). In some cases, operation 723 can include performing additional flow control, such as by changing to a less complex modulation scheme, transitioning from using a 4G modem to using a 3G modem, and/or performing other flow control techniques.

In the event the vehicle determines that there are a high number of messages that have been received and/or there are a large number of vehicles in the vicinity of the vehicle (indicating numerous V2X messages will likely be received), the vehicle can determine at operation 722 that transitioning the V2X functionality will help meaningfully reduce the resource usage by the communication unit. At operation 724, the vehicle can determine whether the user device has the capability to perform V2X functions. For example, the vehicle can check whether the user device has the capability to perform security related V2X functions (e.g., whether the user device is equipped with a hardware security module (HSM), has valid certificates used for signing V2X messages, is able to verify the signature of received V2X messages, etc.), whether the user device supports PC5 sidelink communications (or communications over another device to device direct interface, such as a DSRC interface), and/or other V2X related requirements. In some cases, the communications system 458 (which can include a TCU NAD in some cases) can communicate with the user device to check whether the user device has the capability to perform V2X functions. In one illustrative example, the communications system 458 can send a message (e.g., over a PC5 interface, WiFi interface such as DSRC, Bluetooth™ interface, wired interface, etc.) requesting the user device to indicate whether the user device has V2X functionality. In response, the user device can send a reply message indicating that the user device does or does not have V2X functionality. If the vehicle determines that the user device does not have V2X functionality, at operation 723, the communication unit can continue to perform the V2X functions and/or can reduce the V2X functions performed by the vehicle.

In the event the vehicle determines that the user device has V2X functionality, the vehicle can transition the V2X functionality from the communication unit of the vehicle to the communication unit of the user device. In some cases, the vehicle can send a notification to the user device indicating that V2X transfer is to be performed. In some cases, the user can be provided with an option to accept or decline the V2X transfer to the user device. At operation 726, the communications system 458 of the vehicle can transfer a V2X context to the user device. In some examples, the V2X context can include a vehicle identifier (ID) of the vehicle (e.g., a temporary ID assigned by the ITS 455), car access network (CAN) information, infotainment system information, a security context of the vehicle (described above), and/or other information. The V2X context allows the user device to act as a V2X proxy device for the vehicle by transmitting and receiving V2X messages for the vehicle. For example, the vehicle ID can be included in a message to identify that the message is being transmitted by the user device for the vehicle. As described above, the CAN information can include vehicle related information, such as a heading of the vehicle, speed of the vehicle, breaking information, etc. The CAN information can be continuously or periodically (e.g., every 1 millisecond (ms), every 10 ms, or the like) provided to the user device, and can be used by the user device to determine when to generate one or more V2X messages and/or when to perform one or more V2X-based operations. The infotainment information can be used, for example, to allow the user device to output certain notifications to the infotainment system (e.g., using one or more displays, speakers, and/or other output devices of the infotainment system).

At operation 728, the vehicle transitions the V2X functions from the communication unit of the vehicle to the communication unit of the user device. For example, the user device can start receiving V2X messages from other vehicles, pedestrian user devices, and/or infrastructure systems that are within communication range of an antenna of the user device. The user device can switch from a "pedestrian" profile (e.g., used for vehicle-to-pedestrian (V2P) communications) to a "vehicle" profile before starting to send V2X messages on behalf of the vehicle. In some cases, the "vehicle" profile can include the V2X context information described above. By using the "vehicle" profile, the user device can send V2X messages that will be recognized by other vehicles, pedestrian user devices, and/or infrastructure systems as being related to the vehicle. Once the transition is complete, the communication unit of the vehicle can stop transmitting V2X messages and the communication unit of the user device can begin transmitting V2X messages to vehicles, pedestrian user devices, and/or infrastructure systems that are within communication range of the antenna of the user device. The user device can also perform security-based V2X operations, such as verifying (e.g., decrypting) V2X messages received from other vehicles, determining operations to perform based on verified messages (e.g., lane change negotiation with other vehicles, triggering a displayed message alerting a driver to stop the vehicle, etc.), among other functions.

In some examples, a graded or gradual transitioning of the V2X functionalities can be performed from the vehicle to the user device. The level of V2X functionality transfer can depend on a current thermal level or temperature of the communication unit of the vehicle (e.g., more V2X functionality can be transferred to the user device when higher temperatures are detected), a current and/or anticipated number of V2X messages received by the vehicle (e.g., based on a number of V2X messages recently received and/or currently being received, based on a number of other vehicles in the vicinity of the vehicle, based on whether the vehicle is moving or is periodically stopping, etc.), among other factors.

In one example, a minimum level of V2X functionality that can be transitioned to the user device at operation 728 can include only V2X modem functionalities. The modem functionalities can include transmitting and/or receiving V2X messages. For example, by transferring only the V2X modem functionalities to the user device, the vehicle communication unit can generate V2X messages and send the V2X messages to the user device for transmission to other vehicles, pedestrian user devices, and/or infrastructure systems. The user device can also receive V2X messages from other vehicles, pedestrian user devices, and/or infrastructure systems, and can send the received V2X messages to the vehicle communication unit for processing.

A moderate level of V2X functionality that can be transitioned to the user device at operation 728 can include the V2X modem functionalities and V2X security verification functionalities. For example, in addition to receiving and transmitting the V2X messages to and from other vehicles, pedestrian user devices, and/or infrastructure systems, the communication unit of the user device can perform verification of the received V2X messages. The verification can require a large amount of processing, such as using a large amount of processing resources (e.g., digital signal processor (DSP) cores and/or advanced reduced instruction set computer (RISC) Machine (ARM) cores) for verifying messages. Due to the large amount of processing required for verification, transitioning the verification functionality from the vehicle to the user device can offload a large amount of computing resources needed by the communication unit of the vehicle. In some cases, a secure handshake can be required between the communication unit of the vehicle and the communication unit of the user device before the communication unit of the user device can begin V2X message verification.

A full level of V2X functionality that can be transitioned to the user device at operation 728 can include all V2X functionalities. For example, a full set of V2X functionalities can include the modem functionalities, the V2X security verification functionalities, security signing functionalities, and intelligent transportation systems (ITS) stack functionalities. The security signing functionalities can include signing V2X messages before they are transmitted to other vehicles, pedestrian user devices, and/or infrastructure systems. The signature can allow the V2X messages to be securely sent and verified only by approved devices. The ITS stack functionalities can include determining safety-related and/or other operations to perform, as described above. For instance, the operations can include causing the vehicle (e.g., the control system 452) to perform automatic functions (e.g., automatic breaking, automatic steering such as to maintain a heading in a particular lane, automatic lane change negotiation with other vehicles, etc.), triggering display of a message alerting a driver that another vehicle is in the lane next to the vehicle, triggering display of a message alerting the driver to stop the vehicle, triggering display of a message alerting the driver that a pedestrian is in an upcoming cross-walk, triggering display of a message alerting the driver that a toll booth is within a certain distance (e.g., within 1 mile) of the vehicle, among others. When the full level of V2X functionality is transitioned to the communication unit of the user device, the user device can use the vehicle infotainment system (e.g., for displaying and/or outputting security-related messages, operational-related messages, and/or other information via one or more displays and/or speakers) and/or can use a display and/or speaker of the user device.

As noted above, in some implementations the vehicle can reduce the V2X functionality of the vehicle communication unit based on the communication unit reaching or exceeding a particular temperature threshold (e.g., a threshold associated with thermal level 616). For example, the V2X functionality of the vehicle communication unit can be reduced before transitioning some or all of the V2X functionality to the user device. In other examples, the V2X functionality of the vehicle can be reduced in response to determining at operation 722 that transitioning the V2X service to the user device will not help reduce the resource usage of the vehicle communication unit and/or in response to determining at operation 724 that the user device does not have V2X capability. Reducing the V2X functionality of the vehicle can lower the amount of computing resources needed by the communication unit to perform the V2X operations.

In some cases, the V2X functionality can be reduced by reducing the duty cycle of V2X messaging. For instance, using the modem 464 as an example of the vehicle communication unit (where the modem 464 can be used for transmitting and receiving V2X messages), the communications system 458 can dynamically change the V2X duty cycle of the modem 464 to reduce the thermal impact of the V2X operations on the modem 464.

The V2X duty cycle refers to the transmission rate at which the vehicle communication unit transmits V2X messages and/or the processing rate at which the communication unit processes V2X messages received from other vehicles, pedestrian user devices, and/or infrastructure systems. In one illustrative example, a V2X transmission duty cycle (or transmission rate) during normal operation conditions (e.g., for temperatures within the normal operating thermal range 612) can be 10 hertz (Hz), in which case the communication unit of the vehicle sends 10 V2X message every second. In another illustrative example, a V2X reception duty cycle (or processing rate) during normal operating conditions can be 100%, in which case the vehicle listens for messages 100% of the time and/or processes all received messages. In the event the communication unit of the vehicle reaches or exceeds a temperature threshold (e.g., thermal level 616), various factors can be used to determine how to adapt the V2X duty cycle (e.g., the transmission rate, message processing rate, etc.) to reduce the thermal impact of the V2X operation. In some implementations, the vehicle can reduce the V2X duty cycle regardless of a current temperature of the communication unit, such as when in the normal operating thermal range 612 or when any of the thermal levels 614-618 (or other thermal level) are reached. The duty cycle can be reduced to any suitable amount. In one illustrative example, the transmission duty cycle can be reduced from 10 Hz to 5 Hz. In another illustrative example, the reception duty cycle can be reduced from 100% to 50%, in which case the vehicle listens for messages half of the time.

The factors used to determine whether to reduce the V2X duty cycle can be based on a demand for V2X messages, a reliability of a position determined for the vehicle, an ability of the vehicle to maintain certain distances from other vehicles (e.g., ten feet, fifteen feet, twenty feet, or other distance), whether the vehicle is stopped, whether the vehicle is periodically stopping within a period of time (e.g., in a stop-and-go scenario, such as when in heavy traffic), whether the vehicle is moving at a particular speed, a confidence level of sensor data (e.g., a confidence level in an object detected by one or more cameras of the vehicle), among other factors. For instance, the factors described above for determining whether transferring the V2X functionality to the user device will reduce resource usage can also be used for determining when to reduce the V2X messaging duty cycle. As described above, such factors can include a number of V2X messages (e.g., V2V, V2I, and/or V2P messages) being received and/or that have been received over a period of time, a number of other vehicles in the vicinity of the vehicle, and/or other factors. For example, the one or more sensor systems 456 can be used to determine that vehicle is driving in an area where there are few vehicles (e.g., less than one hundred in a one mile radius, or other number). In another example, the vehicle can determine that it is in a stop-and-go scenario where the vehicle is stopped or is not moving at high speeds. In such cases, less messages can be generated and sent (e.g., by the ITS 455 of the vehicle computing system 450) due to the reduced need to communicate with other vehicles, pedestrian user devices, and/or infrastructure systems.

In some examples, the duty cycle can be increased after being decreased based on one or more of the factors described above, such as when more vehicles are detected around the vehicle, when the speed of the vehicle increases, when an increase in incoming V2X messages (e.g., from other vehicles, from pedestrian UE devices, and/or from infrastructure systems), and/or in other scenarios. In one illustrative example, a semi-truck can be detected (e.g., based on object detection and/or recognition) in one or more images captured by a front-facing camera on the front of the vehicle. In a subsequent image captured by the front-facing camera, the truck may not be detected, resulting in a reduction in confidence level of the object detection and/or recognition. In response to the drop in confidence level, the duty cycle can be increased (e.g., from 5 Hz to 10 Hz) in order to exchange more V2X messages with the truck and/or other vehicles in the vicinity of the vehicle.

In some examples, various frequencies within a duty cycle range can be selected for V2X operations based on the various factors. For example, when the various factors indicate that a high number of messages needs to be transmitted (e.g., there are one thousand or more vehicles in the vicinity of the vehicle), the transmission duty cycle can be set to 10 Hz. In the event the demand for the number of messages is reduced to a small amount (e.g., there are less than 10 vehicles in the vicinity of the vehicle), the transmission duty cycle can be reduced to 2 Hz. If the demand is then increased by a certain amount (e.g., there are one hundred to five hundred vehicles in the vicinity of the vehicle), the transmission duty cycle can be increased to 5 Hz. Using such techniques, the transmission and/or reception duty cycle of the V2X messaging can be dynamically adjusted based on the various factors described herein.

As noted above, in some cases the vehicle can reduce the V2X duty cycle at any time without requiring a temperature threshold to be met (e.g., when in the normal operating thermal range 612 or when any of the thermal levels 614-618 or other thermal level are reached). For instance, the vehicle can reduce the V2X duty cycle when in a stop-and-go scenario, based on a number of V2X messages (e.g., V2V, V2I, and/or V2P messages) being received and/or that have been received over a period of time, based on a number of other vehicles in the vicinity of the vehicle, and/or other factors.

In the event the temperature of the vehicle communication unit is reduced below the thermal level 616, the vehicle and/or the user device can transition (e.g., immediately or gradually similar to that described above) the V2X functionality back to the vehicle.

Transitioning some or all of the V2X functionality from the vehicle to the user device provides various benefits. For example, V2X allows the vehicle to perform safety-related operations and other operations (e.g., triggering one or more alerts to a driver of the vehicle, causing the vehicle to perform automatic functions such as automatic breaking, etc.). If V2X operations are suspended at higher temperatures (e.g., greater than thermal level 616), the safety and operation of the vehicle and other vehicles can be jeopardized. Transitioning of some or all the V2X functionality from the vehicle to the user device can allow the safety-related and other operations to be performed even in view of higher temperatures. A V2X-enabled user device should be able to continue V2X operation in case of emergency shutdown of the communication system, modem, and/or other communication unit of the vehicle, as user devices are typically in a less harsh environment (e.g., inside of the vehicle) as compared to that of the vehicle. Further, the user device can indicate to nearby vehicles that the user device is being used as a V2X proxy device for the vehicle, which can provide any required notification to other vehicles.

In some cases, the thermal mitigation system can determine whether a temperature (e.g., the ambient and/or junction temperature) of the vehicle communication unit has reached thermal level 618 and thus that the temperature is greater than or equal to the third temperature threshold. In response to the temperature being greater than or equal to the third temperature threshold, the vehicle (e.g., the communication unit or other component of the vehicle computing system) can perform operations according to mitigation level 619. According to mitigation level 619, the vehicle (e.g., the communication unit or other component of the vehicle computing system) can transition all remaining services or functionalities to the communication unit of the vehicle except one or more emergency services, such as eCall. In some examples, the vehicle can transfer certain emergency services or functionalities, such as eCall, when certain conditions occur. In one illustrative example, the vehicle can transfer eCall or other emergency services to the communication unit of the user device when the power management system 451 (e.g., a PMIC) shutdown is to be performed. While examples are described herein using eCall as an example of an emergency service, one of ordinary skill will appreciate that other emergency services and/or functionality can be transitioned according to the techniques described herein.

Figure 8:
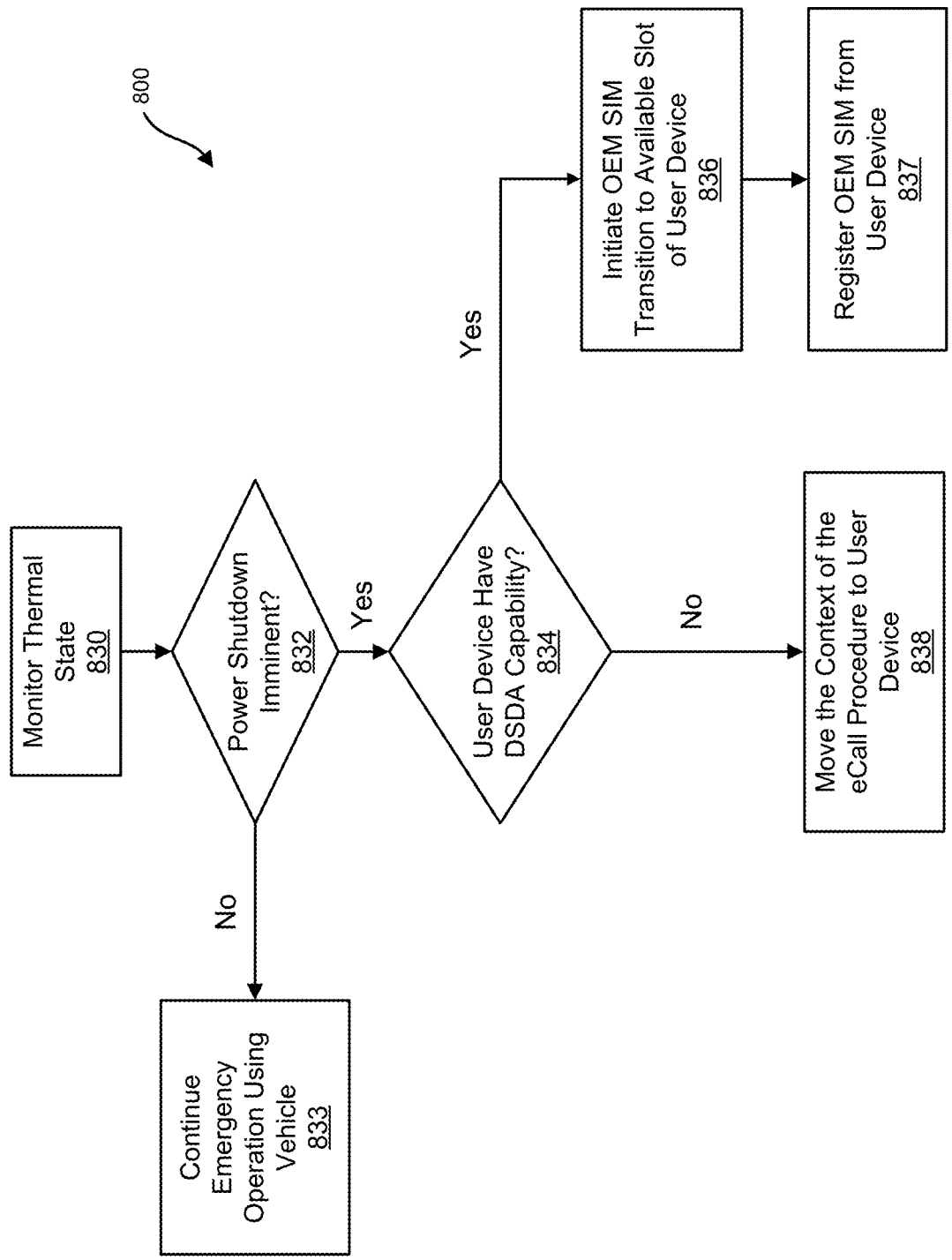
FIG. 8 is a flow diagram illustrating an example of a process for transitioning emergency functionality, according to aspects of the disclosure.

FIG. 8 is a flow diagram illustrating an example of a process 800 for transitioning emergency functionality from the communication unit of the vehicle to the communication unit of the user device. At operation 830, the thermal mitigation system can continuously or periodically monitor the thermal level of the vehicle communication unit and can determine that the thermal level 618 has been met or exceeded. At operation 832, the thermal mitigation system can determine if shutdown of the power management system (e.g., power management system 451, which can include a PMIC) is imminent. In one illustrative example, the power management system 451 can have a maximum operating temperature of 120° C., after which the power management system 451 will shut down. The thermal mitigation system can determine that the temperature of the communication unit is within a threshold temperature range (e.g., 5° C.) of the maximum operating temperature (e.g., the communication unit has reached a temperature of 115° C.) and is thus close enough to the 120° C. maximum operating temperature that shutdown of the power management system 451 is imminent. In the event the thermal mitigation system determines at operation 832 that power shutdown is not imminent (e.g., the communication unit is less than the thermal level 618, is not within the threshold temperature range of the maximum operating temperature of the power management system 451, etc.), the vehicle can continue performing the emergency operations at operation 833. For example, the OEM SIM 460 of the communications system 458 can continue performing the emergency operations.

If the thermal mitigation system determines at operation 832 that power shutdown is imminent, the vehicle can check at operation 834 whether the user device has DSDA capability (e.g., whether the user device can host the OEM SIM services, such as eCall, in addition to the user SIM services). For instance, the vehicle communications system 458 can communicate with the user device to check the DSDA capability of the user device. In one illustrative example, the communications system 458 can transmit a message to the user device requesting the user device to indicate to the vehicle whether the user device has DSDA functionality. In response, the user device can send a reply message indicating that the user device does or does not have DSDA functionality.

If the vehicle determines that the user device has DSDA functionality and can thus host the OEM SIM services, OEM SIM transition to an available slot of the user device can be initiated at operation 836. In one illustrative example, the vehicle can transfer the OEM SIM profile (e.g., including OEM SIM context) over a communications link or interface (e.g., a WiFi interface, Bluetooth™ interface, wired interface, etc.) to the user device. In another example, the OEM SIM can be physically placed into a physical slot of the user device.

At operation 837, the communication unit of the user device can register the OEM SIM from the user device. The registration can be performed so that the user device can act as a proxy device for the vehicle and so that any eCall made using the eCall service can be recognized as coming from the vehicle and not from the user device. For example, the OEM SIM context of the OEM SIM profile can be transferred to the user device, so that an OEM application (e.g., installed on the vehicle and/or the user device) can communicate with the user device to initiate an eCall or other emergency service. The OEM application can include an eCall application or other application (e.g., executed by an application processor of the vehicle) that can be used to perform the emergency functionality. For example, the OEM application can have a graphical user interface, which can display an option to a user to make an eCall or perform any other emergency function. In some examples, the OEM application can place an eCall (or perform any other emergency function) automatically without user input, such as in response to detecting an accident has occurred. The OEM SIM context can include one or more public safety answering point (PSAP) addresses (which can be used to route a call to an emergency center, such as a police station dispatcher), a vehicle identification number (VIN) of the vehicle that is registered with the eCall service, CAN information, and/or other information. The OEM SIM context information can be used by the user device to make the eCall (e.g., by dialing an PSAP address) and/or used to identify the vehicle as the source of a call made according to the eCall service.

If the vehicle determines that the user device does not have DSDA functionality, the process 800 can move the context of the eCall procedure to the user device at operation 838. For example, the vehicle can send certain information associated with the OEM SIM context (e.g., one or more PSAP addresses, etc.) to the user device at operation 838. For instance, the communication unit of the vehicle can initiate a transfer of the context (e.g., a PSAP address, etc.) to the communication unit of the user device so that a modem (e.g., a modem 576) of the user device can place an eCall using the eCall context (e.g., using the PSAP address).

An eCall can be made using different techniques. For example, a user can manually place an eCall, such as by using a user interface of the vehicle (e.g., a graphical user interface of an infotainment system of the vehicle). In another example, the vehicle can automatically place an eCall. For instance, the vehicle can detect (e.g., using the one or more sensor systems 456) that it has been in an accident and can place the call automatically in response to detecting the accident. If the thermal level 618 is reached or exceeded and the eCall functionality is transferred to the user device, the user can manually place an eCall and/or the user device can use one or more sensor systems of the user device to detect an emergency situation (e.g., an accident) and can automatically place the eCall. The one or more sensor systems can include external sensors that are in communication with the user device (e.g., an XR device, a wearable such as a smart watch, etc.) and/or internal sensors of the user device (e.g., one or more accelerometers, gyroscopes, magnetometers, GPS sensors, proximity sensors, IMUs, ambient light sensors, microphones, etc.).

If the temperature of the vehicle communication unit falls below the thermal level 618, the vehicle and/or the user device can transition the emergency functionality back to the vehicle (e.g., by transferring the OEM SIM back to the slot of the vehicle, by transferring the eCall context back to the vehicle, etc.).

Transitioning the emergency services (e.g., eCall) from the vehicle to the user device can allow the emergency services to continue using the user device even in high temperature situations (e.g., in a hot environment, when an accident occurs, among other situations). For instance, eCall is an important safety feature and it can be critical to provide uninterrupted eCall support. In certain situations (e.g., in extreme heat situations, when a serious accident occurs, and/or other situations when the power management system is shut down), a modem used for emergency services can be shut down and the eCall service will not be available. Transitioning the eCall service and/or other emergency services from the communication unit of the vehicle to the communication unit of the user phone can provide the necessary redundancy so that the emergency services can continue.

As noted above, the various thermal levels and mitigation levels described with respect to FIG. 6 are provided for illustrative purposes. Other mitigation techniques can be performed based on thermal levels other than those shown in FIG. 6. For instance, in an alternative example, a thermal mitigation framework can reduce and/or transition V2X functionality from the vehicle to the user device once the thermal level 614 is reached instead of waiting until thermal level 616 is reached. In another example, the vehicle can prioritize wireless network access functionality over V2X operations in some cases. In such cases, the vehicle can reduce V2X functionality and/or transition the V2X functionality from the vehicle to the user device once the thermal level 614 is reached, and can transition wireless network access functionality to the user device once the thermal level 616 is reached.

In some cases, the vehicle can stop using or can shut down certain systems in response to detecting that the communication unit has reached a certain thermal level. For example, the power management system 451 and/or the infotainment system 454 of the vehicle computing system 450 can shut down one or more displays upon receiving an indication that the communication unit of the vehicle has reached or is within a threshold range of reaching thermal level 614. In some cases, the systems can be shutdown prior to transitioning one or more of the functionalities described above from the vehicle to the user device.

In some examples, various other temperature thresholds in addition to those shown in FIG. 6 can be used to determine when to perform certain operations. For instance, one or more additional temperature thresholds can be associated with one or more thermal levels between the thermal level 616 and the thermal level 618. In one illustrative example, the thermal level 616 can be used as a temperature threshold to determine when to reduce V2X functionality and/or to stop using certain systems of the vehicle (e.g., one or more systems associated with the infotainment system 454, such as one or more displays, a navigation system, and/or other systems). An additional temperature threshold (not shown in FIG. 6) can be associated with a thermal level between the thermal level 616 and the thermal level 618. The additional temperature threshold can be used to trigger a transition of the V2X functionality from the communication unit of the vehicle to the communication unit of the user device.

In some examples, the vehicle can perform certain operations before a temperature threshold is actually reached. For instance, the thermal mitigation system can determine that a temperature of the communication unit of the vehicle is approaching a particular thermal level, such as thermal level 614, thermal level 616, or thermal level 618. In one example, the thermal mitigation system can determine that the temperature is within a threshold temperature range (e.g., within 10° C.) of one of the thermal levels. Other factors can also be considered, such as an ambient temperature outside of the vehicle, an operating temperature of the vehicle, etc. In response to determining the temperature of the communication unit of the vehicle is within a threshold temperature range of a particular thermal level, the vehicle can begin performing flow control, transferring certain functions (e.g., wireless network access functionality, V2X functionality, etc.), reducing certain functions (e.g., V2X functionality, etc.), and/or perform other operations.

In some examples, a change in temperature within a period of time can be used as a trigger to reduce certain functionalities and/or transition one or more functions to a user device. For instance, a vehicle can reduce certain functionalities and/or can transition one or more functions in response to detecting when a particular change in temperature has occurred within a period of time. In one example, the vehicle computing system 450 can determine that the communications system 458 has experienced an increase of 5 degrees Celsius within a period of one hour. In response to determining the increase in temperature, the vehicle computing system 450 can reduce certain functionalities and/or can transition one or more functions to a user device. By monitoring the change in temperature, the vehicle can preemptively reduce the temperature in order to prevent the components of vehicle from overheating.

In some implementations, a temperature of a particular communication unit of the vehicle can be measured and used to determine when to reduce and/or transfer the functionality of a different communication unit of the vehicle to a user device. In one illustrative example, a temperature of a TCU (e.g., the communications system 458) can be monitored and used to determine when to reduce and/or transfer the functionality of one or more other communication units of the vehicle, such as one or more modems (e.g., a cellular modem for wireless network access functions and/or eCall functions, a V2X modem for V2X communications, etc.), one or more SIMs, and/or other communication unit of the vehicle, to one or more communication units (e.g., a modem, SIM, etc.) of the user device.

While examples provided herein describe transitioning functionalities from a vehicle to a user device, the systems and techniques described herein may be used to transition functionalities between other types of devices based on one or more temperature thresholds and/or based on other factors (e.g., humidity, amount of light exposure, etc.). In some examples, a vehicle can transition one or more communication functions to a road side unit (RSU) and/or to another vehicle. In one illustrative example, the vehicle can temporarily transition the one or more communication functions to the RSU (e.g., transitioning V2X functions over a PC5 interface, over a DSRC interface, or over another type of communications interface) as the vehicle is traveling along a road. In some cases, the vehicle can request that the RSU process relevant information received for the vehicle and to transmit notifications or urgent notifications to the vehicle. In such an example, the vehicle can reduce its processing load, such as by not processing all of the V2X messages and/or listening for messages from a direct communication from the RSU. By reducing its processing load, a computing system (e.g., vehicle computing system 450) or a component of the computing system (e.g., a communication unit) of the vehicle can cool down. Once the computing system or the component of the computing system cools below a particular threshold, the vehicle can begin performing the functions and/or can request that the RSU transition the one or more communication functions back to the vehicle. A similar process can be performed for transitioning functionality from a vehicle to another vehicle.

While the examples described herein use temperature as an example of a characteristic or factor of a communication unit of a vehicle (or other device) that can trigger when to reduce and/or transition different functionalities from the vehicle to another device (e.g., a user device), other characteristics or factors can be used to trigger reduction and/or transition of the functionalities. Examples of characteristics or factors include humidity of a communication unit, an amount of light exposed to a communication unit, an amount of ventilation for a communication unit (e.g., when a ventilation mechanism such as a vent becomes blocked), any combination thereof, and/or other characteristics or factors.

Figure 9:
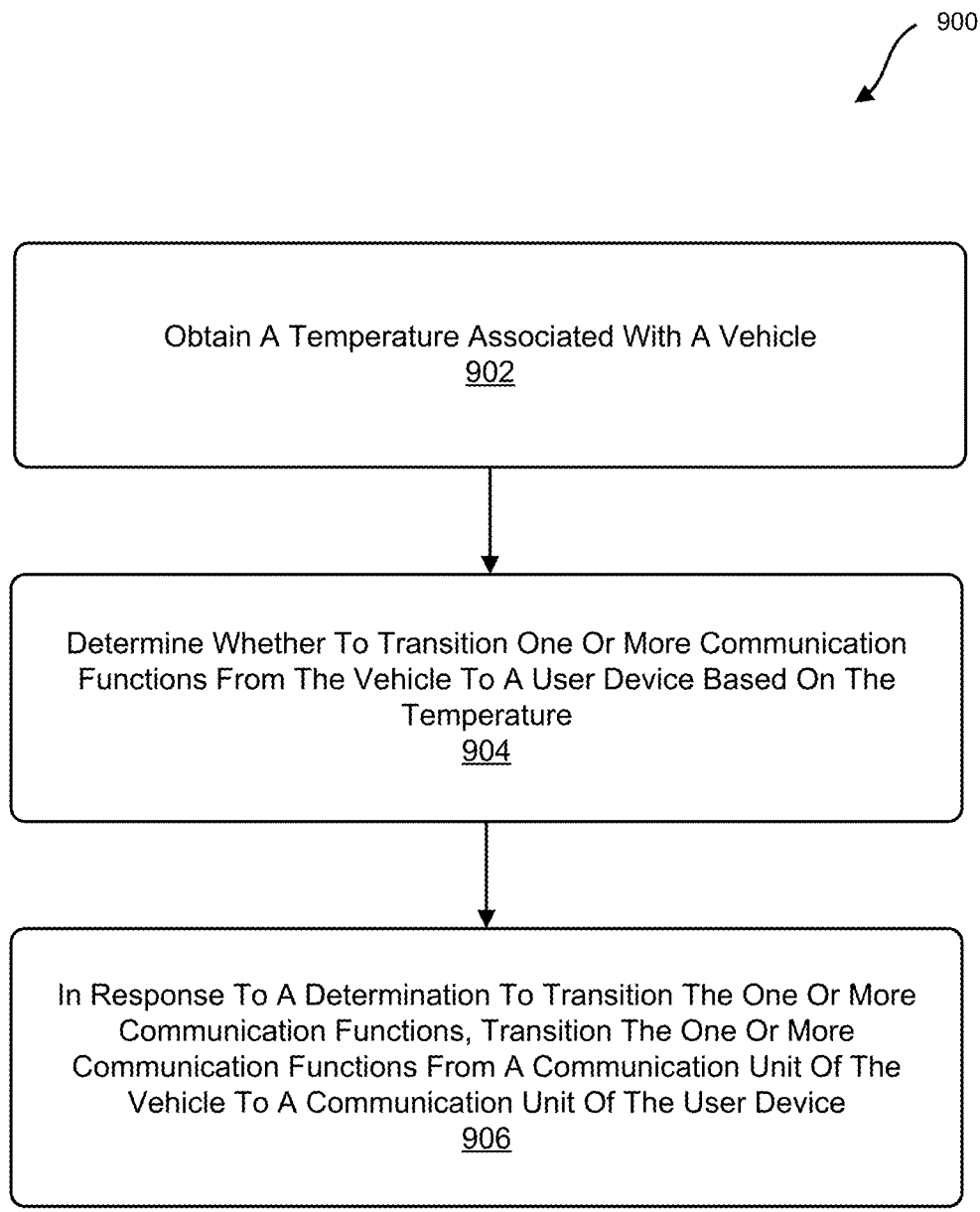
FIG. 9 is a flow diagram illustrating an example of a process for thermal mitigation, according to aspects of the disclosure.

FIG. 9 is a flow diagram illustrating an example of a process 900 for performing thermal mitigation using one or more of the techniques described herein. At operation 902, the process 900 includes obtaining a temperature associated with a vehicle. In some examples, the temperature can be of a communication unit of the vehicle (e.g., a communications system such as a telematics control unit, a modem, or other communication unit) or of multiple communication units of the vehicle. In some examples, the temperature can include an ambient temperature and/or a junction temperature.

At operation 904, the process 900 includes determining whether to transition one or more communication functions from the vehicle to a user device based on the temperature. For example, the process 900 can include determining whether the temperature is greater than a temperature threshold and/or determining whether the temperature is approaching (e.g., is within a threshold temperature range, such as within 5° C., 10° C., or the like).

At operation 906, in response to a determination to transition the one or more communication functions, the process 900 includes transitioning the one or more communication functions from a communication unit of the vehicle to a communication unit of the user device. For example, the process 900 can include transitioning the one or more communication functions from the communication unit of the vehicle to the communication unit of the user device in response to a determination that the temperature is greater than the temperature threshold. In some cases, the process 900 can include transitioning the one or more communication functions from the communication unit of the user device to the communication unit of the vehicle based on a reduction of the temperature. For example, the process 900 can include obtaining an additional temperature associated with the vehicle (e.g., the communication unit or another communication unit of the vehicle), and determining the additional temperature is less than the temperature threshold. In response to a determination that the additional temperature is less than the temperature threshold, the process 900 can transition the one or more communication functions from the communication unit of the user device to the communication unit of the vehicle.

In some examples, in response to the determination to transition the one or more communication functions, the process 900 can include transitioning one or more additional functions from an additional communication unit (e.g., a second communication unit) of the vehicle to the user device.

In some implementations, the communication unit of the vehicle is a telematics control unit (TCU), which in one illustrative example can include the components of the communications system 458 or can be a component of the communications system 458. For instance, in some cases, the TCU includes at least one of a network access device (NAD), one or more subscriber identity modules (SIMs), one or more modems, any combination thereof, and/or other components or devices. In some implementations, the communication unit of the vehicle is a modem. In some implementations, the communication unit of the user device is a modem. In some cases, the communication unit for which the temperature is measured is the same communication unit from which the one or more communication functions are transitioned. In one illustrative example, the temperature can be determined for a modem of the vehicle, and the modem functionality (e.g., wireless network access functionality, V2X functionality, eCall functionality, etc.) can be transitioned from the modem of the vehicle to a modem of the user device in response to the temperature of the vehicle modem being greater than a temperature threshold. In some cases, the communication unit for which the temperature is measured is different than the communication unit from which the one or more communication functions are transitioned. In one illustrative example, the temperature can be determined for a TCU NAD of the vehicle, and modem functionality can be transitioned from a modem of the vehicle to a modem of the user device in response to the temperature of the vehicle modem being greater than a temperature threshold.

In some examples, the process 900 includes receiving, from the communication unit of the user device, a request to perform at least one communication function of the one or more communication functions for the communication unit of the user device. For example, as described above, the user device can connect with the vehicle over a communications interface (e.g., over WiFi™ such as DSRC or other WiFi interface, Bluetooth™ such as BLE or other Bluetooth interface, PC5, USB port, lightning port, and/or other wireless or wired interface), and can send a request to the vehicle requesting that the vehicle perform one or more functions (e.g., wireless network access functionality) for the user device. Once the request is approved or accepted by the vehicle, the communication unit of the user device can transfer the at least one communication function to the communication unit of the vehicle. The communication unit of the vehicle can then begin performing the at least one communication function (e.g., the wireless network access functionality to provide wireless network access for the user device). In such examples, operation 906 of the process 900 can include transitioning the at least one communication function from the communication unit of the vehicle to the communication unit of the user device.

In some cases, the process 900 can include receiving, from the communication unit of the user device, data based on the one or more communication functions performed by the communication unit of the user device. The process 900 can output the data using an output device of the vehicle. In one illustrative example, the user device can obtain media data from a communication network service provider, and can send the media data to an infotainment system (infotainment system 454) of the vehicle for display on a display of the vehicle. The data can be received by the communication unit of the user device over a communication interface or link (e.g., a WiFi™ interface such as DSRC or other WiFi link, a Bluetooth™ interface such as BLE or other Bluetooth interface, a PC5 interface, a USB port, a lightning port, and/or other wireless or wired interface) provided by the vehicle or otherwise provided.

In some implementations, the one or more communication functions include at least one of a wireless network access function, a vehicle-to-everything (V2X) function, an emergency-call (eCall) function, any combination thereof, and/or other communications functions. For instance, in some examples, the one or more communication functions include a wireless network access function performed by the communication unit of the vehicle for the communication unit of the user device. In such examples, operation 906 can include transmitting, to the communication unit of the user device, an instruction to begin wireless network access functionality. In some aspects, the process 900 includes performing the wireless network access function until at least the communication unit of the user device begins performing the wireless network access function. In some cases, the process 900 can include deregistering the communication unit of the vehicle from a communication network service provider (e.g., once the user device begins performing the wireless network access function).

In some examples, the one or more communication functions include a vehicle-to-everything (V2X) function. In such examples, operation 906 can include transitioning the V2X function from the communication unit of the vehicle to the communication unit of the user device. In some cases, the process 900 can include determining whether the user device is configured for V2X functionality (e.g., as described with respect to operation 724 of FIG. 7). In response to a determination that the user device is configured for V2X functionality, the process 900 can transition the V2X function to the communication unit of the user device. In some examples, in response to a determination that the user device is not configured for V2X functionality, the process 900 can include continuing to perform the V2X function (e.g., by the communication unit of the vehicle).

In some implementations, the process 900 can perform a graded or gradual transitioning of the V2X functionalities from the vehicle to the user device, as described above. For instance, the process 900 can include transitioning a first set of V2X functions from the communication unit of the vehicle to the communication unit of the user device, and performing a second set of V2X functions by the communication unit of the vehicle. In some cases, the process 900 can transition the second set of V2X functions to the communication unit of the user device (e.g., based on a V2X load of the vehicle, based on a temperature, etc.).

In some implementations, the process 900 can include reducing the V2X functionalities performed by the vehicle based on the temperature. For instance, the process 900 can include determining whether the temperature is greater than a first temperature threshold. In response to a determination that the temperature is greater than the first temperature threshold, the process 900 can include reducing a duty cycle of the V2X function. In some examples, reducing the duty cycle of the V2X function includes reducing a transmission rate of one or more V2X messages. In some examples, reducing the duty cycle of the V2X function includes reducing a processing rate of one or more V2X messages. As noted above, the processing rate can include the rate at which the communication unit processes V2X messages received from other vehicles, pedestrian user devices, and/or infrastructure systems. In some examples, the process 900 includes determining a demand for the V2X function, in which case reducing the duty cycle of the V2X function is further based on the determined demand for the V2X function. As described above, the demand can be based on a number of V2X messages being received and/or that have been received over a period of time, a number of other vehicles in the vicinity of the vehicle, a reliability of a position determined for the vehicle, an ability of the vehicle to maintain certain distances from other vehicles, whether the vehicle is stopped, whether the vehicle is periodically stopping within a period of time (e.g., in a stop-and-go scenario), whether the vehicle is moving at a particular speed, a confidence level of sensor data (e.g., a confidence level in an object detected by one or more cameras of the vehicle), among other factors.

In some examples, the process 900 can include obtaining an additional temperature (e.g., a second temperature) associated with the vehicle (e.g., the communication unit or another communication unit of the vehicle), and determining whether the additional temperature is greater than a second temperature threshold. In response to a determination that the additional temperature is greater than the second temperature threshold, the process 900 can include transitioning one or more V2X functions from the communication unit of the vehicle to the communication unit of the user device. In such examples, the vehicle can first reduce the V2X functions performed by the vehicle based on the first temperature threshold, and can transition one or more V2X functions to the user device based on the second temperature threshold.

In some examples, the process 900 can include performing a first communication function and a second communication function by the communication unit of the vehicle. The process 900 can further include determining whether the temperature is greater than a first temperature threshold. In response to a determination that the temperature is greater than the first temperature threshold, the process 900 can include transitioning the first communication function from the communication unit of the vehicle to the communication unit of the user device. In some cases, the process 900 can include transmitting a request to transition the first communication function from the communication unit of the vehicle to the communication unit of the user device. In some aspects, the process 900 can include ceasing the one or more communication functions by the communication unit of the vehicle in response transmitting the request or in response to receiving a response to the request from the user device. In some examples, the process 900 can include outputting a notification based on the request (e.g., when the request is sent). The notification can include at least one of a displayed message, an audible message, haptic feedback, any combination thereof, and/or other notifications.

In some implementations, the process 900 can include transitioning different communication functions (e.g., the first communication function and/or the second communication function) based on different temperature thresholds or other factors. For instance, the process 900 can include obtaining an additional temperature associated with the vehicle (e.g., the communication unit or another communication unit of the vehicle), and determining whether the additional temperature is greater than a second temperature threshold. In response to a determination that the additional temperature is greater than the second temperature threshold, the process 900 can include transitioning the second communication function from the communication unit of the vehicle to the communication unit of the user device. In some examples, the first communication function includes a wireless network access function, and the second communication function includes a vehicle-to-everything (V2X) function. In some examples, the first communication function includes a wireless network access function, and the second communication function includes an eCall function. In some examples, the first communication function includes a vehicle-to-everything (V2X) function, and the second communication function includes an eCall function.

In some examples, the process 900 can include transmitting environmental information of the vehicle to the communication unit of the user device. In some cases, the environmental information includes at least one of a V2X context of the vehicle, an eCall context of the vehicle, or any combination thereof. For instance, the process 900 can include transmitting the environmental information to the user device as part of transitioning the one or more communication functions at operation 906.

In some examples, the process 900 can include transmitting a request to the user device before transitioning the one or more communication functions from the communication of the vehicle to the communication of the user device. For instance, the process 900 can include determining whether the temperature is greater than a first temperature threshold. In response to a determination that the temperature is greater than the first temperature threshold, the process 900 can include transmitting (to the user device) a request to transition a first communication function from the communication unit of the vehicle to the communication unit of the user device. In some cases, the process 900 can output a notification based on the request that includes at least one of a displayed message, an audible message, haptic feedback, any combination thereof, and/or other type of message. In some examples, the process 900 can include determining whether the temperature is greater than a second temperature threshold. In response to a determination that the temperature is greater than the second temperature threshold, the process 900 can include transitioning the first communication function from the communication unit of the vehicle to the communication unit of the user device. In some examples, the process 900 can transition the first communication function from the vehicle communication unit vehicle to the user device communication unit in response to determining the temperature is greater than the first temperature (e.g., after a user device or user of the user device accepts the request) instead of based on the second threshold.

In some examples, the process 900 can transition at least one communication function from the communication unit of the vehicle to a communication unit of a roadside unit (RSU), to a communication unit of an additional vehicle, and/or to other devices. For example, as described above, in response to a particular temperature threshold being reached, the process 900 can transition a V2X functionality to the RSU and/or to another vehicle to help reduce the processing load of the vehicle.

Figure 10A:
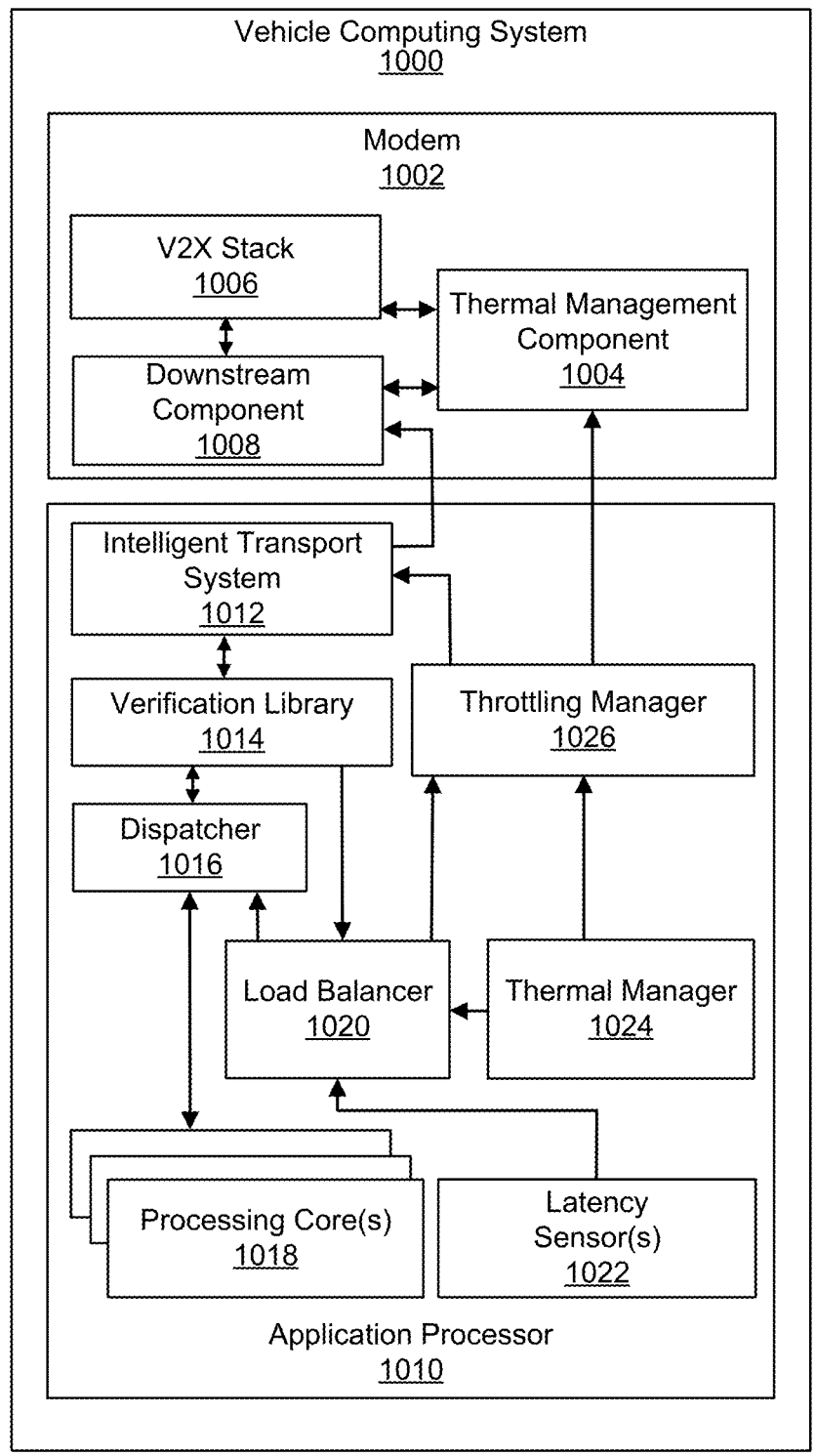
FIG. 10A is a block diagram illustrating an example configuration of inner components of a vehicle computing system, according to aspects of the disclosure.

As described above, aspects of the present disclosure include, additionally or alternatively to the thermal mitigation systems and techniques described above, systems and techniques for performing load balancing using one or more load balancers. FIG. 10A is a block diagram illustrating an example configuration of inner components of a vehicle computing system 1000 (which can be the same as vehicle computing system 450 of FIG. 4). The vehicle computing system 1000 includes a modem 1002 (which can be the same as modem 464 of FIG. 4) that can include components such as a thermal management component 1004, a V2X stack 1006, and a downstream (DS) component 1008. While not shown, the modem 1002 can include any other known or to be developed component for intended operation thereof, such as an upstream component for transmitting messages from a corresponding UE such as vehicle 404, etc.

As will be fully described below, thermal management component 1004 may receive current temperature information of modem 1002 and/or other components within or associated with vehicle computing system 1000 to implement a filtering mechanism for filtering (e.g., dropping, queuing, etc.) incoming messages in order to ensure that processing loads (the number of incoming messages (e.g., V2X messages) to be verified by vehicle computing system 1000) remains at or below the processing capacity of the vehicle computing system 1000.

The V2X stack 1006 may be used to enable bi-directional V2X communications (e.g., with other vehicles for V2V communications, with other devices for D2D communications, with infrastructure systems for V2I communications, with pedestrian UEs for V2P communications, etc.). The V2X stack 1006 may be controlled by the thermal management component 1004 to implement a particular filtering mechanism, as described herein.

DS component 1008 may be utilized for passing or sending any number of received messages (e.g., V2X messages) to ITS 1012 for verification and processing. As will be described below, a particular type of filtering scheme due to thermal conditions at the vehicle computing system 1000 may be implemented at the DS component 1008 of the modem 1002.

As further shown in FIG. 10A, vehicle computing system 1000 also includes an application processor 1010. The application processor 1010 includes an ITS 1012 (which can be the same as the ITS 455 of FIG. 4). One or more filtering schemes based on incoming processing loads and temperature conditions of components of the vehicle computing system 1000 may be implemented at the ITS 1012, as will be described below.

It should be noted that application processor 1010 is only used as an illustrative example, and that the process of thermal based load balancing can be performed by any processing system including, but not limited to, one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The application processor 1010 further includes a verification library 1014 (also referred to as the library 1014). The verification library 1014 may be a software and/or hardware platform for verification of signed and secure messages received at vehicle computing system 450 from other vehicles, UEs, and/or RSUs as described in the present disclosure. The verification library 1014 supports secure message formats and processing thereof as defined in IEEE 1609.2 and ETSI TS 103097 V2V security standards. The verification library 1014 may be a directory structure that contains shared libraries, headers, documentation, and test applications (e.g., for Red Hat Packet Manager (RPM) compatible Linux and Windows ports).

The application processor 1010 further includes a dispatcher 1016, one or more processing cores 1018 (also referred to as one or more verification processors), a load balancer 1020, a latency sensor(s) 1022, a thermal manager 1024, and a throttling manager 1026. Components of application processor 1010 are not limited to those shown in FIG. 10A and may include any other known or to be developed component(s) for intended operation and functionalities of application processor 1010.

The dispatcher 1016 may be utilized to distribute incoming messages at verification library 1014 to the one or more processing cores 1018 for processing/verification (e.g., according to a verification sequence command received from the load balancer 1020).

The one or more processing cores 1018 (e.g., one or more verification processors) are configured to verify the received messages according to any known or to be developed processing and/or verification methods. As will be further described below, the processing capacity of any one or more of the processing cores 1018 may vary depending on their corresponding thermal conditions and/or the overall thermal condition of the vehicle computing system 1000 and/or one or more components of the vehicle computing system 1000.

While a thermal condition (temperature) is described herein as a factor or condition that may affect processing capacity of the vehicle computing system 1000, the present disclosure is not limited to temperature and may include other factors or conditions including, but not limited to, a humidity, an amount of light exposure, an amount of ventilation (e.g., when a ventilation mechanism such as a vent becomes blocked), any combination thereof, and/or other characteristics or factors of the vehicle computing system 1000 and/or one or more components of the vehicle computing system 1000.

Thermal based load balancing and filtering schemes may be implemented to ensure that at any given temperature level, processing loads (number of incoming messages such as C-V2X messages received from the nearby devices) remain at or below the sum of individual processing capacities of the one or more processing cores 1018.

The one or more processing cores 1018 can be any one or more or a combination of an Advanced RISC (Reduced Instruction Set Computer) Machine (ARM), an Audio Digital Signal Processor (aDSP), a Compute DSP (cDSP), a Graphics Processing Unit (GPU), a Neural Signal Processor (NSP), an air7 processor, a dedicated core for handling crypto functions or a Security Processor Unit (SPU), and/or other processing cores.

The load balancer 1020 is configured to monitor load and processing conditions of various components of the vehicle computing system 1000 to ensure smooth and continuous operation of the vehicle computing system 1000. Among other parameters and as will be described below, the load balancer 1020 may monitor various thermal conditions of components of the vehicle computing system 1000, a rate of arrival of incoming messages (from the ITS 1012), processing delay information (from the latency sensor(s) 22) and thermal measurement information (from the thermal manager 1024) and provide information on thermal levels and conditions to the throttling manager 1026 for implementing a filtering mechanism. This process will be further described below.

The latency sensor(s) 1022 may be configured to measure latency in processing of received messages by any one or more of the processing cores 1018 and/or the latency at any one or more of the components of the vehicle computing system 1000 in performing their corresponding functionalities.

The thermal manager 1024 is configured to measure instantaneous temperature of any one or more components of the vehicle computing system 1000 including the one or more processing cores 1018. In some examples, the thermal manager 1024 may be part of the sensor system(s) 456 of FIG. 4.

The throttling (filtering) manager 1026, as will be described below, can receive thermal level information and throttling (filtering) level information from the load balancer 1020, and can determine a filtering mechanism for filtering the messages. Subsequent to the selection of a filtering mechanism, the throttling manager 1026 can send commands for implementation of such filtering mechanisms to the ITS 1012, the thermal management component 1004, and/or the DS component 1008 for implementation.

Figure 10B:
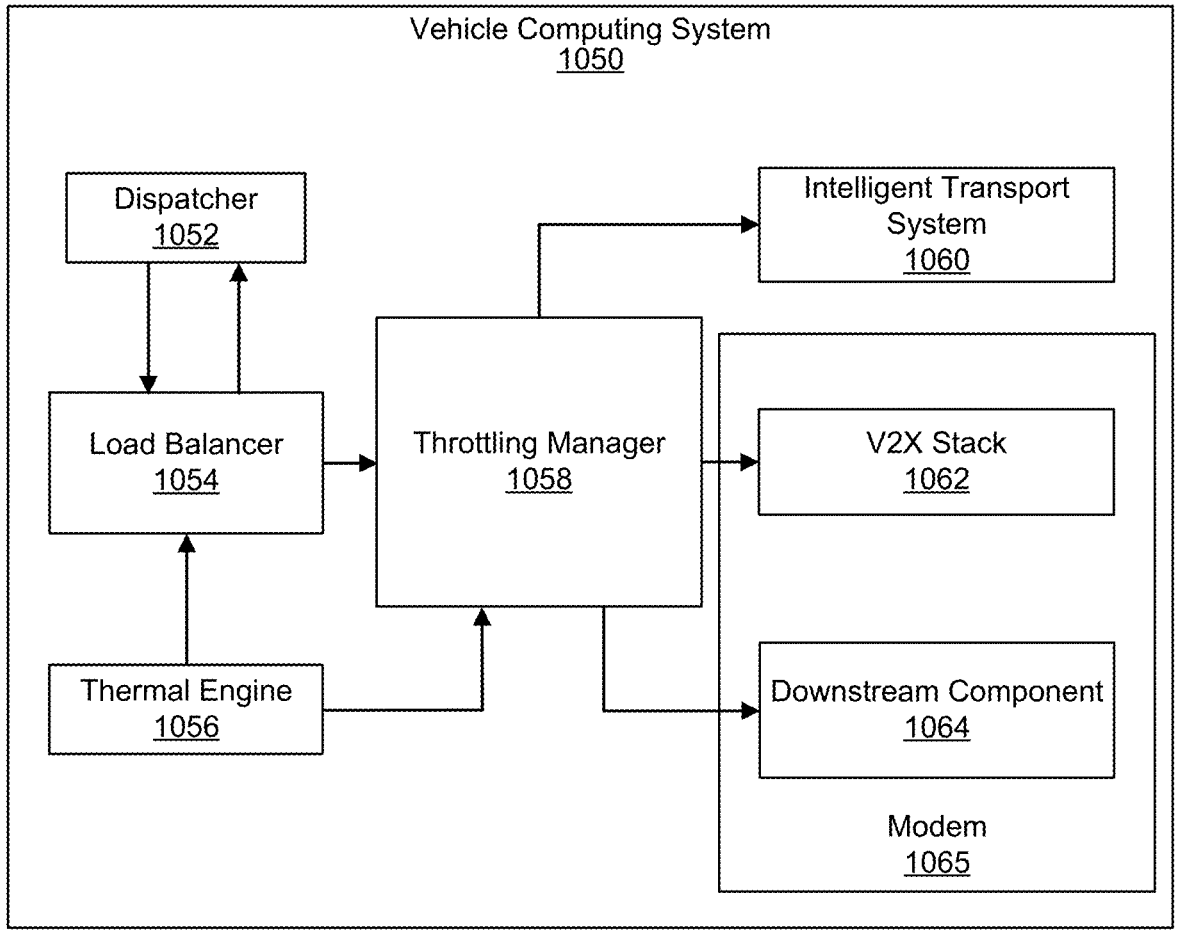
FIG. 10B is a block diagram illustrating another example configuration of inner components of the vehicle computing system, according to aspects of the disclosure.

FIG. 10B is a block diagram illustrating another example configuration of inner components of the vehicle computing system 450. The vehicle computing system 1050 of FIG. 10B can be the same as vehicle computing system 1000 of FIG. 10A or vehicle computing system 450 of FIG. 4. Vehicle computing system 1050 can include a dispatcher 1052, a load balancer 1054, a thermal engine 1056, a throttling manager 1058, an intelligent transport system (ITS) 1060, a V2X stack 1062 and a DS component 1064 of a modem 1065, all of which will be described below.

The dispatcher 1052 may be the same as the dispatcher 10110 and the load balancer 1054 may be the same as the load balancer 1020 of FIG. 10A. The communication between the dispatcher 1052 and the load balancer 1054 may be bi-directional. For example, the load balancer 1054 may receive a verification rate of verifying the incoming messages by the one or more processing cores 1018 of FIG. 10A, and in return the load balancer 1054 may provide commands to the dispatcher 1052 including instructions for a verification sequence and verification periodicity. As will be described below, a verification rate may also be referred to as a processing load (instantaneous processing load) of the vehicle computing system 1050. In one example, the verification rate can be determined as a difference between a rate of incoming messages (e.g., incoming V2X message rate over a Remote Network (RmNET) received at the vehicle computing system 1050) and a current filtering rate of the ITS 1060.

In one example, the load balancer 1054 may take both power and latency costs into consideration using weighted averaging (or any other known or to be developed method) to formulate a load distribution scheme (e.g., including a verification sequence and the verification periodicity) for implementation amongst the one or more processing cores 1018. Weights used in the weighted averaging may be based on junction temperatures (Tj) (which can include a transistor junction temperature) of a silicon inside the one or more processing cores 1018. For example, when the Tj is lower than a threshold (e.g., a configurable parameter determined based on experiments and/or empirical studies), the vehicle computing system 1050 may assign more weightage performance factors such as latency per verification. In another example, when the Tj is greater than the threshold, the vehicle computing system 1050 may assign more weightage to power efficiency such as mW of power used per verification.

The thermal engine 1056 may be a sensor system from the sensor system(s) 456 that can measure and monitor temperatures of various components of the vehicle computing system 1050 in the same manner as the load balancer 1020 of FIG. 10A. The thermal engine 1056 may be communicatively coupled to both the load balancer 1054 and the throttling manager 1058 (the throttling manager 1058 may be the same as the throttling manager 1026 of FIG. 10A). The thermal engine 1056 can provide temperature information (thermal levels of one or more of the processing core(s) 1018 and/or any other component of the vehicle computing system 1050) to the throttling manager 1058 as well as to the load balancer 1054. In one example, the thermal engine 1056 can also provide additional information, such as operating points (e.g., speed, frequency, etc.) of the one or more processing cores 1018, to the load balancer 1054. The load balancer 1054 can also provide throttling (filtering) levels (defined below with reference to FIG. 13 and Eq. 2) to the throttling manager 1058.

The throttling manager 1058, based on the received thermal levels, throttling levels, and processing load information, can determine an appropriate filtering mechanism to be implemented by any one of the ITS 1060, the V2X stack 1062 of the modem 1065 (which can be the same as the modem 1002 of FIG. 10A), and/or the DS component 1064 of the modem 1065.

With example system configurations described above with reference to FIGS. 1-10B, the disclosure now turns to description of example processes to be implemented for thermal aware (thermal based) load balancing to ensure that a vehicle computing system (such as the vehicle computing system 450, vehicle computing system 1000 and/or vehicle computing system 1050 described above with reference to FIGS. 4, 10A and 10B described above) can process important information received from nearby devices when thermal conditions reduce processing capabilities of the vehicle computing system. Thermal based load balancing will be described below with reference to components of the vehicle computing system 1000 of FIG. 10A. However, the following thermal based load balancing concepts can be similarly applied to example computing systems 450 of FIG. 4 and/or vehicle computing system 1050 of FIG. 10B. Furthermore, it is assumed that the vehicle computing system 1000 is being used inside the vehicle 404 of FIG. 4.

As noted above, problems can arise when temperatures of various underlying hardware components (such as the one or more processing cores 1018, which as noted above can be referred to as verification processors) of the vehicle computing system 1000 rise. As hardware temperatures rise, their clock frequency and consequently processing capabilities are reduced. Continuous operation of the vehicle computing system 1000 in extreme temperature conditions (e.g., between −85° Celsius and 125° Celsius) is important. Furthermore, it is known that the process of verifying incoming messages such as C-V2X messages (based on IEEE 1509.6 standard) are computationally intensive and delay sensitive. In some examples, the incoming messages may be ITS messages and may include Basic Safety Messages (BSM). As the number of incoming messages increase, the vehicle computing system 1000 has to process a higher number of verifications of the received messages (e.g., per seconds). Thermal conditions adversely affect the ability of the vehicle computing system 1000 to perform the necessary number of verifications per seconds. Current filtering mechanisms are based on relevancy of the received messages and do not take varying thermal and load conditions into consideration. Therefore, it is important to ensure timely processing and verification of the incoming messages, under any given thermal condition, in order to provide appropriate operational and safety commands for proper and safe operation of the vehicle 404.

Utilizing the load balancer 1020, the vehicle computing system 1000 can determine the current (e.g., instantaneous) processing load (amount of number of incoming messages received from the nearby devices in vicinity of the vehicle 404) and current temperature(s) of one or more components/hardware of the vehicle computing system 1000 to determine an optimized filtering mechanism. The optimized filtering mechanism can then be implemented at one or more internal components of the vehicle computing system 1000 (such as the thermal management component 1004 of the modem 1002, the DS component 1008 of the modem 1002 and/or the ITS 1012 of the application processor 1010) to filter/drop less important of the incoming messages such that the processing load of the vehicle computing system 1000 remains at or below a total processing capacity of the one or more processing cores 1018 of the vehicle computing system 1000.

Figure 11:
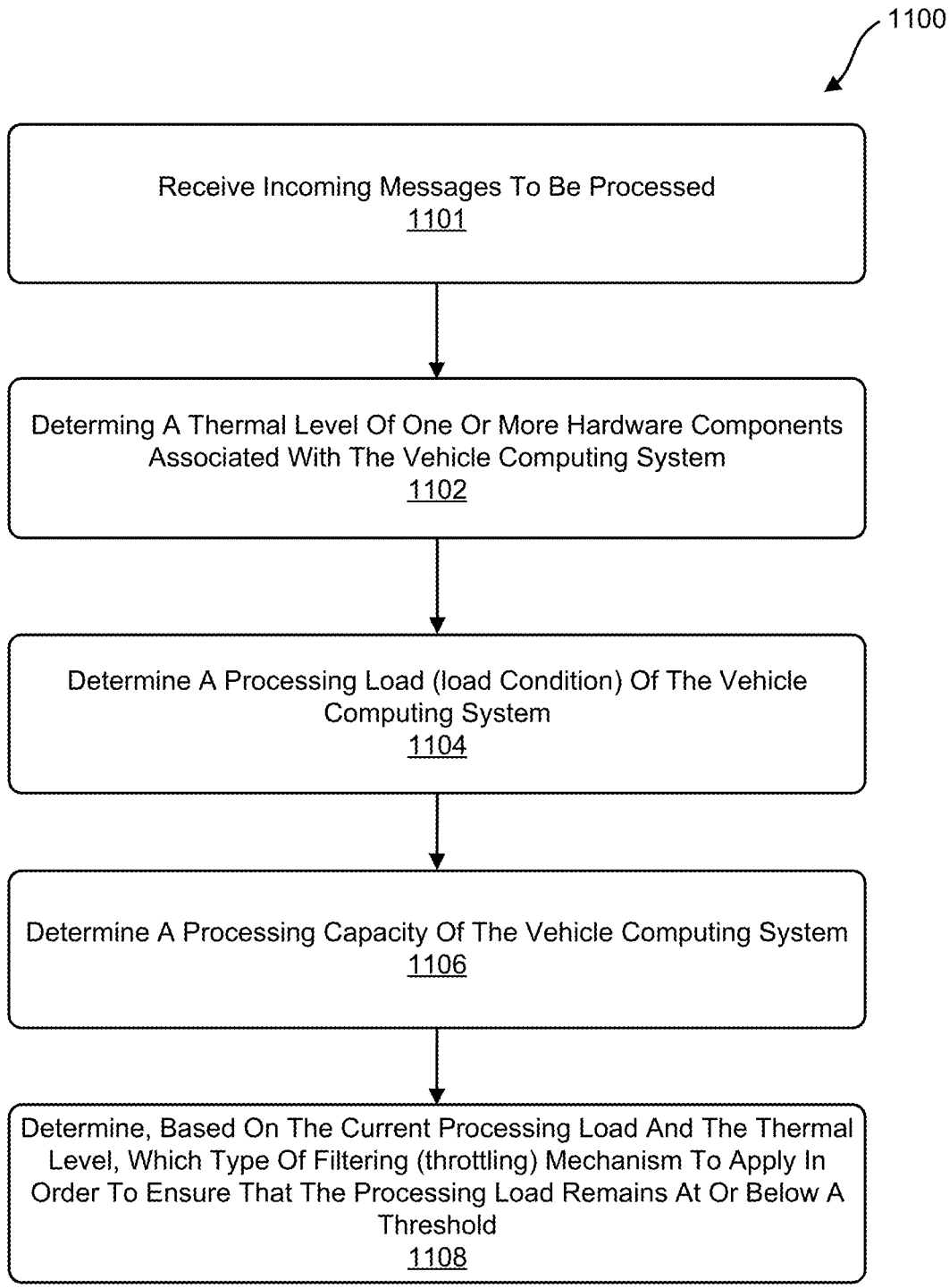
FIG. 11 is a flow diagram illustrating an example thermal based load balancing process, according to aspects of the disclosure.

FIG. 11 is a flow diagram illustrating an example of a process 1100 for performing thermal based load balancing.

FIG. 11 will be described from the perspective of the vehicle computing system 1000 of FIG. 10A. However, it should be understood that the vehicle computing system 1000 may have one or more processors configured to execute stored computer-readable instructions corresponding to each of the components of the vehicle computing system 1000 described above with reference to FIG. 10A, to implement various steps of the process of FIG. 11.

At operation 1101, the vehicle computing system 1000 receives incoming messages (a plurality of messages) to be processed. As described above, the incoming messages may be C-V2X signed messages received from a number of nearby devices in the vicinity of the vehicle 404. Such nearby devices may be other vehicles such as vehicles 304 and/or 305 of FIG. 3, BS 302 of FIG. 3, one or more UEs such as UE 307 of FIG. 3, one or more RSUs such as RSU 303 of FIG. 3, etc. In an example setting of the vehicle 404 being on a congested interstate highway, such nearby devices may be tens or hundreds of nearby vehicles on the interstate highway in the vicinity of the vehicle 404, smart nearby traffic management components such as information boards, traffic lights, passing public transportation vehicles, mobile devices such as UE 407, etc.

At operation 1102, the vehicle computing system 1000 determines a thermal level associated with the vehicle 404. For example, the thermal level can be a thermal level of one or more hardware components associated with the vehicle computing system 1000 including, but not limited to, the modem 1002, the application processor 1010, the one or more processing cores 1018 (e.g., verification processors), a telematics control unit (TCU) of the vehicle 404, etc. In another example, the thermal level can be the thermal level of any other component of the vehicle 404 or more generally the thermal level of the vehicle 404. The thermal level may be a range of temperatures that can be determined based on experiments and/or empirical studies. For example, different types of processors used as each of the one or more processing cores 1018, may have varying performances under different thermal conditions. As a non-limiting example, a thermal level (temperature level) 0 may be defined to include the range of 0-15 degrees Celsius, a thermal level 1 may be defined to include the range of 16-30 degrees Celsius, a thermal level 2 may be defined to include the range of 31-100 degrees and a thermal level 3 may be defined to include the range of 46 degrees Celsius and above. A number of thermal levels and corresponding ranges may be more or less and are not limited to examples described above.

The vehicle computing system 1000 can determine the thermal level based on current temperature measurements by the load balancer 1020 of FIG. 10A, where the measurements are provided to the load balancer 1020 and the load balancer 1020 determines the thermal level based on the temperature measurements and the thermal levels defined above. In one example, the temperature measurement may be indicative of the current temperature of a single processor or may be an average of temperatures of multiple processors and components associated with the vehicle computing system 1000.

At operation 1104, the vehicle computing system 1000 determines a processing load (load condition) of the vehicle computing system 1000. In some examples, the processing load can be a current processing load of the vehicle computing system 1000. In some examples, the processing load can be a predicted processing load of the vehicle computing system 1000 at a future location prior to the vehicle 404 arriving at the future location. In some examples, the processing load can be a combination of the current processing load and the predicted processing load.

The current processing load is indicative of a size (a number) of the incoming messages received at operation 1101 that are to be verified by the one or more processing cores 1018. The current processing load may be defined as a total size of the messages (e.g., in megabytes or gigabytes). In one example and during a peak load on a highway or a road, the vehicle 404 may be surrounded by two-hundred and fifty (250) nearby vehicles from each of which ten messages may be received every second. This results in twenty-five hundred (2500) messages to be processed every second by the vehicle control computing system 1000. Assuming a size five hundred (500) bytes per message, a current processing load of the vehicle computing system 1000 may be 1.25 Gigabytes of data. A current processing load of the vehicle computing system 1000 may be expressed as $M_i$, with i indicating the current time and being an integer equal to or greater than zero (0). In one example, $M_i$ may be the same as the verification rate described above with reference to FIG. 10B.

In some cases, as noted above, the processing load can be a predicted processing load of the vehicle computing system 1000 at a future location prior to the vehicle 404 arriving at the future location. In such cases, the vehicle computing system 1000 can receive information describing traffic conditions at an identified future location (e.g., an intersection at which the vehicle 404 may arrive within a given time period in the future, such as within five minutes, ten minutes, etc.). Using the information regarding the traffic conditions, the vehicle computing system 1000 can predict a number of incoming messages that the vehicle computing system 1000 can expect to receive at the identified future location upon arrival of the vehicle 404 at the identified future location. Predicting the number of incoming messages can be based on any known or to be developed methodology. For example, using historical data of number of messages received in traffic conditions similar to the traffic conditions expected at the identified future location, the vehicle computing system 450 can predict the expected number of the incoming messages at the identified future location. Other methodologies including utilizing a neural network trained using known or to be developed machine learning techniques are also within the scope of the present disclosure. A trained neural network may receive information regarding the traffic conditions at the identified future location as input and can provide, as output, an expected number of incoming messages once the vehicle 404 arrives at the identified future location.

At operation 1106, the vehicle computing system 1000 determines a processing capacity of the vehicle computing system 1000. In one example, such processing capacity may be the sum of processing capacities (referred to as instantaneous processing capacities) of individual verification processors (e.g., of the one or more processing cores 1018) of the vehicle computing system 1000. Assuming j number of processors forming the verification processors (j being an integer equal to or greater than 1), a processing capacity thereof at time i (i being an integer equal to or greater than 0), may be expressed at $m_{ji}$.

Accordingly, at any given time, the processing capacity of the vehicle computing system 1000 may be expressed as:

$$C = \sum_{j=1}^{k} m_{ji} \quad \text{(Eq. 1)}$$

With C being the total processing capacity of the vehicle computing system 1000 and k being an integer equal to or greater than 1 and corresponding to the total number of verification processors (e.g., the total number of the one or more processing cores 1018).

At operation 1108, the vehicle computing system 1000 determines, based on the processing load (e.g., predicted processing load and/or current processing load as described above) and the thermal level, which type of filtering (throttling) mechanism to apply in order to ensure that the processing load remains at or below a threshold (the threshold is the variable C in Eq. 1 above). Determining the filtering mechanism can include selecting a filtering mechanism and/or calculating a filtering mechanism. Determination and implementation of a particular filtering mechanism will be described below with reference to FIG. 12.

Upon determining a filtering mechanism at operation 1108, the vehicle computing system 1000 applies the filtering mechanism to filter (throttle) the incoming messages in order to ensure that the processing load of the vehicle computing system 1000 remains at or below the value of variable C in Eq. 1.

With messages filtered according to the filtering mechanism applied per the process of FIG. 11, the vehicle computing system 1000 (and more specifically the load balancer 1020), can perform load balancing for distributing the filtered messages among the processing cores 1018 for processing (e.g., based on power and latency factors, as described above). In one example, the load balancer 1020 can be configured with one or more knobs (e.g., one or more parameter) that can be adjusted according to a given thermal level. Adjusting the one or more parameters (or knobs) can cause the load balancer 1020 to be more or less sensitive to the thermal levels (e.g., be less responsive to perform load balancing at lower thermal levels and be more responsive at higher thermal levels). One advantageous aspect of such adjustable parameter(s) can be a smoother transition between performance optimized load balancing and thermal based load balancing across the different thermal levels.

Figure 12:
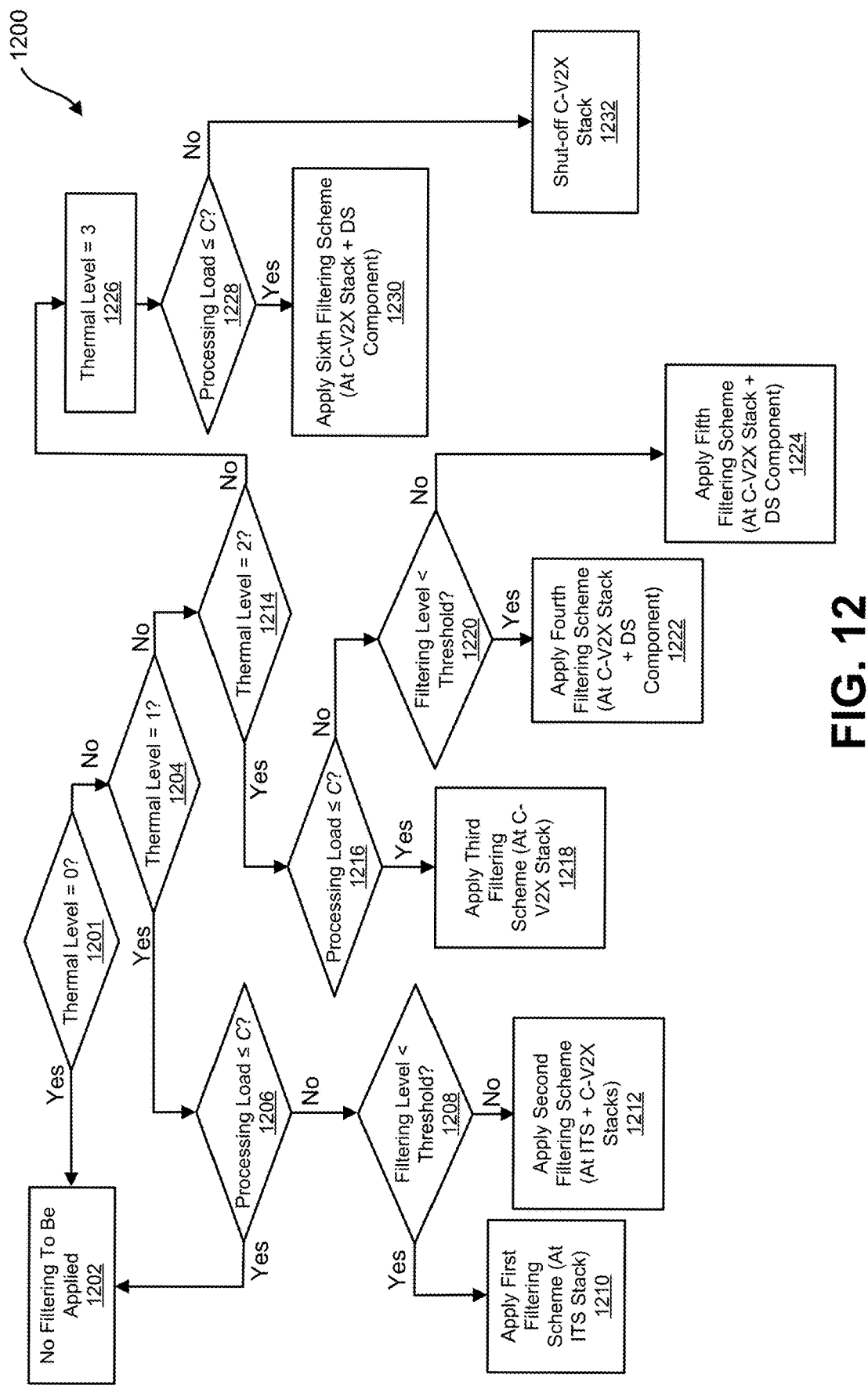
FIG. 12 is a flow chart of an example process of selecting a filtering mechanism to be applied in the thermal based load balancing process of FIG. 8, according to aspects of the disclosure.

FIG. 12 is a flow chart illustrating an example of a process 1200 of selecting a filtering mechanism to be applied in the thermal based load balancing process of FIG. 11. FIG. 12 describes example processes for determining a filtering mechanism to apply to the incoming messages at operation 1108 of FIG. 11. FIG. 12 will be described from the perspective of the vehicle computing system 1000 in general and more specifically from the perspective of the load balancer 1020 and the throttling manager 1026 of the vehicle computing system 1000. Furthermore, FIG. 12 will be described with reference to the non-limiting example of 4 thermal levels (0, 1, 2, 3), as described above with reference to operation 1102.

At operation 1201, the load balancer 1020 determines whether the thermal level is 0. If the thermal level is 0 (e.g., current temperatures of the hardware components associated with the vehicle computing system 1000 are between 0 to 15 degrees Celsius), at operation 1202, the load balancer 1020 determines that no throttling is needed (the selected filtering mechanism would be to not apply any filtering mechanism) to filter or drop one or more of the received messages.

However, if at operation 1201, the load balancer 1020 determines that the thermal level is not 0, then at operation 1204, the load balancer 1020 determines whether the thermal level is 1. If at operation 1204, the load balancer 1020 determines that the thermal level is 1 (e.g., current temperatures of the hardware components associated with the vehicle computing system 1000 are between 16-30 degrees Celsius), at operation 1206, the load balancer 1020 determines whether the processing load $M_i$, is equal to or less than C defined above per Eq. 1. If at operation 1206, the load balancer 1020 determines that $M_i$ is equal to or less than C, the process reverts back to operation 1202 and the throttling manager 1026 determines that no throttling is needed (no filtering mechanism is to be applied) to filter or drop one or more of the received messages.

However, if at operation 1206, the load balancer 1020 determines that the processing load M is greater than C defined in Eq. 1 above, the load balancer 1020 determines a throttling level (also referred to as a filtering level). A throttling level may be defined as:

$$\text{Throttling (Filtering) Level} = \max\left(\frac{M_i - \sum_{j=1}^{k} m_{ji}}{\sum_{j=1}^{k} m_{ji}}, 0\right) \quad \text{(Eq. 2)}$$

where $M_i$ is as defined above and $\sum_{j=1}^{k} m_{ji}$ is defined per Eq. 1. Eq. 2 provides that a throttling level may be determined as the maximum of a zero value (0) and a difference between the processing load of the vehicle computing system 1000 and the processing capacity of the vehicle computing system given by Eq. 1.

The load balancer 1020 can send the throttling level to the throttling manager 1026. At operation 1208, the throttling manager 1026 determines whether the throttling level is less than a throttling threshold. The threshold against which the throttling level is compared may be a configurable parameter determined based on experiments and/or empirical studies.

If the throttling level is less than the threshold, then at operation 1210, the throttling manager 1026 selects a first filtering mechanism to be applied. In one example, the first filtering mechanism includes filtering incoming messages at the ITS 1012. Based on selection of the first filtering mechanism, the throttling manager 1026 sends a command to the ITS 1012 with instructions detailing a filtering criteria for filtering the incoming messages.

Filtering the incoming messages may be based on any known or to be developed criteria or factor. In some examples, incoming messages may have corresponding information or metadata associated therewith including, but not limited to, a distance of the corresponding nearby device or vehicle (from which the message is received) from the vehicle 404, a direction of travel or movement of the corresponding nearby device or vehicle, the speed of travel or movement of the corresponding nearby device, the type (content) of the received message, etc. Each example item of information or metadata can be used as a filtering criteria or a filtering factor. In one example, the filtering criteria may be to filter messages based on distance. For instance, messages received from nearby devices that are more than 100 meters away from the vehicle 404 may be filtered. In another example, the filtering criteria may be to filter messages from the nearby devices that are traveling in the opposite direction from the vehicle 404. In another example, the filtering criteria may be to filter the messages with no content related to speed and direction of movement of the corresponding vehicle. In another example, the filtering criteria may be based on a combination of criteria described above.

Referring back to operation 1208, if the throttling manager 1026 determines that the throttling level is not less than the threshold, then at operation 1212, the throttling manager 1026 selects a second filtering mechanism to be applied. In one example, the second filtering mechanism includes filtering incoming messages at the ITS 1012 as well as the V2X stack 1006 of the modem 1002. Based selection of the second filtering mechanism, the throttling manager 1026 sends at least one command to the ITS 1012 with instructions detailing a filtering criteria for filtering the incoming messages and at least one other command to the thermal management component 1004 of the modem 1002 to filter the messages at the V2X stack 1006 of the modem 1002.

In one example, the command sent to the ITS 1012 may be to apply a different filtering criteria to the incoming messages than the filtering criteria to be applied at the V2X stack 1006 of the modem 1002. In another example, the filtering criteria applied at the ITS 1012 and the V2X stack 1006 of the modem 1002 may be the same with slight degree variation. For example, when the filtering criteria is to filter based on distance, the command sent to the V2X stack 1006 of the modem 1002 may be to filter/drop the messages from the nearby vehicles that are 150 meters or more from the vehicle 404 while the command sent to the ITS 1012 may be to filter/drop the messages from the nearby vehicles that are more than 75 meters from the vehicle 404.

Referring back to operation 1204, if the load balancer 1020 determines that the thermal level is not 1, then at operation 1214, the load balancer 1020 determines whether the thermal level is 2. If at operation 1214, the load balancer 1020 determines that the thermal level is 2 (e.g., current temperatures of the hardware components associated with the vehicle computing system 1000 are between 31-100 degrees Celsius), at operation 1216, the load balancer 1020 determines whether the processing load M is equal to or less than C defined above per Eq. 1.

If at operation 1216, the load balancer 1020 determines that M is equal to or less than C, then at operation 1218, the throttling manager 1026 selects a third filtering mechanism to be applied. In one example, the third filtering mechanism is to filter the incoming messages according to any filtering criteria at the V2X stack 1006 of modem 1002. Accordingly, the throttling manager 1026 sends a command to the thermal management component 1004 of the modem 1002 to filter the messages (according a filtering criteria such as one or more of example criteria described above) at the V2X stack 1006 of the modem 1002.

If at operation 1216, the load balancer 1020 determines that M is greater than C, the load balancer sends the throttling level to the throttling manager 1026. Then at operation 1220, the throttling manager 1026 determines whether the throttling level (determined per Eq. 2) is equal to or less than the throttling threshold defined above. If the throttling level is equal to less than the throttling threshold, then at operation 1222, the throttling manager 1026 selects a fourth filtering mechanism to be applied. The fourth filtering mechanism may include the third filtering mechanism (i.e., filter the incoming messages according to any filtering criteria at the V2X stack 1006 of modem 1002) as well as filtering the messages at the downstream component 1008 of the modem 1002. In one example, filtering the messages at the downstream component 1008 may include dropping messages based on their source address regardless of the content and metadata included therein. In this example, the ITS 1012 may send a list of source addresses (e.g., identifiers of nearby vehicles) to the downstream component 1008. Using the list of source addresses, the downstream component 1008 can filter (e.g., drop) any message with a source identifier that matches one of the identifiers on the list.

However, if at operation 1220, the throttling manager 1026 determines that the throttling level is greater than the throttling threshold, then at operation 1224, the throttling manager 1026 selects a fifth filtering mechanism to be applied. In one example, the fifth filtering mechanism may include the third filtering mechanism (i.e., filter the incoming messages according to any filtering criteria at the V2X stack 1006 of modem 1002) as well as more aggressive filtering of the messages at the downstream component 1008 of the modem 1002 relative to the fourth filtering mechanism. For example, the list of source addresses included in the list provided to the downstream component 1008 for filtering is larger and includes more sources compared to the list provided to the downstream component 1008 in the fourth filtering mechanism at operation 1222.

Referring back to operation 1214, if the load balancer 1020 determines that the throttling level is not 2, then at operation 1226 the load balancer determines that the throttling level is 3 (e.g., current temperatures of the hardware components associated with the vehicle computing system 1000 are 46 degrees Celsius and above).

At operation 1228, the load balancer 1020 determines whether the processing load M is equal to or less than C defined above per Eq. 1. If at operation 1228, the load balancer 1020 determines that M is equal to or less than C, then at operation 1230, the throttling manager 1026 selects a sixth filtering mechanism to be applied. In one example, the sixth filtering mechanism is to filter the messages according to the third filtering mechanism (i.e., filter the incoming messages according to any filtering criteria at the V2X stack 1006 of modem 1002) as well as aggressive filtering of the messages at the downstream component 1008 of the modem 1002. In one example, this relatively more aggressive filtering includes providing a list of source addresses to the downstream component 1008 for filtering that is larger and includes more sources compared to the list provided to the downstream component 1008 in the fourth filtering mechanism at operation 1222 or the fifth filtering mechanism at operation 1224.

If at operation 1228, the load balancer 1020 determines that $M_i$ is greater than C, the load balancer sends the throttling level to the throttling manager 1026. Then at operation 1232, the throttling manager 1026 selects a seventh filtering mechanism to be applied. In one example, the seventh filtering mechanism includes shutting off the V2X stack 1006 in order to stop receiving any new messages from the nearby devices. In one example, the shut off of the V2X stack 1006 may continue until the processing load is no longer more than C at the thermal level 3.

Those having ordinary skill in the art can readily appreciate that the above four thermal levels are non-limiting and exemplary only and that upon having more or less thermal levels, the number of distinct filtering mechanism may also be more or less, respectively.

The thermal balancing systems and techniques described herein enable a UE (e.g., a vehicle, a user device, and/or other UE) or other device (e.g., an RSU etc.) to analyze various thermal and processing load conditions to select and implement thermal based load balancing in order to ensure that at any given temperature level, processing loads (e.g., a number of incoming messages such as V2X messages received from nearby devices) remain at or below a threshold. Maintaining the processing load at or below the threshold can in turn ensure that the vehicle computing system can process (e.g., verify) the incoming messages. Verification of the incoming messages can have various safety and operational implications for a corresponding vehicle, such as alerting a driver of the vehicle of an impending/possible accident ahead, a red light ahead, a pedestrian crossing the road to, lane change negotiations, left or right turns at stop signs, etc.

In addition to temperature and thermal conditions, other environmental factors that may adversely affect the performance of the vehicle computing system 1000 of FIG. 10A (and/or vehicle computing systems 450 and 1050 of FIGS. 4 and 10B, respectively), can also be considered in selecting a proper filtering mechanism to ensure the above described adherence of a processing load of a vehicle computing system to a threshold. Such other factors include, but are not limited to, a humidity of the vehicle computing system 1000 or component thereof (e.g., the modem 1002 or other component), an amount of light exposed to the vehicle computing system 1000 or component thereof (e.g., the modem 1002 or other component), an amount of ventilation of the vehicle computing system 1000 or component thereof (e.g., when a ventilation mechanism such as a vent used within the vehicle computing system 1000 becomes blocked), any combination thereof, and/or other characteristics or factors. Such factors can be considered alone or in combination with the thermal conditions as described with reference to FIGS. 11 and FIG. 12.

The process of utilizing a throttling manager/load balancer to filter incoming messages and/or perform load balancing are described above within the context of V2X communications. However, the present disclosure is not limited thereto and the process of filtering messages and/or load balancing are applicable to other types of communications, such as D SRC (802.11p) communications.

While numerous examples are described in the present disclosure in the context of a vehicle and processing of messages received from nearby devices at such vehicle, the disclosure is not limited thereto. For example, the concepts described in this disclosure are equally applicable within any device-to-device communication context (or other communication context, such as device-to-network) where environmental factors can adversely affect the processing capacities of such devices and thus a proper filtering mechanism should be applied to ensure that important messages are timely processed.

Figure 13:
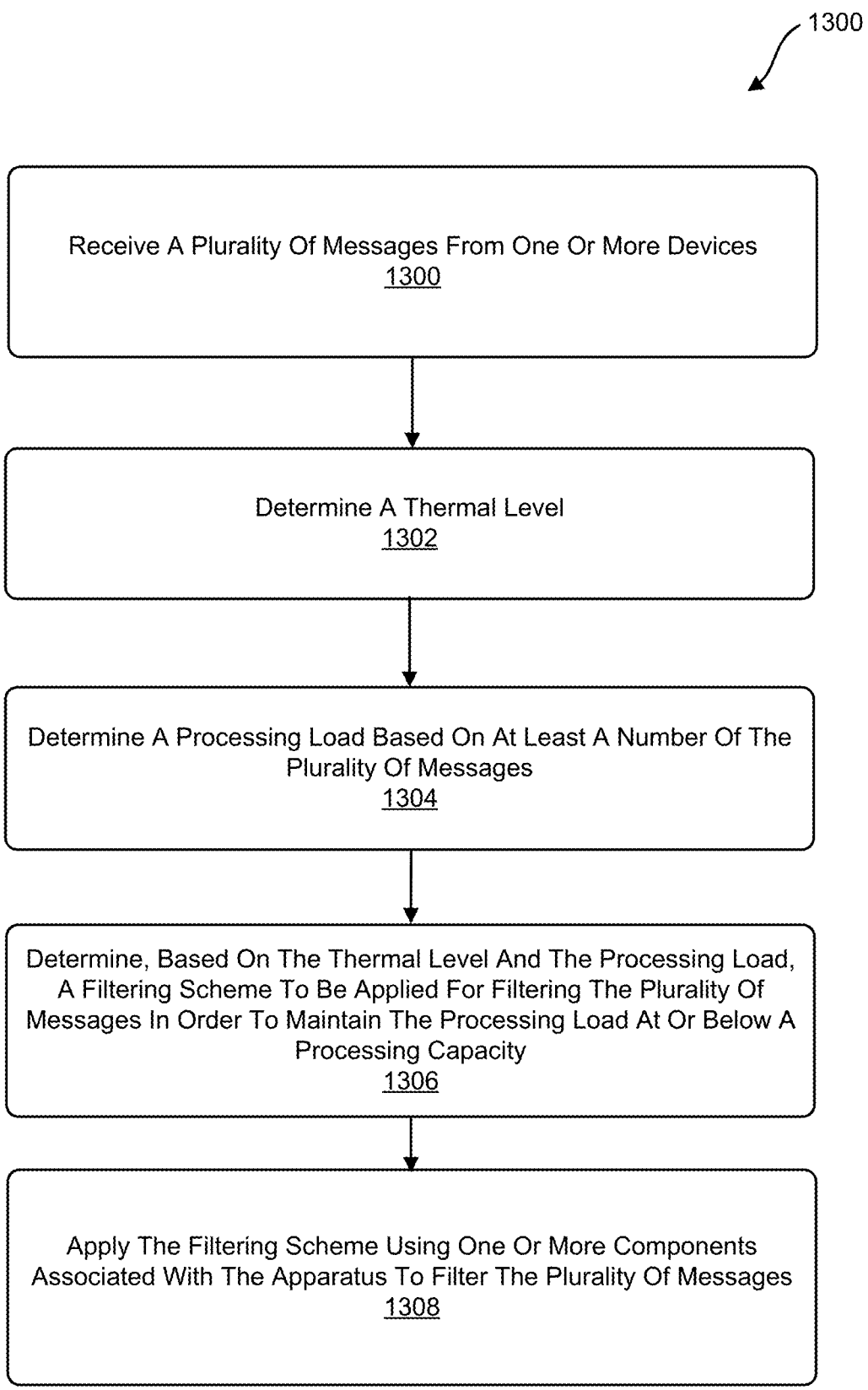
FIG. 13 is a flow diagram of an example thermal based load balancing process, according to aspects of the disclosure.

FIG. 13 is a flow diagram illustrating an example of a thermal based load balancing process 1300. At operation 1301, the process includes receiving a plurality of messages from one or more devices. In some examples, the plurality of messages can be vehicle-to-everything (V2X) messages (e.g., C-V2X messages), such as V2X messages that are based on IEEE 1509.6 standard. In some implementations, the plurality of messages can be intelligent transport system (ITS) messages, which may include Basic Safety Messages (BSM) and/or other types of messages. In some cases, the plurality of messages can be signed using a signature. In such cases, the process includes verifying the plurality of messages based on the signature (e.g., by verifying or validating the signature of the messages). In some examples, each of the plurality of messages received from the one or more devices includes information associated with at least one of a speed, a direction of movement (or heading), a distance of a corresponding one of the one or more devices, any combination thereof, and/or other information.

In some examples, the one or more devices include at least one of a vehicle, a mobile device, a roadside unit, a traffic management system, a public transportation vehicle, any combination thereof, and/or other device. In some examples, the apparatus can be a vehicle computing system of a vehicle, such as any one of the vehicle computing systems 450, 1000, and 1050 of the vehicle 404.

At operation 1302, the process includes determining a thermal level. The thermal level is associated with the apparatus, such as a thermal level of one or more hardware components associated with a vehicle computing system (e.g., the vehicle computing system 1000). The one or more hardware components can include, for example, the modem 1002, the application processor 1010, the one or more processing cores 1018 (e.g., verification processors), a telematics control unit (TCU), any combination thereof, and/or other hardware component. In some examples, the thermal level can be generally the thermal level of the vehicle 404. In one example, the thermal level is one of a plurality of thermal levels. Each thermal level of the plurality of thermal levels can correspond to a range of temperatures of internal components of the apparatus. In some cases, the thermal level can include or be based on an ambient temperature of the apparatus (e.g., of the vehicle computing system) and/or can include transistor junction temperature (also referred to as a junction temperature) of one or more components of the apparatus (e.g., a modem, an application processor, and/or other component of the vehicle computing system).

At operation 1304, the process includes determining a processing load (e.g., a current processing load or a predicted processing load associated with the apparatus) based on at least a number of the plurality of messages. In one example, the process further includes determining a filtering level based on the processing load and a processing capacity associated with the apparatus (e.g., one or more hardware components of the apparatus or the apparatus in general). In some examples, the process includes determining the filtering level as a maximum from a zero value and a ratio of: a difference between the processing load and the processing capacity; and the processing capacity. In one illustrative example, the filtering level can be defined according to Eq. 2 above.

In some examples, the apparatus includes one or more verification processors configured to process the plurality of messages. In such examples, the process can include determining the processing capacity of the apparatus based on a sum of instantaneous processing capacities of the one or more verification processors. For example, the sum of instantaneous processing capacities can be defined according to Eq. 1 above.

At operation 1306, the process includes determining (e.g., selecting, calculating, and/or otherwise determining), based on the thermal level and the processing load, a filtering scheme to be applied for filtering the plurality of messages in order to maintain the processing load at or below the processing capacity. In some cases, a threshold can be defined based on the processing capacity of the apparatus. In some examples, selecting the filtering scheme is based on the thermal level, the processing load, and the filtering level.

In some examples, the process includes determining the filtering scheme from a plurality of filtering schemes. Each filtering scheme of the plurality of filtering schemes can result in a different volume or amount of the plurality of messages to be filtered. In one example, the filtering scheme includes not filtering the plurality of messages when the thermal level is a lowest defined thermal level. In yet another example, the filtering scheme includes shutting off a component of a modem associated with the apparatus to prevent reception of additional messages for processing at the apparatus until the processing load of the apparatus drops below the processing capacity or threshold.

In some examples, each filter scheme of the plurality of filtering schemes includes instructions identifying the one or more components at which the plurality of messages are to be filtered and a corresponding filtering criteria according to which the plurality of messages are to be filtered. When applying the corresponding filtering criteria, the process can include filtering the plurality of messages based on one or more of distances of the one or more devices, directions of movement of the one or more devices, and speeds of the one or more devices.

At operation 1308, the process includes applying the filtering scheme using one or more components associated with the apparatus to filter the plurality of messages. In some examples, as the thermal level increases, the filtering scheme (when applied) results in a larger number of the plurality of messages being filtered. In some examples, as the thermal level and the processing load increase, the filtering scheme (when applied) results in a larger number of the plurality of messages being filtered. As the thermal level and/or processing load decrease, the filtering scheme can reduce the number of messages being filtered, resulting in more messages being processed by the one or more components associated with the apparatus. In some examples, the one or more components that apply the filtering scheme include an ITS of the apparatus (e.g., ITS 1012 of the computing system 1000 etc.), a V2X component of a modem (e.g., V2X stack 1006 of modem 1002, V2X stack 1062 of modem 1065, etc.) associated with the apparatus, a downstream component of the modem (e.g., downstream component 1008 of modem 1002, downstream component 1064 of modem 1065, etc.), any combination thereof, and/or other component of the apparatus.

In some examples, the processes described herein (e.g., process 900, process 1100, process 1200, process 1300, and/or other process described herein) may be performed by a computing device or apparatus (e.g., a UE). In one example, the process 900 can be performed by the vehicle 404 of FIG. 4. In another example, the process 900 can be performed by a computing device with the computing system 1400 shown in FIG. 14. For instance, a vehicle with the computing architecture shown in FIG. 14 can include the components of the vehicle 404 of FIG. 4 and can implement the operations of FIG. 9, the operations of FIG. 11, the operations of FIG. 12, and/or the operations of FIG. 13.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 900, 1100, 1200, and 1300 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900, the process 1100, the process 1200, the process 1300, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
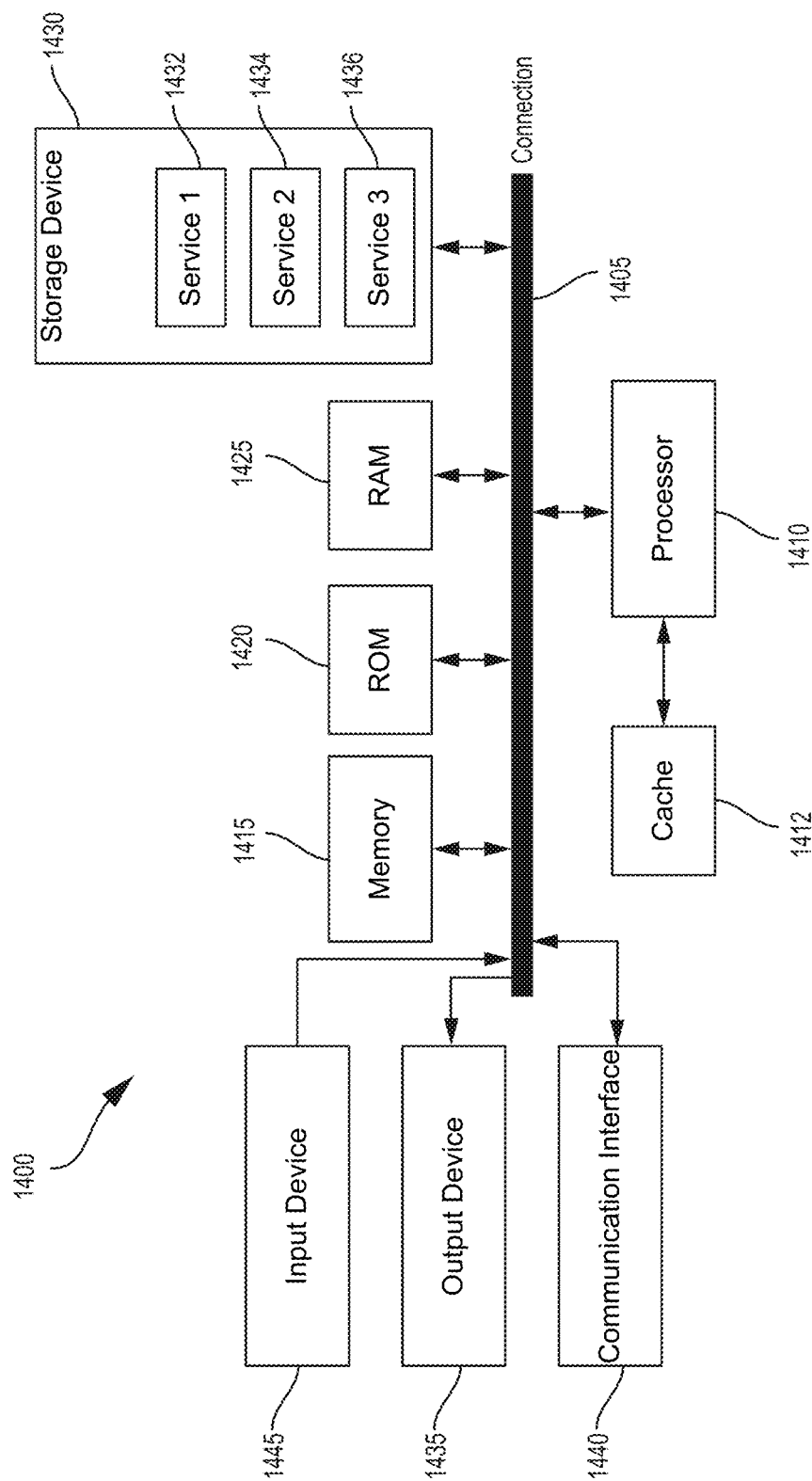
FIG. 14 is a block diagram illustrating an example of a computing system, according to aspects of the disclosure.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that communicatively couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400.

Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: An apparatus for thermal mitigation. The apparatus includes at least one memory and at least one processor communicatively coupled to the at least one memory. The at least one processor is configured to: obtain a temperature associated with a vehicle; determine whether to transition one or more communication functions from the vehicle to a user device based on the temperature; and in response to a determination to transition the one or more communication functions, transition the one or more communication functions from a communication unit of the vehicle to a communication unit of the user device.

Aspect 2: The apparatus according to aspect 1, wherein the at least one processor is configured to: receive, from the communication unit of the user device, a request to perform at least one communication function of the one or more communication functions for the communication unit of the user device; and perform the at least one communication function based on the request.

Aspect 3: The apparatus according to aspect 2, wherein the at least one processor is configured to: transition the at least one communication function from the communication unit of the vehicle to the communication unit of the user device.

Aspect 4: The apparatus according to any one of aspects 1 to 3, wherein the at least one processor is configured to: receive, from the communication unit of the user device, data based on the one or more communication functions performed by the communication unit of the user device; and output, by an output device of the vehicle, the data.

Aspect 5: The apparatus according to aspect 4, wherein the data is received by the communication unit of the user device over a communication interface provided by the vehicle.

Aspect 6: The apparatus according to any one of aspects 1 to 5, wherein the one or more communication functions include at least one of a wireless network access function, a vehicle-to-everything (V2X) function, an emergency-call function, or any combination thereof.

Aspect 7: The apparatus according to any one of aspects 1 to 6, wherein the one or more communication functions include a wireless network access function performed by the communication unit of the vehicle for the communication unit of the user device, and wherein the at least one processor is configured to: transmit, to the communication unit of the user device, an instruction to begin wireless network access functionality.

Aspect 8: The apparatus according to aspect 7, wherein the at least one processor is configured to: deregister the communication unit of the vehicle from a communication network service provider.

Aspect 9: The apparatus according to any one of aspects 7 or 8, wherein the at least one processor is configured to: perform the wireless network access function until at least the communication unit of the user device begins performing the wireless network access function.

Aspect 10: The apparatus according to any one of aspects 1 to 9, wherein the one or more communication functions include a vehicle-to-everything (V2X) function, and wherein the at least one processor is configured to: transition the V2X function from the communication unit of the vehicle to the communication unit of the user device.

Aspect 11: The apparatus according to aspect 10, wherein the at least one processor is configured to: determine whether the user device is configured for V2X functionality; and in response to a determination that the user device is configured for V2X functionality, transition the V2X function to the communication unit of the user device.

Aspect 12: The apparatus according to any one of aspects 1 to 11, wherein the at least one processor is configured to: transmit environmental information of the vehicle to the communication unit of the user device.

Aspect 13: The apparatus according to aspect 12, wherein the environmental information includes at least one of a V2X context of the vehicle, an emergency-call context of the vehicle, or any combination thereof.

Aspect 14: The apparatus according to any one of aspects 1 to 13, wherein the one or more communication functions include a vehicle-to-everything (V2X) function, and wherein the at least one processor is configured to: determine whether the user device is configured for V2X functionality; and in response to a determination that the user device is not configured for V2X functionality, continue to perform the V2X function.

Aspect 15: The apparatus according to any one of aspects 1 to 14, wherein the one or more communication functions include a vehicle-to-everything (V2X) function, and wherein the at least one processor is configured to: transition a first set of V2X functions from the communication unit of the vehicle to the communication unit of the user device; and perform, by the communication unit of the vehicle, a second set of V2X functions.

Aspect 16: The apparatus according to any one of aspects 1 to 15, wherein the one or more communication functions include a vehicle-to-everything (V2X) function, and wherein the at least one processor is configured to: determine whether the temperature is greater than a first temperature threshold; and in response to a determination that the temperature is greater than the first temperature threshold, reduce a duty cycle of the V2X function.

Aspect 17: The apparatus according to aspect 16, wherein reducing the duty cycle of the V2X function includes reducing a transmission rate of one or more V2X messages.

Aspect 18: The apparatus according to any one of aspects 16 or 17, wherein the at least one processor is configured to: determine a demand for the V2X function, and wherein reducing the duty cycle of the V2X function is further based on the determined demand for the V2X function.

Aspect 19: The apparatus according to any one of aspects 16 to 18, wherein the at least one processor is configured to: obtain an additional temperature associated with the vehicle; determine whether the additional temperature is greater than a second temperature threshold; and in response to a determination that the additional temperature is greater than the second temperature threshold, transition one or more V2X functions from the communication unit of the vehicle to the communication unit of the user device.

Aspect 20: The apparatus according to any one of aspects 1 to 19, wherein the at least one processor is configured to: perform, by the communication unit of the vehicle, a first communication function and a second communication function; determine whether the temperature is greater than a first temperature threshold; and in response to a determination that the temperature is greater than the first temperature threshold, transition the first communication function from the communication unit of the vehicle to the communication unit of the user device.

Aspect 21: The apparatus according to aspect 20, wherein the at least one processor is configured to: transmit a request to transition the first communication function from the communication unit of the vehicle to the communication unit of the user device.

Aspect 22: The apparatus according to aspect 21, wherein the at least one processor is configured to: in response transmitting the request, cease the one or more communication functions by the communication unit of the vehicle.

Aspect 23: The apparatus according to any one of aspects 21 or 22, wherein the at least one processor is configured to: output a notification based on the request, the notification including at least one of a displayed message, an audible message, haptic feedback, or any combination thereof.

Aspect 24: The apparatus according to any one of aspects 20 to 23, wherein the at least one processor is configured to: obtain an additional temperature associated with the vehicle; determine whether the additional temperature is greater than a second temperature threshold; and in response to a determination that the additional temperature is greater than the second temperature threshold, transition the second communication function from the communication unit of the vehicle to the communication unit of the user device.

Aspect 25: The apparatus according to aspect 24, wherein the first communication function includes a wireless network access function, and wherein the second communication function includes a vehicle-to-everything (V2X) function.

Aspect 26: The apparatus according to aspect 24, wherein the first communication function includes a wireless network access function, and wherein the second communication function includes an emergency-call function.

Aspect 27: The apparatus according to aspect 24, wherein the first communication function includes a vehicle-to-everything (V2X) function, and wherein the second communication function includes an emergency-call function.

Aspect 28: The apparatus according to any one of aspects 1 to 27, wherein the at least one processor is configured to: determine whether the temperature is greater than a first temperature threshold; and in response to a determination that the temperature is greater than the first temperature threshold, transmit a request to transition a first communication function from the communication unit of the vehicle to the communication unit of the user device.

Aspect 29: The apparatus according to aspect 28, wherein the at least one processor is configured to: output a notification based on the request, the notification including at least one of a displayed message, an audible message, haptic feedback, or any combination thereof.

Aspect 30: The apparatus according to any one of aspects 28 to 29, wherein the at least one processor is configured to: determine whether the temperature is greater than a second temperature threshold; and in response to a determination that the temperature is greater than the second temperature threshold, transition the first communication function from the communication unit of the vehicle to the communication unit of the user device.

Aspect 31: The apparatus according to any one of aspects 1 to 30, wherein the at least one processor is configured to: in response to the determination to transition the one or more communication functions, transition one or more additional functions from an additional communication unit of the vehicle to the user device.

Aspect 32: The apparatus according to any one of aspects 1 to 31, wherein the at least one processor is configured to: determine whether the temperature is greater than a temperature threshold; and in response to a determination that the temperature is greater than the temperature threshold, transition the one or more communication functions from the communication unit of the vehicle to the communication unit of the user device.

Aspect 33: The apparatus according aspect 32, wherein the at least one processor is configured to: obtain an additional temperature associated with the vehicle; determine the additional temperature is less than the temperature threshold; and in response to a determination that the additional temperature is less than the temperature threshold, transition the one or more communication functions from the communication unit of the user device to the communication unit of the vehicle.

Aspect 34: The apparatus according to any one of aspects 1 to 33, wherein the communication unit of the vehicle is a telematics control unit (TCU).

Aspect 35: The apparatus according to aspect 34, wherein the TCU includes at least one of a network access device (NAD), one or more subscriber identity modules (SIMs), one or more modems, or any combination thereof.

Aspect 36: The apparatus according to any one of aspects 1 to 35, wherein the communication unit of the user device is a modem.

Aspect 37: The apparatus according to any one of aspects 1 to 36, wherein the communication unit of the vehicle is a modem.

Aspect 38: The apparatus according to any one of aspects 1 to 37, wherein the at least one processor is configured to: transition at least one communication function from the communication unit of the vehicle to a communication unit of a roadside unit (RSU).

Aspect 39: The apparatus according to any one of aspects 1 to 38, wherein the at least one processor is configured to: transition at least one communication function from the communication unit of the vehicle to a communication unit of an additional vehicle.

Aspect 40: A method of thermal mitigation performing operations according to any one of aspects 1 to 39.

Aspect 41: A computer-readable medium comprising at least one instruction for causing a computer or processor to perform operations according to any one of aspects 1 to 39.

Aspect 42: An apparatus for thermal mitigation, the apparatus including means for performing operations according to any one of aspects 1 to 39.

Aspect 43: An apparatus for thermal based load balancing. The apparatus includes at least one transceiver, at least one memory and at least one processor communicatively coupled to the at least one memory and the at least one transceiver. The at least one processor is configured to: receive, via the at least one transceiver, a plurality of messages from one or more devices; determine a thermal level; determine a processing load based on at least a number of the plurality of messages; based on the thermal level and the processing load, determining a filtering scheme to be applied for filtering the plurality of messages in order to maintain the processing load at or below a processing capacity; and apply the filtering scheme using one or more components associated with the apparatus to filter the plurality of messages.

Aspect 44: The apparatus of aspect 43, wherein the at least one processor is further configured to: determine a filtering level based on the processing load and the processing capacity; and determine the filtering scheme based on the thermal level, the processing load, and the filtering level.

Aspect 45: The apparatus of any of aspects 43 or 44, wherein the apparatus includes one or more verification processors configured to process the plurality of messages, and wherein the at least one processor is configured to: determine the processing capacity based on a sum of instantaneous processing capacities of the one or more verification processors.

Aspect 46: The apparatus of any of aspects 43 to 45, wherein the at least one processor is configured to: determine the filtering level as a maximum of a zero value and a ratio of: a difference between the processing load and the processing capacity; and the processing capacity.

Aspect 47: The apparatus of any of aspects 43 to 46, wherein the at least one processor is configured to: determine the filtering scheme from a plurality of filtering schemes, each filtering scheme of the plurality of filtering schemes resulting in a different volume of the plurality of messages to be filtered.

Aspect 48: The apparatus of any of aspects 43 to 47, wherein each filter scheme of the plurality of filtering schemes includes instructions identifying: the one or more components at which the plurality of messages are to be filtered; and a corresponding filtering criteria according to which the plurality of messages are to be filtered.

Aspect 49: The apparatus of any of aspects 43 to 48, wherein each of the plurality of messages received from the one or more devices includes information associated with at least one of a speed, a direction of movement, a distance, or any combination thereof, of a corresponding one of the one or more devices, and wherein the at least one processor, when applying the corresponding filtering criteria, is configured to: filter the plurality of messages based on one or more of distances of the one or more devices, directions of movement of the one or more devices and speeds of the one or more devices.

Aspect 50: The apparatus of any of aspects 43 to 49, wherein the one or more components at which the filtering scheme is applied includes at least one of an Intelligent Transportation System (ITS) of the apparatus, a Vehicle-to-Everything (V2X) component of a modem associated with the apparatus, a downstream component of the modem, or any combination thereof.

Aspect 51: The apparatus of any of aspects 43 to 50, wherein as the thermal level increases, the filtering scheme, when applied, results in a larger number of the plurality of messages being filtered.

Aspect 52: The apparatus of any of aspects 43 to 51, wherein as the thermal level and the processing load increase, the filtering scheme, when applied, results in a larger number of the plurality of messages being filtered.

Aspect 53: The apparatus of any of aspects 43 to 52, wherein the filtering scheme includes not filtering the plurality of messages when the thermal level is a lowest defined thermal level.

Aspect 54: The apparatus of any of aspects 43 to 53, wherein the filtering scheme includes shutting off a component of a modem associated with the apparatus to prevent reception of additional messages for processing at the apparatus until the processing load of the apparatus drops below the processing capacity.

Aspect 55: The apparatus of any of aspects 43 to 54, wherein the plurality of messages are vehicle-to-everything (V2X) messages.

Aspect 56: The apparatus of any of aspects 43 to 55, wherein the thermal level is one of a plurality of thermal levels, each thermal level of the plurality of thermal levels corresponding to a range of temperatures of internal components of the apparatus.

Aspect 57: The apparatus of any of aspects 43 to 56, wherein the plurality of messages are signed using a signature and wherein the at least one processor is configured to: verify the plurality of messages based on the signature.

Aspect 58: The apparatus of any of aspects 43 to 57, wherein the apparatus is a vehicle computing system of a vehicle.

Aspect 59: The apparatus of any of aspects 43 to 58, wherein the one or more devices include at least one of a vehicle, a mobile device, a roadside unit, a traffic management system, a public transportation vehicle, or any combination thereof.

Aspect 60: The apparatus of any of aspects 43 to 59, wherein the at least one processor is configured to: apply a load balancing scheme to distribute filtered messages between one or more processing cores associated with the apparatus, for processing the plurality of filtered messages.

Aspect 61: A method of thermal mitigation performing operations according to any one of aspects 43 to 60.

Aspect 62: A computer-readable medium comprising at least one instruction for causing a computer or processor to perform operations according to any one of aspects 43 to 60.

Aspect 63: An apparatus for thermal based load balancing, the apparatus including means for performing operations according to any one of aspects 43 to 60.

Aspect 64: A method including operations according to any one of aspects 1 to 39 and 43 to 60.

Aspect 65: An apparatus including at least one transceiver, at least one memory and at least one processor communicatively coupled to the at least one memory and the at least one transceiver. The at least one processor is configured to perform operations according to any one of aspects 1 to 39 and 43 to 60.

Aspect 66: A computer-readable medium comprising at least one instruction for causing a computer or processor to perform operations according to any one of aspects 1 to 39 and 43 to 60.

Aspect 67: An apparatus including means for performing operations according to any one of aspects 1 to 39 and 43 to 60.

What is claimed is:

1. An apparatus for thermal mitigation, comprising:
at least one memory; and
at least one processor communicatively coupled to the at least one memory, the at least one processor is configured to:
obtain a temperature associated with a vehicle;
obtain a plurality of thermal mitigation levels for the vehicle, wherein a first thermal mitigation level of the plurality of thermal mitigation levels is associated with a transition of a first communication function of one or more communication functions from the vehicle to a user device and a first temperature threshold, and wherein a second thermal mitigation level of the plurality of thermal mitigation levels is associated with a transition of a second communication function of the one or more communication functions from the vehicle to the user device and a second temperature threshold, the second temperature threshold being greater than the first temperature threshold;
determine the temperature is associated with the first thermal mitigation level from the plurality of thermal mitigation levels based on the temperature being greater than the first temperature threshold and less than the second temperature threshold; and
in response to a determination that the temperature is associated with the first thermal mitigation level, transition the first communication function from a communication unit of the vehicle to a communication unit of the user device.

2. The apparatus of claim 1, wherein the at least one processor is configured to:
determine the temperature is greater than the first temperature threshold and less than the second temperature threshold; and
determine the temperature is associated with the first thermal mitigation level for the vehicle in response to a determination that the temperature is greater than the first temperature threshold and less than the second temperature threshold.

3. The apparatus of claim 2, wherein the at least one processor is configured to:
obtain an additional temperature associated with the vehicle;
determine the additional temperature is less than the first temperature threshold; and
in response to a determination that the additional temperature is less than the first temperature threshold, transition the first communication function from the communication unit of the user device to the communication unit of the vehicle.

4. The apparatus of claim 1, wherein the at least one processor is configured to:
receive, from the communication unit of the user device, a request to perform the first communication function;
perform the first communication function based on the request; and
transition, based on the temperature, the first communication function from the communication unit of the vehicle to the communication unit of the user device.

5. The apparatus of claim 1, wherein the at least one processor is configured to:
receive, from the communication unit of the user device, data based on the first communication function performed by the communication unit of the user device; and
output, by an output device of the vehicle, the data.

6. The apparatus of claim 1, wherein the first communication function includes a wireless network access function performed by the communication unit of the vehicle for the communication unit of the user device, and wherein the at least one processor is configured to:
transmit, to the communication unit of the user device, an instruction to begin wireless network access functionality.

7. The apparatus of claim 6, wherein the at least one processor is configured to:
deregister the communication unit of the vehicle from a communication network service provider.

8. The apparatus of claim 6, wherein the at least one processor is configured to:
perform the wireless network access function until at least the communication unit of the user device begins performing the wireless network access function.

9. The apparatus of claim 1, wherein the first communication function includes a vehicle-to-everything (V2X) function, and wherein the at least one processor is configured to:
transition the V2X function from the communication unit of the vehicle to the communication unit of the user device.

10. The apparatus of claim 9, wherein the at least one processor is configured to:
determine whether the user device is configured for V2X functionality; and
in response to a determination that the user device is configured for V2X functionality, transition the V2X function to the communication unit of the user device.

11. The apparatus of claim 1, wherein the at least one processor is configured to:
transmit environmental information of the vehicle to the communication unit of the user device, wherein the environmental information includes at least one of a V2X context of the vehicle, an emergency-call context of the vehicle, or any combination thereof.

12. The apparatus of claim 1, wherein the one or more communication functions include a vehicle-to-everything (V2X) function, and wherein the at least one processor is configured to:
determine whether the user device is configured for V2X functionality; and in response to a determination that the user device is not configured for V2X functionality, continue to perform the V2X function.

13. The apparatus of claim 1, wherein the one or more communication functions include a vehicle-to-everything (V2X) function, and wherein the at least one processor is configured to:
transition a first set of V2X functions from the communication unit of the vehicle to the communication unit of the user device; and
perform, by the communication unit of the vehicle, a second set of V2X functions.

14. The apparatus of claim 1, wherein the second communication function includes a vehicle-to-everything (V2X) function, and wherein the at least one processor is configured to:
determine whether the temperature is greater than the second temperature threshold; and
in response to a determination that the temperature is greater than the second temperature threshold, reduce a duty cycle of the V2X function.

15. The apparatus of claim 14, wherein, to reduce the duty cycle of the V2X function, the at least one processor is configured to reduce a transmission rate of one or more V2X messages.

16. The apparatus of claim 14, wherein the at least one processor is configured to:
determine a demand for the V2X function, and wherein; and
reduce the duty cycle of the V2X function further based on the determined demand for the V2X function.

17. The apparatus of claim 14, wherein the at least one processor is configured to:
obtain an additional temperature associated with the vehicle;
determine the additional temperature is greater than the second temperature threshold; and
determine the additional temperature is associated with the second thermal mitigation level from the plurality of thermal mitigation levels based on the additional temperature being greater than the second temperature threshold.

18. The apparatus of claim 17, wherein the at least one processor is configured to:
in response to a determination that the additional temperature is associated with the second thermal mitigation level, transition the second communication function from the communication unit of the vehicle to the communication unit of the user device.

19. The apparatus of claim 1, wherein the at least one processor is configured to:
transition at least one communication function from the communication unit of the vehicle to a communication unit of a roadside unit (RSU).

20. The apparatus of claim 1, wherein the at least one processor is configured to:
transition at least one communication function from the communication unit of the vehicle to a communication unit of an additional vehicle.

21. A method of thermal mitigation, the method comprising:
obtaining a temperature associated with a vehicle;
obtain a plurality of thermal mitigation levels for the vehicle, wherein a first thermal mitigation level of the plurality of thermal mitigation levels is associated with a transition of a first communication function of one or more communication functions from the vehicle to a user device and a first temperature threshold, and wherein a second thermal mitigation level of the plurality of thermal mitigation levels is associated with a transition of a second communication function of the one or more communication functions from the vehicle to the user device and a second temperature threshold, the second temperature threshold being greater than the first temperature threshold;
determining the temperature is associated with the first thermal mitigation level from the plurality of thermal mitigation levels based on the temperature being greater than the first temperature threshold and less than the second temperature threshold; and
in response to a determination that the temperature is associated with the first thermal mitigation level, transitioning the first communication function from a communication unit of the vehicle to a communication unit of the user device.

22. The method of claim 21, further comprising:
determining the temperature is greater than the first temperature threshold and less than the second temperature threshold; and
determine the temperature is associated with the first thermal mitigation level for the vehicle in response to a determination that the temperature is greater than the first temperature threshold and less than the second temperature threshold.

23. The method of claim 22, further comprising:
obtaining an additional temperature associated with the vehicle;
determining the additional temperature is less than the first temperature threshold; and
in response to a determination that the additional temperature is less than the first temperature threshold, transition the first communication function from the communication unit of the user device to the communication unit of the vehicle.

24. The method of claim 21, wherein the first communication function includes a wireless network access function performed by the communication unit of the vehicle for the communication unit of the user device, and further comprising:
transmitting, to the communication unit of the user device, an instruction to begin wireless network access functionality.

25. The method of claim 21, wherein the first communication function includes a vehicle-to-everything (V2X) function, and further comprising:
transitioning the V2X function from the communication unit of the vehicle to the communication unit of the user device.

26. The method of claim 21, further comprising:
receiving, from the communication unit of the user device, a request to perform the first communication function;
performing the first communication function based on the request; and
transitioning, based on the temperature, the first communication function from the communication unit of the vehicle to the communication unit of the user device.

27. The method of claim 21, further comprising:
receiving, from the communication unit of the user device, data based on the first communication function performed by the communication unit of the user device; and
outputting, by an output device of the vehicle, the data.

28. The method of claim 21, wherein the one or more communication functions include a vehicle-to-everything (V2X) function, the method further comprising:
- determining whether the user device is configured for V2X functionality; and
- in response to a determination that the user device is not configured for V2X functionality, continuing to perform the V2X function.

29. The method of claim 21, wherein the one or more communication functions include a vehicle-to-everything (V2X) function, the method further comprising:
- transitioning a first set of V2X functions from the communication unit of the vehicle to the communication unit of the user device; and
- performing, by the communication unit of the vehicle, a second set of V2X functions.

30. The method of claim 21, further comprising:
- obtaining an additional temperature associated with the vehicle;
- determining the additional temperature is greater than the second temperature threshold;
- determining the additional temperature is associated with the second thermal mitigation level from the plurality of thermal mitigation levels based on the additional temperature being greater than the second temperature threshold; and
- in response to a determination that the additional temperature is associated with the second thermal mitigation level, transitioning the second communication function from the communication unit of the vehicle to the communication unit of the user device.

* * * * *